United States Patent
Lin

(10) Patent No.: US 10,324,853 B2
(45) Date of Patent: Jun. 18, 2019

(54) CACHE SYSTEM AND METHOD USING TRACK TABLE AND BRANCH INFORMATION

(71) Applicant: SHANGHAI XINHAO MICROELECTRONICS CO., LTD., Shanghai (CN)

(72) Inventor: Kenneth Chenghao Lin, Shanghai (CN)

(73) Assignee: SHANGHAI XINHAO MICROELECTRONICS CO., LTD., Shanghai (CN)

( * ) Notice: Subject to any disclaimer, the term of this patent is extended or adjusted under 35 U.S.C. 154(b) by 118 days.

(21) Appl. No.: 15/301,928

(22) PCT Filed: Mar. 30, 2015

(86) PCT No.: PCT/CN2015/075359
§ 371 (c)(1),
(2) Date: Nov. 4, 2016

(87) PCT Pub. No.: WO2015/149662
PCT Pub. Date: Oct. 8, 2015

(65) Prior Publication Data
US 2017/0132140 A1  May 11, 2017

(30) Foreign Application Priority Data
Apr. 4, 2014 (CN) .......................... 2014 1 0140627

(51) Int. Cl.
*G06F 9/38* (2018.01)
*G06F 12/0875* (2016.01)
(Continued)

(52) U.S. Cl.
CPC ...... *G06F 12/0875* (2013.01); *G06F 9/30043* (2013.01); *G06F 9/30058* (2013.01);
(Continued)

(58) Field of Classification Search
CPC .............................. G06F 9/3804; G06F 9/383
See application file for complete search history.

(56) References Cited

U.S. PATENT DOCUMENTS 6,073,230 A * 6/2000 Pickett .................. G06F 9/3806
711/E12.018
6,976,147 B1 * 12/2005 Isaac .................... G06F 12/0862
711/137
(Continued)

FOREIGN PATENT DOCUMENTS

| CN | 101211257 A | 7/2008 |
| CN | 101710272 A | 5/2010 |

OTHER PUBLICATIONS

The World Intellectual Property Organization (WIPO) International Search Report for PCT/CN2015/075359 dated Jun. 17, 2015 p. 1-5.

*Primary Examiner* — Jacob Petranek
(74) *Attorney, Agent, or Firm* — Anova Law Group, PLLC

(57) ABSTRACT

The present invention provides a cache method and a cache system. The cache method includes the following steps. An instruction issuing is scheduled based on a program flow information stored in a cache system. The program flow information includes an instruction sequence information and an instruction distance information. A time point for the instruction issuing is determined based on the instruction sequence information and the instruction distance information.

24 Claims, 18 Drawing Sheets

(51) Int. Cl.
*G06F 12/00* (2006.01)
*G06F 9/30* (2018.01)

(52) U.S. Cl.
CPC ............ *G06F 9/3802* (2013.01); *G06F 9/383* (2013.01); *G06F 9/3804* (2013.01); *G06F 9/3836* (2013.01); *G06F 9/3869* (2013.01); *G06F 12/00* (2013.01); *G06F 2212/452* (2013.01)

(56) References Cited

U.S. PATENT DOCUMENTS

| | | | |
|---|---|---|---|
| 7,487,296 B1 * | 2/2009 | Iacobovici | G06F 12/0862 711/137 |
| 8,694,759 B2 * | 4/2014 | Dundas | G06F 9/3808 712/237 |
| 2010/0017580 A1 * | 1/2010 | Greenhalgh | G06F 9/30145 712/205 |
| 2011/0010506 A1 * | 1/2011 | Greer | G06F 9/383 711/137 |
| 2011/0238917 A1 * | 9/2011 | Lin | G06F 9/3804 711/125 |
| 2011/0264894 A1 * | 10/2011 | Lin | G06F 9/322 712/207 |
| 2013/0185545 A1 * | 7/2013 | Lin | G06F 9/30043 712/225 |
| 2015/0026414 A1 * | 1/2015 | Kalamatianos | G06F 12/0862 711/137 |
| 2015/0134933 A1 * | 5/2015 | Holm | G06F 12/0862 712/207 |

* cited by examiner

|       | 1  | 2  | 3 | 4 | 5  | 6  | 7  | 8  | 9  | 10 | 11 | 12 | 13 |
|-------|----|----|---|---|----|----|----|----|----|----|----|----|----|
| SHIFT | I1 | I2 | D | E | M1 | M2 | W  |    |    |    |    |    |    |
| OR    |    | I1 | I2| D | E  | M1 | M2 | W  |    |    |    |    |    |
| ADD   |    |    | I1| I2| D  | E  | M1 | M2 | W  |    |    |    |    |
| LOAD  |    |    |   | I1| I2 | D  | E  | M1 | M2 | W  |    |    |    |
| SUB   |    |    |   |   | I1 | I2 | D  | –  | –  | E  | M1 | M2 | W  |
Fig. 1
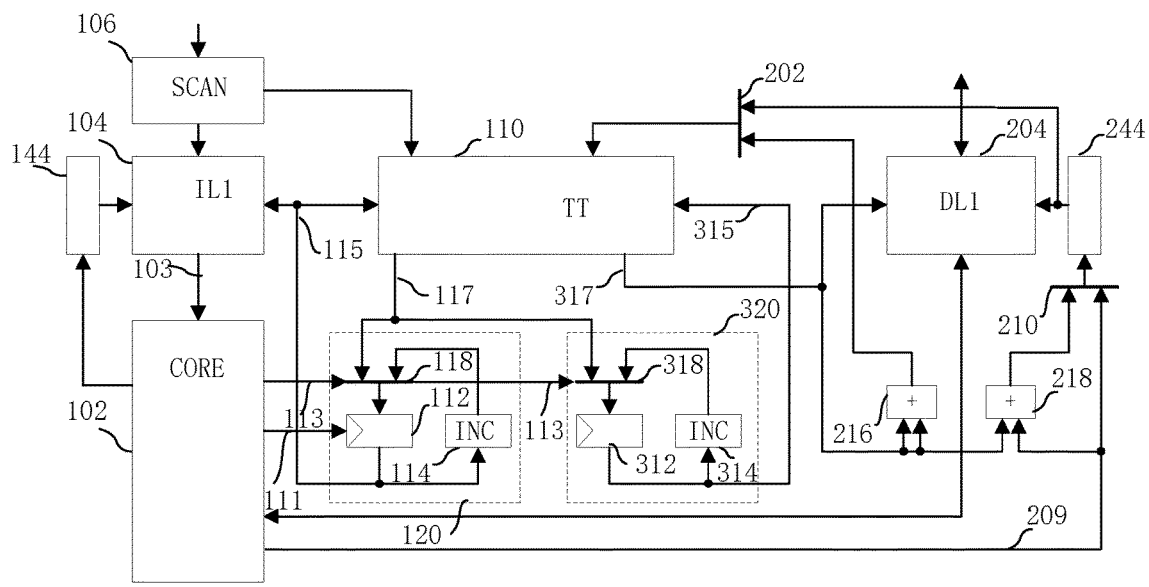
Fig. 2
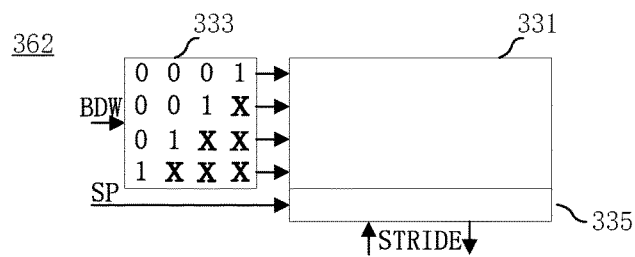
Fig. 3A

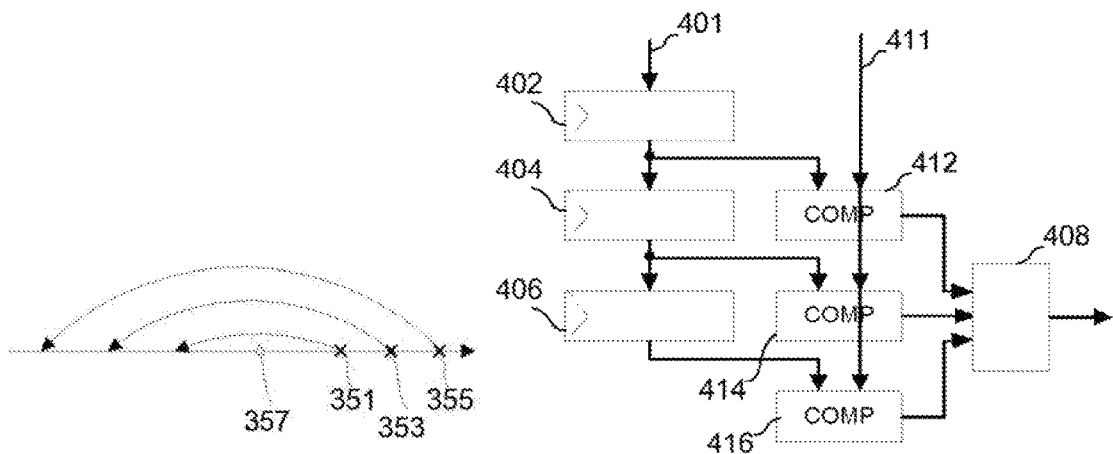

```
I1    I D E W
I2    I D E W
I3      I D E W
I4        I D E W
I5      I D G T M W
I6          I D E W
I7            I D E W
I8              I D E W
```
FIG. 12
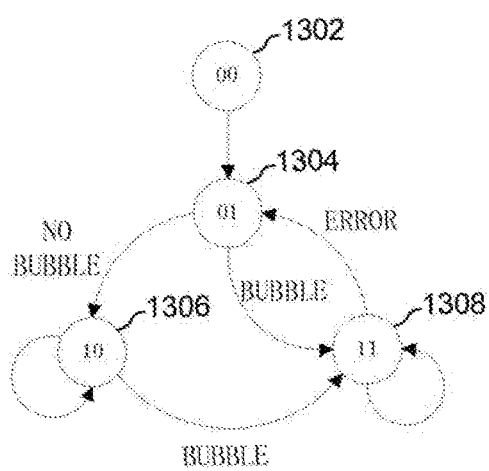
FIG. 13A
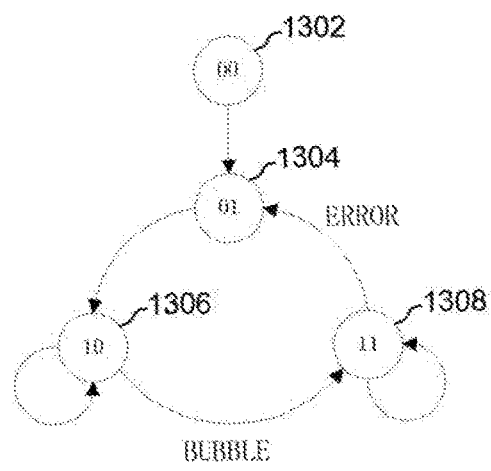
FIG. 13B

```
EB LD                                    EB LD worst case
I1      I D E W                          I1      I D E W
I2        I D E W                        I2        I D E W
I3          I D E W                      I3          I D E W
I4            I D E W                    I4            I D E W
I5 EB LD      I D G T M W
I5 STRIDE LD  I d d d M W                I5 LD       I d d d D G T M W
I6              I D E W                  I6              I b b b D E W
I7                I D E W                I7                I D E W
I8                  I D E W              I8                  I D E W

FIG. 14A                                  FIG. 14B

EB ST worst case
I0    I D E W                            I1    I D E W
I1      I D E W                          I2      I D E W
I2        I D E W                        I3        I D E W
I3          I D E W                      I4          I D E W
I4            I D E W                    I5      I D B
I5 ST         I d d d D G T M            I6/T6         I D E W
I6              I D E W                  I7/T7           I D E W
I7                I D E W                I8/T8             I D E W
I8                  I D E W                      FIG. 15

FIG. 14C
```

```
BRANCH with two front pipes          BRANCH with two front pipes
I1      I D E W                      I1      I D E W
I2        I D E W                    I2        I D E W
I3          I D E W                  I3          I D E W
I4            I D E W                I4            I D E W
I5 BR     I d d d D B                I5 BR     I D G T
I6              I D                            I d d d D B
T6              I D E W              I6              I D
I7                  I                T6                I D E W
T7                  I D E W          I7                  I
I8/T8                 I D E W        T7                  I D E W
                                     I8/T8                 I D E W Fig. 22A                               Fig. 22B
```

```
         1  2  3  4  5  6  7  8  9 10 11 12 13
   Q0    I  D  E  W
   Q1       I  D  E  W
   Q2          I  D  E  W
   Q3             I  D  E  W
   Q4       I  d  d  D  B
   Q5          I  D  G  T  M  W
   Q6                I  D  E  W
   R5                I  D
   Q7                   I  D  E  W
   R6                   I
   Q8                      I  D  E  W
   Q9                         I  D  E  W
   Q10                  I  d  d  D  B
   Q11                        I  D
   P1                            I  D  E  W
   P2                            I  D  G  T  M  W
   Q12                                 I
   P3                                  I  D  E  W
         1  2  3  4  5  6  7  8  9 10 11 12 13
```

CACHE SYSTEM AND METHOD USING TRACK TABLE AND BRANCH INFORMATION

FIELD OF THE DISCLOSURE

The present disclosure generally relates to the computers, communications, and integrated circuit technologies and, more particularly, relates to a cache system and a cache method.

BACKGROUND

In a processor system that contains cache lines, factors such as cache miss, control hazard, and data hazard may halt cache line operation and affect the performance of the processor system.

Generally, cache misses are divided into three categories: compulsory, conflict, and capacity. Set-associative cache structure together with adding more sets of cache may be used to reduce conflict misses. But the number of sets of cache may be difficult to exceed certain level due to the power consumption and speed constraints. For example, multi-way set-associative cache structure may require all ways of the set addressed by a same index to be read and compared at the same time. The conventional pre-fetching cache technique is often able to solve the cache miss problem for some conflict misses and capacity misses at a certain cost, but is not effective to reduce compulsory misses. Further, new cache structures, such as victim cache, trace cache, and pre-fetching cache may be able to mitigate the cache miss problem to a certain extent. However, as the speed gap between processor and memory grow wider, cache misses have become the most serious bottleneck in modern processor performance improvement.

Control hazard caused by executing branch instructions is another major cause for cache line performance loss. When processing branch instructions, a conventional processor has no way of knowing in advance which instruction will be executed next after a branch instruction is executed. Such information may only be available until the branch instruction is executed or at least until a transition signal and a branch target instruction address are generated when executing the branch instruction.

In addition, techniques such as branch target buffer and trace cache may be used to predict the possibility of branch transition occurrence and to directly obtain the branch target address when a same branch instruction is executed again. However, such techniques often make prediction based on processor's past execution results. Thus, it is impossible to predict the possibility of branch transition occurrence and to obtain the branch target address when the branch instruction is executed for the first time. Even if the branch instruction is executed again, prediction error may still cause performance loss. Further, cache misses due to branch transition also cause performance loss in conventional processor system.

Data hazard is often caused by read after write (RAW) operation between instructions. For two adjacent or closely located instructions, when a target register in the preceding instruction is same as a source register in the succeeding instruction, the succeeding instruction is not able to obtain correct operand from the register until the result of the preceding instruction is written into the register. The cache line may be paused by inserting a bubble until the correct operand can be read from the register. A bypass technique may be used to alleviate the data hazard problem to certain extent. In this case, a plurality of bypass paths may be added in the processor. When the result of the preceding instruction is generated, the result is directly sent to a bypass path and the succeeding instruction obtains the correct operand from the bypass path instead of from the register. However, the bypass technique does not solve all data hazard problems.

Technical Problem of the Disclosure

FIG. 1 illustrates a schematic diagram of a conventional pipeline technology. In this example, the seven-stage pipeline of fixed length is illustrated. The seven pipeline stages are instruction fetch 1 (I1), instruction fetch 2 (I2), decode (D), execute (E), access 1 (M1), access 2 (M2), and write back (W). I1 and I2 stages are used to fetch instructions. D stage is used to decode instructions and to fetch the operands based on the decoding result. The source of the operands may be an immediate value, a register stack, or a base address register, etc. E stage is used to operate on the operands, such as arithmetic and logical operations. For data access instructions, the data address is calculated in E stage. M1 and M2 stages are used to access the memory, that is, read and write accesses to the memory based on the data address of the data access instruction. W stage is used to write the execution result of the instruction back to the register stack. The execution result may be arithmetic operation result, logical operation result, or data read from the memory.

It is assumed that five instructions are executed sequentially. The first instruction is a SHIFT instruction. The second instruction is an OR instruction. The third instruction is an ADD instruction. The fourth instruction is a LOAD instruction. The fifth instruction is a SUB instruction. The source registers of the SUB instruction is the same as the target register of the LOAD instruction, resulting in a write-after-read correlation that cannot be solved by the bypass technique. That is, E stage of the SUB instruction cannot start when M2 stage of the LOAD instruction is not completed.

As shown in FIG. 1, in the seventh cycle, the LOAD instruction and the SUB instruction enter into E stage and D stage, respectively. In the eighth cycle, the LOAD instruction enters into M1 stage while the SUB instruction cannot enter into E stage. Thus, a bubble is generated indicated by "-" as shown in FIG. 1. In the ninth cycle, the LOAD instruction enters into M2 stage while the SUB instruction still cannot enter into E stage. Thus, another bubble is generated. In the tenth cycle, the LOAD instruction enters into W stage, that is, M2 stage is completed. At this time, the SUB instruction enters into E stage. Thus, the SUB instruction is postponed by a total of two cycles. In other words, the bypass technique cannot solve the data hazard problem as shown in FIG. 1.

Branch instructions have a similar problem. Even if a branch prediction technique is used, branch errors may still occur and cause branch penalty. That is, a succeeding instruction following the branch instruction may generate bubbles in the pipeline, postponing the execution of the succeeding instruction.

In addition, during the operation, the conventional processor architecture often uses a data read instruction to load an operand from a memory to a register initially, and then sends the operand to a computing unit to perform an appropriate operation. After the operation is completed, the execution result remains in the register initially, and then is stored into the memory by a special data store instruction.

According to the statistics, in programs for conventional processors, data read instructions and data store instructions account for approximately 34% of the total number of instructions. Because data read instructions and data store instructions do not involve any arithmetic and/or logical operations, the greater the proportion of such instructions, the lower the utilization of the processor computing unit, and the processor's computing power cannot be fully utilized. Further, branch instructions do not involve any arithmetic and/or logical operations either while such instructions account for approximately 16% of the total number of instructions in the programs. Concealing data read instructions, data store instructions, and branch instructions to avoid occupying separate instruction cycles may further improve the instruction execution efficiency of the processors.

TECHNICAL SOLUTIONS OF THE DISCLOSURE

The method and system of the present invention directly solve one or more of the above described or other problems.

One aspect of the present invention provides a cache method. The method includes the following steps. An instruction issuing is scheduled based on a program flow information stored in a cache system. The program flow information includes an instruction sequence information and an instruction distance information. A time point is determined for the instruction issuing based on the instruction sequence information and the instruction distance information.

Optionally, a portion or all of the program flow information are included in instructions stored in an instruction memory. Or the program flow information extracted from instructions are stored in a program flow information memory.

Optionally, the instruction memory is an instruction cache or an instruction read buffer. The program flow information memory is a track table or a track read buffer.

Optionally, a processor system includes a main pipeline and a plurality of early pipelines. Instructions are issued in advance to early pipelines based on the instruction sequence information stored in the instruction memory or the program flow information memory and the instruction distance.

Optionally, instructions that require more execution cycles are issued in advance based on an instruction type read in advance from the instruction memory or the program flow information memory.

Optionally, instructions are divided into at least two types including type "1" instructions that require more execution cycles and type "0" instructions that require less execution cycles. The type "1" instructions are executed in the early pipelines. The type "0" instructions are executed in the main pipeline. The type "1" instructions are issued in advance to the early pipelines based on a type information of the program flow information. Alternatively, instructions are divided into three types including type "s" instructions that require more execution cycles but have no register correlation with succeeding instructions, type "1" instructions that require more execution cycles and have potential register correlation with succeeding instructions, and type "0" instructions that require less execution cycles. The type "1" instructions are executed in the early pipelines. The type "0" instructions are executed in the main pipeline. The type "s" instructions are treated as the type "1" instruction or the type "0" instructions depending on a difference between numbers of the type "1" instructions and the type "0" instructions.

The type "1" instructions and the type "s" instructions treated as the type "1" instructions are issued in advance to the early pipelines.

Optionally, the type "1" instructions include data read instructions and branch instructions.

Optionally, the type "1" instructions also include data store instructions, multiplication instructions, and division instructions.

Optionally, the type "s" instructions include data store instructions.

Optionally, by issuing a type "1" instructions in advance to an early pipelines, the execution result of the type "1" instruction is available ahead of the time point when succeeding instructions retrieve the result so that an execution delay caused by the type "1" instruction is concealed.

Optionally, instructions loaded from a lower level memory to a primary instruction cache are scanned to extract a portion or all of the program flow information.

Optionally, the extracted information includes a type information indicating whether an instruction is a type "1" instruction or a type "0" instruction, or an instruction is a type "1" instruction, a type "0" instruction, or a type "s" instruction, and an instruction type indicating whether an instruction is a data access instruction, a branch instruction, or other type of instruction.

Optionally, when an instruction is a branch instruction, the extracted information further includes a branch target instruction address information of the branch instruction, wherein the address information is an instruction address or a cache memory address. When an instruction is a data access instruction, the extracted information further includes an address information of the data accessed by the data access instruction, wherein the address information is a data address or a cache memory address (BN).

Optionally, the extracted information is stored in the track table. The track table includes a plurality of track points and each track point corresponds to an instruction. The track table includes at least track points corresponding to all branch instructions and data points corresponding to all data access instructions that are loaded into the primary instruction cache. Each branch point further includes a branch transfer decision result of the branch instruction. Each data point further includes a data stride or a stride pointer of the data access instruction, wherein the data stride is a difference between two data addresses corresponding to two adjacent executions of the data access instruction, and the stride pointer is an address value of a stride table for the data stride corresponding to the data access instruction, and a state of the data access instruction to indicate whether the data stride or the stride pointer of the data point is valid, and whether the data address information of the data point corresponds to a current data or a next data.

Optionally, a data address of a previous data access by the data access instruction and a data stride are added to obtain a predicted data address of a next data access, which is then converted to a predicted cache address. Or a cache address of a previous data access by the data access instruction and a data stride are added to obtain a predicted cache address of a next data access. The corresponding data is ensured to be loaded into the primary data cache based on the predicted cache address.

Optionally, the corresponding data is read in advance based on the predicted cache address. When the data access instruction is executed in the data pipeline, the correctness of the predicted cache address is determined. When the predicted cache address is correct, the processor system continues to operate. When the predicted cache address is not correct, the corresponding data is obtained again based on an actual cache address, and the processor system continues to operate.

Optionally, the method to determine whether a predicted cache address is correct includes the following steps. When the data access instruction is executed in the data pipeline, the actual data address is calculated and converted to the actual cache address, and then the actual cache address is compared with the predicted cache address. Or the actual data address is calculated, and then the actual data address is compared with the predicted data address converted from the predicted cache address. Or a base address register value at this time is compared with the result of the predicted data address subtracted by an address offset. Or a branch decision word at this time is compared with a branch decision word when the predicted data address is calculated. When the comparison result is equal, the predicted cache address is correct. When the comparison result is not equal, the predicted cache address is not correct.

Optionally, the stride table stores the data strides corresponding to the data access instruction in different loop levels. The branch decision word including branch transfer decision results for a plurality of consecutive backward transfer branch instructions following the data access instruction is used to read the data stride of the loop level corresponding to the branch decision word from the data strides corresponding to the data access instruction. The address information of the last data access of the data access instruction and the data stride are used to generate the address information of the next data access.

Optionally, the stride table stores the data strides corresponding to different backward transfer branch instructions of the data access instruction. When the branch transfer of the backward transfer branch instruction occurs, all data strides corresponding to the branch instruction are read from the stride table. The address information of the last data access of the data access instruction corresponding to the data stride and the data stride are used to generate the address information of the next data access of the data access instruction.

Optionally, the method further includes the following steps. A read pointer of the master tracker is used to address instructions, and to provide type "0" instructions to the main pipeline. A read pointer of the data tracker is used to address instructions and track points, and to provide type "1" instructions to the data pipeline. The read pointer of the data tracker and the read pointer of the master tracker point to the same instruction, or the read pointer of the data tracker is ahead of the read pointer of the master tracker. The read pointer of the master tracker or the read pointer of the data tracker is incremented by one to point to next instruction or next track point.

Optionally, the method further includes the following steps. The read pointer of the data tracker points to the type "1" instruction succeeding the read pointer of the master tracker in advance, and when the read pointer of the master tracker reaches certain position, the type "1" instruction is issued to an early pipeline, and the register correlation between the type "1" instruction and all the preceding instructions until the read pointer of the master tracker is checked to determine the number of bubbles to be inserted by the type "1" instruction into the early pipeline. The method to determine whether the read pointer of the master tracker has reached the certain position includes the following steps. When the distance difference between the read pointer of the master tracker and the read pointer of the data tracker is less than the maximum advance cycles, that the read pointer of the master tracker has reached the certain position is determined. Or the cache address corresponding to the maximum advance position ahead of the read pointer of the data tracker is calculated in advance, and when the read pointer of the master tracker reaches the calculated cache address, that the read pointer of the master tracker has reached the certain position is determined.

Optionally, depending on the register correlation detection result, the instructions are scheduled statically to issue the type "0" instructions and the type "1" instructions simultaneously to the main pipeline and the early pipeline, respectively.

Optionally, when the read pointer of the data tracker points to a type "1" instruction, the number of consecutive type "1" instructions currently passed by the read pointer of the data tracker is counted to obtain a count value. When the distance difference between the read pointer of the master tracker and the first instruction of the consecutive type "1" instructions is less than "−1", the read pointer of the master tracker is incremented by one plus the count value to make the read pointer of the master tracker skip the instruction currently pointed by the read pointer of the data tracker. When the read pointer of the master tracker points to a type "0" instruction, the type "0" instruction is issued to the main pipeline. When the read pointer of the master tracker points to a type "1" instruction, the type "1" instruction is not issued.

Optionally, when the read pointer of the data tracker points to a type "1" instruction, the number of consecutive type "1" instructions currently passed by the read pointer of the data tracker is counted until the read pointer of the data tracker points to a first type "0' instruction to obtain a count value. When the distance difference between the read pointer of the master tracker and the first instruction of the consecutive type "1" instructions is less than "−1", and the counting has not completed, the read pointer of the master tracker stops incrementing by one and stops moving until the counting is completed, and then the read pointer of the master tracker is incremented by one plus the count value to make the read pointer of the master tracker skip the consecutive type "1" instructions to point to the first succeeding type "0" instruction.

Optionally, when the distance between the type "1" instruction and the type "0" instruction is less than a critical distance, a bubble generated in the early pipeline where the type "1" is executed in advance causes a bubble to be generated in the main pipeline where the type "0" instruction is executed later.

Optionally, when the type "1" instruction is a branch instruction, and a critical instruction is present, the operation of the critical instruction and the generation of the branch determination result are performed jointly to generate the branch determination result in advance.

Optionally, both the critical instruction and the branch instruction are decoded, and the operand required in the critical instruction execution and the other operands required in the branch instruction execution are used together to generate the branch determination result.

Optionally, when the read pointer of the data tracker points to a type "1" instruction or track point, the read pointer value of the data tracker is temporarily stored to allow the read pointer of the data tracker to continue to move and point to the succeeding type "1" instruction or track point. The distance between the read pointer of the master tracker and the temporarily stored read pointer of the data tracker is determined based on the first-in-first-out time sequence. When the distance reaches the maximum advance cycles, the instruction pointed by the read pointer of the data tracker issued to the early pipeline.

Optionally, when the read pointer of the data tracker points to a type "1" instruction or track point, the time point for issuing the type "1" instruction to the early pipeline is calculated based on the maximum advance cycles. The read pointer value of the data tracker and the calculated time point are temporarily stored to allow the read pointer of the data tracker to continue to move and point to the succeeding type "1" instruction or track point. Based on the first-in-first-out time sequence, it is determined whether the read pointer of the master tracker has reached the temporarily stored time point. When the temporarily stored time point is reached, the instruction pointed by the read pointer of the data tracker corresponding to the temporarily stored time point is issued to the early pipeline.

Optionally, the method further includes the following step. A read pointer of a look ahead tracker is used to point to the succeeding type "1" instruction or track point in advance ahead of the read pointer of the data tracker.

Optionally, each instruction in the primary instruction cache corresponds a track point in the track table such that the primary instruction cache and the track table are addressed by a primary instruction cache address (BN1) including a first address (BN1X) and a second address (BN1Y) to output the corresponding instruction and track point, respectively. The primary data cache is addressed by a primary data cache address (DBN1) including a first address (DBN1X) and a second address (DBN1Y) to output the corresponding data. Each memory block in a secondary cache corresponds to a row in an active table such that the secondary cache and the active table are addressed by a secondary cache address (BN2) including a first address (BN2X) and a second address (BN2Y) to output the corresponding memory block and tow in the active table, respectively.

Optionally, each secondary memory block includes a plurality of primary instruction blocks or primary data bocks. The upper portion of the second address (BN2Y) of the secondary memory block is a sub-block number. Each sub-block number corresponds a primary instruction block or primary data block. The lower portion of the second address (BN2Y) is the same as the second address (BN1Y or DBN1Y) of the primary instruction block or primary data block. The first address (BN2X) of the secondary memory block and the sub-block number together form a super address (BN2S) such that the secondary cache address (BN2) includes a supper address (BN2S) and a second address (BN1Y or DBN1Y) of the corresponding primary cache.

Optionally, each row of the active table also records a primary cache first address (BN1X) for all or a portion of one primary memory block in a plurality of primary memory blocks corresponding to the secondary memory block. The super address (BN2S) of the secondary cache address (BN2) is used to locate the primary cache first address (BN1X or DBN1X) corresponding to the secondary cache address (BN2) in the active table. The primary cache first address (BN1X or DBN1X) and the primary cache second address (BN1Y or DBN1Y) of the secondary cache address (BN2) together form a primary cache address (BN1 or DBN1).

Optionally, each row of the active table also records a secondary cache first address (BN2X) for the two secondary memory blocks before and after the secondary memory block. The secondary cache address (BN2) for a secondary memory block is used to locate the secondary cache addresses (BN2) of the two secondary memory blocks before and after the secondary memory block in the active table.

Optionally, each row of the active table also records a super address (BN2S). The first address (BN1X) of the primary instruction cache address is used to locate a corresponding super address (BN2S) in the track table. The super address (BN2S) and the second address (BN2Y) of the primary instruction cache address (BN1) together form a secondary cache address (BN2).

Optionally, the method also records the super address (BN2S) corresponding to the each row of the primary data cache. The first address (DBN1X) of the primary data cache address (DBN1) is used to locate the corresponding super address (BN2S). The super address (BN2S) and the second address (DBN2Y) of the primary data cache address (DBN1) together form a secondary cache address (BN2).

Optionally, both the main pipeline and the early pipeline include two front-end pipelines and one back-end pipeline. The two front-end pipelines are a current front-end pipeline and a target front-end pipeline interchangeably. When a branch instruction is executed in the current front-end pipeline, the primary cache address (BN1) of the branch target instruction is sent to the target front-end pipeline such that at the same time, the current front-end pipeline continues to execute the fall through instruction of the branch instruction and the subsequent instructions, the target front-end pipeline executes the target instruction of the branch instruction and the subsequent instructions. When the branch transfer decision result of the branch instruction indicates the branch transfer does not occur, the current front-end pipeline is sent to the backend pipeline to continue the execution. When the branch transfer decision result of the branch instruction indicates the branch transfer occurs, the target front-end pipeline is sent to the backend pipeline to continue the execution, and the target front-end pipeline is the new current front-end pipeline to continue the execution.

Another aspect of the present invention provides a cache system. The cache system includes at least one memory configured to store a program flow information which includes an instruction sequence information and an instruction distance information, and a track module configured to determine an instruction issuing time point based on the instruction sequence information and instruction distance information to achieve issuing multiple instructions.

Other aspects of the present invention may be understood and appreciated by those skilled in the art from the description, claims, and drawings of the present invention.

Beneficial Effects of the Disclosure

The system and method of the present invention provides a basic solution for a cache structure used by digital systems. Unlike the conventional cache systems that only load after cache miss, the system and method of present invention load the instruction cache and the data cache before the processor executes an instruction to avoid or sufficiently conceal cache misses and to improve the performance of the processor system.

According to the system and method of the present invention, the instructions are classified based on the execution cycles. The instruction that require more execution cycles are issued in advance such that the completion times for various instructions are as uniform as possible. Thus, the pipeline delay caused by the inter-instruction register correlation may be completely eliminated or partially concealed.

Further, with the system and method of the present invention, instructions of different execution cycles may be issued to the main pipeline and the early pipeline accordingly. The main pipeline does not execute instruction that require more execution cycles. So the main pipeline may skip those instructions that require more execution cycles to improve the execution efficiency of the main pipeline.

The system and the method of the present invention also provide a solution for the branch process. By executing the next instruction of the branch instruction and the branch target instruction at the same time in two front-end pipelines, and selecting one result of the two front-end pipelines to send to the back-end pipeline depending on the branch transfer decision result generated by the execution of the branch instruction, the branch delay slot may be eliminated and the execution efficiency of the branch instructions are improved.

All of the above benefits are ultimately reflected in increasing the number of instructions executed per cycle (IPC) of the processor system.

Other advantages and applications of the present invention may be obvious to those skilled in the art.

BRIEF DESCRIPTION OF THE DRAWINGS

FIG. 1 illustrates a schematic diagram of a conventional pipeline technology;

FIG. 2 illustrates an exemplary data cache architecture according to the disclosed embodiments;

FIG. 3A illustrates an exemplary stride table according to the disclosed embodiments;

FIG. 3B illustrates a schematic diagram of an exemplary data access instruction in a loop according to the disclosed embodiments;

FIG. 4 illustrates an exemplary process of determining whether a base address register update is completed according to the disclosed embodiments;

FIG. 5A illustrates a schematic diagram of an exemplary pipeline using advance base address technique according to the disclosed embodiments;

FIG. 5B illustrates a schematic diagram of another exemplary pipeline using advance base address technique according to the disclosed embodiments;

FIG. 12 illustrates a schematic diagram of another exemplary pipeline architecture for the processor systems according to the disclosed embodiments;

FIG. 13A illustrates a state transition diagram of an exemplary finite state machine according to the disclosed embodiments;

FIG. 13B illustrates a state transition diagram of another exemplary finite state machine according to the disclosed embodiments;

FIG. 14A illustrates executing an exemplary data read instruction according to the disclosed embodiments;

FIG. 14B illustrates an exemplary worst case of executing a data read instruction according to the disclosed embodiments;

FIG. 14C illustrates another exemplary worst case of executing a data store instruction according to the disclosed embodiments;

FIG. 15 illustrates a schematic diagram of an exemplary pipeline when skipping a branch instruction according to the disclosed embodiments;

FIG. 22A illustrates a schematic diagram of an exemplary pipeline containing two front-end pipelines according to the disclosed embodiments;

FIG. 22B illustrates a schematic diagram of another exemplary pipeline containing two front-end pipelines according to the disclosed embodiments;

BEST MODE OF THE DISCLOSURE

Figure 20:
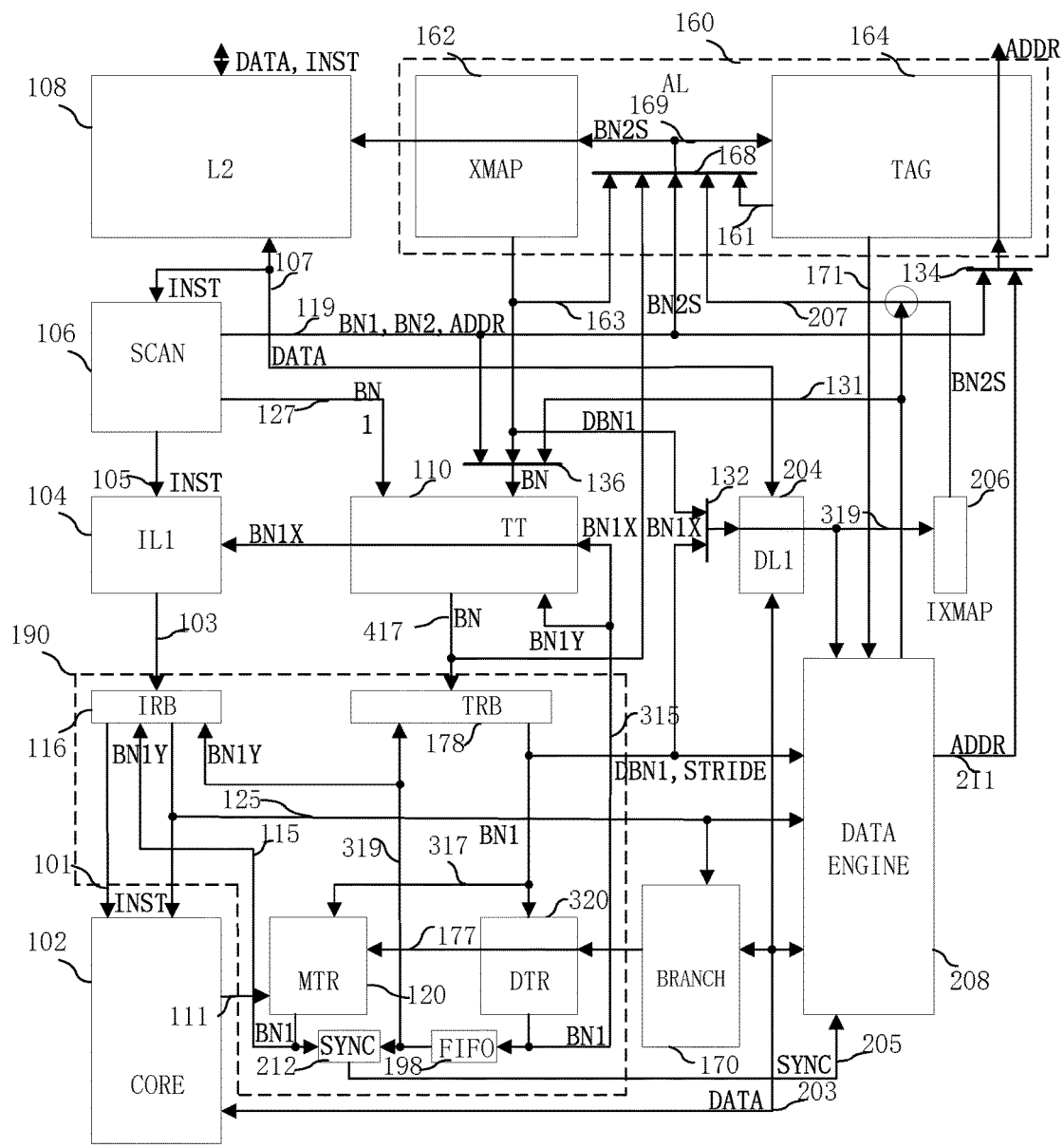
FIG. 20 illustrates another exemplary two-level cache system according to the disclosed embodiments.

FIG. 20 shows the best mode of the present disclosure.

Embodiments of the Disclosure

The high performance cache system and method of the present invention are described in further detail below with accompanying drawings and exemplary embodiments. The advantages and features of the present invention will become more apparent from the following descriptions and the claims. It should be understood that the drawings are in a extremely simplified form and use non-precise proportions only to facilitate and clearly illustrate the purpose of the embodiments of the inventions.

It should be noted that, in order to clearly illustrate the contents of the present invention, various embodiments of the present invention are described to further explain various implementations of the present invention. The various embodiments are exemplary and the present invention is not limited to these embodiments. Further, for the purpose of simplicity of explanation, the contents already mentioned in the preceding embodiments are often omitted in the succeeding embodiments. Thus, the contents not mentioned in the succeeding embodiments can be referred to the preceding embodiments accordingly.

Although the embodiments of the present invention may be modified, substituted, or extended in various forms, the specification sets forth a plurality of specific illustrations of the embodiments with detail descriptions. It should be understood that the inventors' point is not to limit the present invention to the certain embodiments described in the specification. On the contrary, the inventors intend to protect the improvements, equivalent substitutions, and modifications made without departing from the spirit and scope of the claims of the present invention. The same component labels may be used in all drawings to refer to the same or similar parts.

The instruction address of the present invention refers to the memory address of the instruction in the main memory. That is, the instruction can be found at the address in the main memory. For the purpose of illustration simplicity, the virtual addresses are assumed to be equal to the physical addresses. The methods described in the specification are applicable to the cases where address mapping is required. In the present invention, a current instruction refers to an instruction that is currently being executed or retrieved by the processor core. The current instruction block refers to an instruction block that contains instructions currently being executed by the processor.

In the present invention, a branch instruction refers to any suitable form of instructions that causes the processor core to change the execution flow (for example, non-sequential execution of instructions or micro operations). A branch instruction address refers to an instruction address of the branch instruction itself, which includes an instruction block address and an instruction offset address. A branch target instruction refers to a target instruction to which the branch transition caused by the branch instruction is directed. A branch target instruction address refers to an instruction address of the branch target instruction. A current data address refers to a data address generated by the data access instruction currently being executed or completed. The current data address is always correct. A next data address refers to a predicted data address for next execution of the data access instruction. The next data address may or may not be correct.

According to the technical solution of the present invention, a difference between the data addresses of two adjacent executions of a same data access instruction, i.e., a data stride, may be used to calculate a predicted data address (abbreviated as stride data address) for the next execution of the data access instruction. The data corresponding to the predicted data address may be placed into the data cache to avoid data cache miss. Further, the data may be provided to the processor in advance to cover the time to read the data cache. This method is referred to as stride technique in the present invention.

FIG. 2 illustrates an exemplary data cache architecture according to the present disclosure. As shown in FIG. 2, the processor system includes a processor core 102, a primary instruction cache 104, a primary instruction tag memory 144, a scanner 106, a primary data cache 204, a primary data tag memory 244, a track table 110, a master tracker 120, a data tracker 320, adders 216 and 218, and selectors 202 and 210. As used herein, "primary" may refer to "level 1" or "L1". For example, the primary instruction cache 104 may be referred as level 1 (L1) instruction cache; the primary instruction tag memory 144 may be referred as L1 instruction tag memory; the primary data cache 204 may be referred as L1 data cache; and the primary data tag memory 244 may be referred as L1 data tag memory.

In one embodiment, the rows in the primary instruction tag memory 144 correspond to the primary instruction block in the primary instruction cache 104, and each row stores a block address of the corresponding primary instruction block. The rows in the primary data tag memory 244 correspond to the primary data block in the primary data cache 204, and each row stores a block address of the corresponding primary data block.

In one embodiment, a first address (BNX or DBNX) and a second address (BNY or DBNY) may be used to refer to the location information of the instruction or data in the primary instruction cache or primary data cache. A BN1X (or DBN1X) and a BN1Y (or DBN1Y) may be combined to form a BN1 (or DBN1) address to directly access the primary instruction cache 104 (or the primary data cache 204). For example, BN1X may be used to refer to the primary block number (i.e., the row number of the primary instruction tag memory 144) of the instruction block where the instruction is located, and BN1Y may be used to refer to the offset within the primary instruction block of the instruction. DBN1X may be used to refer to the primary block number (i.e., the row number of the primary data tag memory 244) of the data block where the data is located, and DBN1Y may be used to refer to the offset within the primary data block of the data.

Thus, in one embodiment, a row in the track table 110, an instruction block in the primary instruction cache 104, and a row in the primary instruction tag memory 144 correspond to each other, and are pointed by the same BN1X. Track points in the track correspond to the instructions in the corresponding primary instruction block, and are pointed by the same BN1Y. A data block in the primary data cache 204 corresponds to a row in the primary data tag memory 244, and is pointed by the same DBN1X.

In one embodiment, the track table 110 includes a plurality of tracks. Each track corresponds to a primary instruction block in the primary instruction cache 104. Each track includes a plurality of track points. A track point is an entry in the track table 110, corresponding to at least one instruction in the corresponding primary instruction block. The address corresponding to each track point increases from left to right. Further, at the end of each row (I.e., each track) in the track table 110, one extra entry (i.e., the ending track point) may be added to store the location of the next track to be executed sequentially.

Each track point in the track table 110 includes an instruction type field (TYPE), a validity bit field (V), an address field, and a stride information field. The instruction type stored in the instruction type field may be a branch instruction, a data access instruction, and other types of instructions. The branch instructions may be further divided into, for example, unconditional direct branch instructions, conditional direct branch instructions, unconditional indirect branch instructions, and conditional indirect branch instructions. The track point corresponding to a branch instruction is referred to as a branch point. Data access instructions may be further divided into, for example, data read instructions and data store instructions. The track point corresponding to a data access instruction is referred to as a data point.

For branch points, the address field includes BN1 or PC. Whether the address field contains BN1 or PC may be determined by certain indication (for example, further differentiated by the instruction type field). BN1 is the location information of the branch target instruction, which corresponds to the branch instruction, in the primary instruction cache 104. BN1 stored in the branch point may be used to locate the branch target instruction corresponding to the branch instruction in the primary instruction cache 104, and to locate the track point corresponding to the branch target instruction in the track table 110. PC is the branch target address corresponding to the branch instruction.

For data points, the trace address field includes DBN1 or data address. Whether the trace address field contains DBN1 or data address may be determined by certain indication (for example, further differentiated by the instruction type field). DBN1 is the location information of the data, which corresponds to the data access instruction, in the primary data cache 204. DBN1 stored in the data point may be used to locate the data corresponding to the data access instruction in the primary data cache 204. The data address is the address of the data accessed by the data access instruction.

The validity bit field stores the current state of the data access instruction. Different states determine different data address prediction methods. Stride information field is used to store a data stride corresponding to the data access instruction or a pointer to the memory entry where the data stride is located. For the convenience of description, the stride information field contains only data stride in various embodiments.

It should be noted that because a track point cannot be a branch point and a data point at the same time, the instruction type field may be used to differentiate between branch instructions and data access instructions, and the remaining memory space in the track point may be used and shared by other fields of branch points and data points.

As shown in FIG. 2, the scanner 106 inspects the instruction blocks that are populated from the lower level memory (e.g., secondary instruction cache) to the primary instruction cache 104, and extracts the track point information to fill the corresponding entries in the track table 110 so that a track corresponding to the primary instruction block is created in the track table 110. When creating the track, BN1X is first generated by a substitution module (not shown in FIG. 2) to point to an available track. In one embodiment, the substitution module 124 may determine the available track by using a substitution algorithm, such as a LRU algorithm.

When the instruction block is loaded from the lower level memory to the primary instruction cache 104 through the scanner 106, the scanner 106 calculates the branch target address of any branch instruction contained in the instruction block. The calculated branch target address is sent to the primary instruction tag memory 144 to find a match for the instruction block address stored in the primary instruction tag memory 144 to determine whether the branch target is already stored in the primary instruction cache 104.

When a match is found, BN1X corresponding to the matched entry is obtained, and the lower bits of the branch target instruction address may be used as BN1Y. Thus, BN1 corresponding to the branch target instruction is obtained to combine with the instruction type of the branch instruction to fill the branch point as the track point content. When a match is not found, the instruction block where the branch target instruction is located has not been loaded into the primary instruction cache 104. Then, the instruction block where the branch target instruction is located may be loaded from the lower level memory to the instruction block location in the primary instruction cache 104 pointed by BN1X which is determined by the substitution algorithm (e.g., LRU algorithm). The lower bits of the branch target instruction address may be used as BN1Y. Thus, BN1 corresponding to the branch target instruction is obtained to combine with the instruction type of the branch instruction to fill the branch point as the track point content. Alternatively, the branch target instruction address and the instruction type of the branch instruction may be combined to fill the branch point as the track point content. In this case, the branch target instruction is not stored in the primary instruction cache 104.

Specifically, the scanner 106 inspects each instruction retrieved from the lower level memory to extracts certain information, such as instruction type, instruction source address, and branch offset of the branch instruction. A branch target address may be calculated based on the extracted information.

For a direct branch instruction, a branch target address may be obtained by combining the block address of the instruction block where the instruction is located, the offset of the instruction in the instruction block, and the branch offset. The instruction block address may be read from the primary instruction tag memory 144 and may be directly sent to the adder of the scanner 106. Alternatively, a register may be added to the scanner 106 to store the current instruction address. As such, the primary instruction tag memory 144 is not required to send instruction block address for each branch instruction in the same instruction block.

In one embodiment, the branch target address of a direct branch instruction is generated by the scanner 106 while the branch target address of an indirect branch instruction is generated by the processor core 102.

When the scanner 106 finds data access instructions while inspecting an instruction block, corresponding data points may be created in the corresponding tracks. In one embodiment, the length of the validity bit field in the data point has two bits. "00" in the validity bit field indicates an invalid state (IV). In this case, the contents in the address field and the stride information field are invalid. "01" in the validity bit field indicates a learning state (LE). In this case, the value in the address field is DBN1, corresponding to the data address, and the value in the stride information field is invalid. "11" in the validity bit field indicates a prediction state (SR). In this case, the value in the address field is DBN1 (abbreviated as stride DBN1), corresponding to the next data address (stride data address), and the value in the stride information field is valid.

Therefore, when creating a data point, the validity bit field is set to "00" to enter the IV state. When the data point is first executed, DBN1, corresponding to the current data address, is obtained. Next, the validity bit field is changed to "01" to enter the LE state. When the data point is executed again, the data stride may be calculated. The next data address may be calculated based on the data stride so that stride DBN1 is obtained as before. Next, the validity bit field is changed to "11" to enter the SR state. Subsequently, the data point remains in the SR state.

In addition, in certain instruction set architecture (ISA), direct addressing may be used to generate the data address of data access instruction. That is, the data address is an immediate value, or the data address is the sum of the instruction address and an immediate value. For such instruction set architecture, the immediate value may be extracted as the data address, or the instruction address and the extracted immediate value may be combined by the adder in the scanner 106 to generate the data address. The data address is then sent to the primary data tag memory 244 to find a match.

When a match is found, DBN1X corresponding to the matched entry is obtained, and the lower bits of the data address may be used as DBN1Y. Thus, DBN1 corresponding to the data access instruction is obtained to combine with the instruction type to fill the data point as the track point content. When a match is not found, the data address is sent to the lower level memory (e.g., the secondary data cache) to obtain the corresponding data block to fill the primary data block pointed by DBN1X which is determined by a substitution algorithm (e.g., LRU algorithm). The lower bits of the data address may be used as DBN1Y. Thus, DBN1 corresponding to the data access instruction is obtained to combine with the validity bits "11", the data stride "0", and the instruction type to fill the data point as the track point content such that the corresponding data address is always either the immediate value or the addition result each time the data point is executed.

In the present invention, the track point address of the track point itself is associated with the instruction address of the instruction represented by the track point. The branch instruction track point includes the track point address of the branch target. The track point address is associated with the branch target instruction address. A plurality of consecutive instructions in the primary instruction cache 104 may form a primary instruction block. A plurality of consecutive track points that correspond to the plurality of consecutive instruction may form a track.

The primary instruction block and the corresponding track are indicated by a same primary block number BN1X. The track table 110 contains at least one track. The total number of track points in a track may be equal to total number of entries in one row of the track table 110. Alternatively, the total number of track points may also include the end track point. Thus, the track table 110 becomes a table where a branch instruction is represented by the track table entry address which corresponds to the branch source address and the content of the entry address which corresponds to the branch target address Further, when a certain primary instruction block is replaced, the branch target BN1 of the branch point in the other track table row in which the branch target is to be branched may be replaced by the corresponding PC found in the primary instruction tag memory 144 so that the row may be written by the other instruction row without causing an error.

The master tracker 120 has the same configuration as the data tracker 320. The master tracker 120 includes a register 112, an incrementer 114, and a selector 118. The data tracker 320 includes a register 312, an incrementer 314, and a selector 318.

The format of the read pointer 115 (i.e., the output of the register 112) of the master tracker 120 is BN1X, BN1Y. BN1X selects a row in the track table 110 and a corresponding memory block in the primary instruction cache 104, and BN1Y selects an entry in the row and a corresponding instruction in the memory block. That is, the read pointer 115 points to a track point in the track table 110, which corresponds to the instruction to be executed (i.e., the current instruction) by the processor core 102, and reads the track point contents to send through the bus 117 to the selector 118 of the master tracker 120 and the selector 318 of the data tracker 320, respectively.

At the same time, the read pointer 115 addresses the primary instruction cache 104 and reads out the current instruction for execution by the processor core 102. Alternatively, the corresponding instruction block may be addressed by BN1X in the read pointer 115, and the corresponding instruction may be addressed by the instruction offset address (PC offset) output by the processor core 102, i.e., the lower portion of the instruction address, for execution by the processor core 102. In the present specification, the former method (the instruction is addressed to the primary instruction cache 104 by the read pointer 115 alone) will be used primarily for illustration. When necessary, the latter method (the instruction is addressed to the primary instruction cache 104 by the combination of the read pointer 115 and the instruction offset address) will be used to provide additional description.

The register 112 of the master tracker 120 is controlled by a stepping signal 111 sent from the processor core 102. The stepping signal 111 is a feedback signal provided by the processor core 102 to the master tracker 120. The stepping signal is always "1" when the processor core 102 is in normal operation, and updates the register 112 in the master tracker 120 every clock cycle so that the read pointer 115 points to a new entry in the track table and a new instruction in the primary instruction cache 104 for execution by the processor core 102. When the processor core 102 is operating abnormally and the pipeline needs to be stopped or a new instruction may not be executed, the stepping signal is "0". In this case, the register 112 is stopped updating, the master tracker 120 and the read pointer 115 remain unchanged, the primary instruction cache 104 halts providing new instructions to the processor core 102.

When the instruction type in the content of the track point read from the bus 117 is decoded by the controller (not shown) to indicate that the instruction is not a branch instruction, the controller controls the selector 118 to select BN1X value derived from the register 112 and BN1Y value incremented by 1 by the incrementer 114, which are sent back to the register 112 as new BN1. After the register 112 is updated under the control of the effective stepping signal 111, the read pointer 115 points to the next track point on the right side of the same track where the original track point is located and reads the next instruction from the primary instruction cache 104 for execution by the processor core 102.

When the instruction type in the content of the track point read from the bus 117 is decoded by the controller (not shown) to indicate that the instruction is a branch instruction, the track point contents also contain the location information (BN1 or PC) of the branch target track point accordingly.

When the controller determines the location information is PC, the block address portion of the PC value is sent to the primary instruction tag memory 144 to find a match. When a match is found, BN1X corresponding to the matched entry is obtained, and the lower bits of the PC value is BN1Y so that BN1 corresponding to the branch target instruction is written back to the branch point. When a match is not found, the instruction block where the branch target instruction is located is loaded from the lower level memory to the instruction block pointed by BN1X which is determined by the substitution algorithm (e.g., LRU algorithm) in the primary instruction cache 104, and the lower bits of the PC value is BN1Y so that BN1 corresponding to the branch target instruction is written back to the branch point.

Thus, when the read pointer 115 points to a branch point, it is always BN1 that is read from the track table 110 and is placed onto the bus 117 eventually. At this time, the TAKEN signal 113 is generated when the branch instruction is executed by the processor core 102 and indicates whether the branching occurs. The TAKEN signal 113 controls the selector 118 to make selection. When the TAKEN signal 113 is "1", the branching occurs and BN1 output by the track table is sent back to the register 112. When the stepping signal 111 is valid (the value is "1"), the register 112 is updated so that the value of the register 112 in the next cycle is updated to BN1. That is, the read pointer 115 points to the track point corresponding to the branch target instruction, and the branch target instruction is read from the primary instruction cache 104 for execution by the processor core 102.

When the TAKEN signal 113 is "0", the branching does not occur. BN1X output by the register 112 and BN1Y of the register 112, which is incremented by 1 by the incrementer 114, are sent back to the register 112. When the stepping signal 111 is valid (the value is "1"), the register 112 is updated so that the register 112 value is incremented by 1 in the next cycle. That is, the read pointer 115 points to the next track point on the right side, and the corresponding instruction is read from the primary instruction cache 104 for execution by the processor core 102. When the stepping signal 111 is invalid, the register 112 remains unchanged and continues to wait for the valid stepping signal 111 to get updated.

Further, for unconditional branch point, the selector 118 may make selection regardless of the TAKEN signal 113. Instead, the controller directly controls the selector 118 to select BN1 from the track table 110 to send to the register 112. The register 112 is updated as before. The end track point may be considered as an unconditional branch point. The branch target track point is the track point corresponding to the first instruction in the next instruction block of the sequential address. Thus, when the read pointer 115 of the master tracker 120 moves to the end track point, the controller directly controls the selector 118 to select BN1 of the first instruction of the next instruction block to update the register 112 so that the read pointer 115 of the master tracker 120 points to the correct next track point.

The read pointer 315 of the data tracker 320 (i.e., the output of the register 312) has a format of BN1Y, which is used to point to a track point of the track pointed by BN1X in the read pointer. The contents of the track point are read and sent to the bus 317. The instruction type and the validity bit information of the data point on the bus 317 are decoded by the controller to control the selector 318 and the register 312.

When the type information on the bus 317 is decoded by the controller as the non data access type, the selector 318 selects the output of the incrementer 314 to store into the register 312. The read pointer 315 points to and reads the next entry in sequence of the same track row in the track table 110 until the read pointer 315 points to a data point such that the read pointer 315 points to the track point which corresponds to the instruction not executed by the processor core 102 ahead of the read pointer 115.

When the type information on the bus 317 is decoded by the controller as the data access type, the next step is to check the validity bits value. When the validity bits value is "00" (IV state), this indicates that the corresponding data access instruction has not been executed by the processor core 102. Thus, the register 312 stops updating, causing the read pointer 315 to pause. When the value of the read pointer is equal to the value of BN1Y in the read pointer 115, the processor core 102 executes the data access instruction, generates the current data address to be output through the bus 209.

The current data address is selected by the selector 210 and is sent to the primary data tag memory 244 to find a match. When a match is found, DBN1X corresponding to the matched entry is obtained and the lower bits of the current data address is used as DBN1Y to obtain DBN1 corresponding to the current data address. After selected by the selector 202, the new data bits and the new validity bits value "01" together are written back to the data point so that the data point enters into the LE state. When a match is not found, the data block corresponding to the current data address has not been loaded into the primary data cache 204. Then the data block corresponding to the current data address is loaded from the lower level memory to the data block pointed by DBN1X which is determined by the substitution algorithm (e.g., LRU algorithm) in the primary data cache 204. The lower bits of the current data address is used as DBN1Y to obtain DBN1 corresponding to the current data address. After selected by the selector 202, the new data bits and the new validity bits value "01" together are written back to the data point so that the data point enters into the LE state.

At the same time, the data corresponding to DBN1 is sent to the processor core 102 for use. When the data point enters into the LE state, the controller controls the register 312 to continue to update so that the read pointer 315 moves to the next data point as before.

When the read out validity bits value is "01" (LE state), the corresponding data access instruction has been executed only once by the processor core 102 so that the register 312 stops updating, causing the read pointer 315 to pause. When the value of the read pointer 315 is equal to the value of BN1Y in the read pointer 115, the processor core 102 executes the current data access instruction and generates the current data address (i.e., the data address when the data access instruction is executed for the second time).

A data stride may be calculated based on the current data address and the last data address. Specifically, DBN1X in DBN1, which is originally stored in the data point, may be addressed to the primary data tag memory 244. The data block address is read out and combined with DBN1Y in DBN1 to form a data address (i.e., the last data address) corresponding to the last (i.e., the first) execution of the data point. The data stride may be obtained by subtracting the last data address from the current data address.

The current address is then converted to DBN1 as described above and written back to the data point along with the new validity bits value "11" and the data stride so that the data point enters into the SR state. At the same time, the data corresponding to DBN1 is sent to the processor core 102 for use. When the data point enters into the SR state, the data stride may be used to calculate the next data address (stride data address).

For example, the next data address may be obtained by adding the current data address on the bus 209 and the data stride on the bus 317 by the adder 218. The next data address is converted to stride DBN1 as described before after being selected by the selector 210, and then written back to the data point through the bus 202. The SR state remains unchanged. In another example, DBN1 corresponding to the current data address on the bus 317 and data stride are added directly by the adder 216. When the boundary of DBN1Y is not exceeded, DBN1X in stride DBN1 and the DBN1X of the current data address are the same. The portion corresponding to DBN1Y in the addition result is the same as DBN1Y in stride DBN1. Thus, stride DBN1 is obtained and written back to the data point after being selected by the bus 202. The SR state remains unchanged.

From the above process, it is ensured that the data corresponding to the next data address has already been stored in the memory unit of the primary data cache 204, which is corresponding to DBN1 in the data point. Thus, the data cache miss may be avoided.

When the read validity bits value is "11", (SR state), then the corresponding data access instruction has been executed at least twice by the processor core 102. In this case, DBN1 stored in the data point corresponds to the next data address. DBN1 may directly read from the primary data cache 204 to provide the corresponding data to the processor core 102 for use. Because the read pointer 315 is ahead of the read pointer 115, it is possible to read the corresponding data from the primary data cache 204 when the data access instruction corresponding to the data point has not been executed by the processor core 102. This not only avoids the data cache miss, but also covers the time required for reading the data from the primary data cache 204. When the data has been read, the stride stored in the data point may be used as previously described to calculate the next data address (stride data address) and to write the corresponding stride DBN1 to the data point as previously described so that the corresponding data is ensured to be stored in the primary data cache 204. When the data point is in the SR state, the register 312 may continue to be updated.

When the read pointer 315 of the data tracker 320 points to the end track point, the movement is stopped. When a branching occurs or the read pointer 115 reaches the end track point, both selectors 118 and 318 select BN1 on the bus 117 to write into the registers 112 and 312 so that the read pointer 115 of the master tracker 120 points to the branch target track point or the first track point of the next track. The read pointer 315 also points to the track point by cooperating with BN1X of the read pointer 115. Thus, the read pointer 315 starts from the instruction (i.e., the track point pointed by the read pointer 115) being executed by the processor core 102, moves backward in advance, and repeats the above procedure.

In one embodiment, the branch points and the data points are stored in a same track table 110. Obviously, the table compression technique may be used to compress the track table according to the present disclosure to save memory space. For example, one such compressed track table may sequentially store the branch points and the data points, but not track points that are neither branch point nor data points. By creating and storing the relationship information between the locations of the branch points and the data points in the compressed track table and the locations of the branch points and the data points in the original track table, the read pointer of the tracker may point to the correct branch point or data point. Thus, the capacity of the track table may be reduced.

Of course, in another embodiment, the branch points and the data points are stored in two track tables. The master tracker and the data tracker may separately address the two track tables. In this case, the tracker table storing the branch points may only need to differentiate the track point types between the branch points and the non branch points, and the tracker table storing the data points may only need to differentiate the track point types between the data points and the non data points. Moreover, the table compression technique may be used to more effectively compress the two track tables to save more memory space. The detailed operation is similar to the previously described. For the convenience of illustration, the track tables containing both branch points and the data points are used to describe the present invention.

Further, for the data store instructions in the data access instructions, writing back to the data cache (or memory) may be delayed by adding a write cache. That is, the data addresses of the data store instructions do not have to be calculated in advance. Thus, data points may be created for both data read instructions and data store instructions. In this case, additional type bits may be needed to indicate whether a data point corresponds to a data read instruction or a data store instruction. Alternatively, data points may be created only for data read instructions. Data store instructions may be considered as other instructions. When data store instructions are considered as other instructions and the track table compression technique is used, the track points corresponding to data store instructions may not be stored in the compressed track table.

Because the data access instructions in the loop codes often have fixed differences between the data addresses before and after the current instruction, stride may be used to pre-compute the potential next data address (stride data address). However, in some special cases, the differences between the data addresses may change. In order to prevent errors from occurring, when a data point is in the SR state and the corresponding data access instruction is executed by the processor core 102 (i.e., BN1Y of the read pointer 315 is equal to BN1Y of the read pointer 115), the processor core 102 executes the data access instruction to generate the correct data address that may be checked against the previously calculated potential data address (or corresponding DBN1).

For example, after the processor core 102 generates the correct data address, the correct data address may be converted into DBN1 as previously described, and may be compared with DBN1 corresponding to the potential data address. When the comparison results are the same, the previously prediction is correct, and subsequent operations may continue normally (the data point remains in the SR state).

When the comparison results are not the same, the previously prediction is incorrect. At this point, when the processor core 102 has already used the incorrectly predicted data to continue the subsequent operations, the execution result of the processor core 102 in the corresponding pipeline may have to be cleared, and the correct data address may be converted into DBN1 as previously described to provide the corresponding correct data to the processor core 102 for use. At the same time, the correct DBN1 may be written back to the data point along with the validity bits value "01" so that the data point enters into the LE state. Thereafter, the controller controls the register 312 to continue to be updated such that the read pointer 315 moves forward until reaching the next data point.

In another example, DBN1 corresponding to the potential data address in the data point may be converted into the potential data address, and may be compared with the correct data address that is generated when the processor core 012 executes the data access instruction. Based on the comparison result, the same operation as in the previous example may be performed.

When a data access instruction is located in a multi-level loop, the corresponding data stride is the same each time the same iteration loop is executed, but the corresponding data stride may be different when different hierarchical loops are executed. For example, for a data access instruction in a two-level loop, the data address is incremented by "4" each time the inner loop is executed, i.e., the data stride is "4". However, the data address is incremented by "20" each time the outer loop is executed, i.e., the data stride is "20". At this time, a data stride of either "4" or "20" for the instructions may cause a certain number of incorrect data address predictions. According to the present disclosure, a stride table may be created. Based on the relationship between the branch instructions and the data access instructions, different data strides (i.e., separately store data strides in different loops for a same data access instruction) may be recorded for a same data access instruction. According to the execution of the loop, a corresponding data stride is provided to calculate the next data address so that the data address prediction is more accurate.

FIG. 3A illustrates an exemplary stride table according to the present disclosure. In one embodiment, the storage portion 331 of the stride table 362 includes a plurality of rows and a plurality of columns. Each column corresponds to a data point. Each row corresponds to a level of loop hierarchy. Assuming the storage portion 331 has N rows, it is possible to record in any one column at most N different data strides of the corresponding data points in at most N-level loop hierarchy.

FIG. 3B illustrates a schematic diagram of an exemplary data access instruction in a loop according to the present disclosure. A shown in FIG. 3B, instructions are arranged from left to right according to the address sequence. Instruction 357 is a data access instruction. Instructions 351, 353, and 355 are backward transfer branch instructions following instruction 357. Thus, each of these three instructions forms a loop between a corresponding branch target instruction and the instruction itself, respectively. As shown in FIG. 3B, a three-level nested loop is formed. The loop corresponding to the branch instruction 351 is the innermost loop, and the loop corresponding to the branch instruction 355 is the outermost loop. Thus, each data access instruction in the code section provides specific loop stride memory module respectively so that different data strides are provided when executing different levels of loop operations.

Returning to FIG. 3A, each column of the storage portion 331 in the stride table 362 corresponds to a data point. That is, each data point in the track table 110 corresponds to a column in the stride table 362, At this time, the storage portion 331 in the stride table 362 may have the same addressing mode as the track table 110. That is, BN1X of the read pointer 115 and BN1Y of the read pointer 315 may be used to point to a data point in the track table 110, and the two dimensional address (i.e., BN1X and BN1Y) may be converted into an equivalent one dimensional address to point to a column of the storage portion 331 in the stride table 362, which corresponds to the data point.

Thus, the data points in the track table 110 may not need the stride information field. Alternatively, a smaller storage portion 331 of the stride table 362 may correspond to a portion of data points in the track table 110, and may be substituted according to a certain substitution strategy (e.g., LRU algorithm). At this time, the stride information field for this portion of data points may store a stride pointer (SP) pointing to a column of the storage portion 331 in the stride table 362, and the stride information field for other data points may store a data stride. For the convenience of illustration, in one embodiment, the columns of the storage portion 331 in the stride table 362 may correspond to only a portion of data points in the track table 110.

In addition, in order to record the branch transfer information, a branch transfer field may be added to the branch points of the track table 110 to store the information about whether a branch transfer occurs when a branch point is last executed by the processor core 102. Further, the branch transfer field may only store the information about whether a branch transfer occurs when a backward transfer branch point is last executed by the processor core 102.

Obviously, such information may be stored in a separate table, having the same addressing mode as the track table 110. Further, the table compression technique may be used to compress the separate table to save memory space. For the convenience of illustration, in one embodiment, the information about whether a branch transfer occurs may be stored in the branch points of the track table 110.

According to the technical proposal of the present invention, it is possible to construct a branch decision word (BDW) from the last branch determination of N consecutive backward transfers after the data point, and to determine which data stride may be used at that point based on the BDW. Specifically, the BDW may be formed by concatenating the branch transfer fields in the branch points of the N backward transfers following the data access instruction in the track table 110. Alternatively, when the branch transfer fields are compressed and stored by a separate table, the branch determination values corresponding to the branch points of the N backward transfers following the data access instruction may be read out from the table and concatenated to form the BDW.

Because a loop of the program is caused by the backward transfer of a branch instruction, the branch instruction of the backward transfer is actually executed earlier than the execution of a data access instruction that is located inside the loop. Thus, the BDW may be used to clearly determine in which loop level the data access instruction is located so that the corresponding data stride is read for subsequent use.

In the case where a certain column of the storage portion 331 in the stride table 362 corresponds to the data access instruction 357 in the program as shown in FIG. 3B, and N (the width of the BDW) is equal to 3, assuming that the read pointer 315 of the data tracker 320 points to the data point 357 for the second time because the branch transfer of the branch instruction 351 occurs (the branch transfer information is "1"), the stride pointer (SP) is read and sent to the decoder 335 to be decoded to select a column of the storage portion 331 in the stride table 362. Because the branch instructions 353 and the 355 have not been executed, the corresponding branch transfer information is "0" so that the BDW is equal to "100".

The BDW is decoded by the priority decoder 333 to select one entry in the column of the storage portion 331 in the stride table 362. When the processor core 102 executes the data access instruction, a stride is calculated as previously described, and is stored into the selected entry as the entry content. When the read pointer 315 of the data tracker 320 points to the data 357 again and the BDW is still "100", the stride stored in the entry is read to calculate the next data address. Other entries in the column may also be created in the same way.

It should be noted that, according to the characteristics of nested loops, when the inner loop occurs, the stride corresponding to the inner loop is always used regardless of whether any outer loop occurred previously. Thus, the priority decoder 333 decodes the received BDW from left to right, and outputs the row of the storage portion 331 in the stride table 362 that is selected by the corresponding bit of the word once the first "1" is found. For example, the BDW "010" and the BDW "011" correspond to the same row of the storage portion 331 in the stride table 362.

It is further assumed that all entries of the column corresponding to the data 357 in the storage portion 331 of the stride table 362 have been stored with the corresponding strides. At this point, different strides may be output for different loop levels. For example, when the branch transfer of the branch instruction 351 always occurs, the BDW is always equal to "100", and the storage portion 331 in the stride table 362 outputs the stride of the BDW ("100") corresponding to the data point 357.

In another example, the branch transfer of the branch instruction 351 does not occur for a certain execution while the branch transfer of the branch instruction 353 occurs. When the read pointer 315 points to the data point 357, and BDW is equal to "010", the storage portion 331 in the stride table 362 outputs the stride of the BDW ("010") corresponding to the data point 357. Operations for other circumstances may similar.

In addition, once data address errors are found in the data address check, it indicates that the stride calculated last time is no longer correct. At this point, the content of the entry corresponding to the current BDW of the data point in the storage portion 331 in the stride table 362 may be updated as described previously so that the correct stride may be stored in the entry. Thus, the storage portion 331 in the stride table 362 may output different data strides corresponding to each data access instruction for different hierarchical loops, and may update the data stride in different hierarchical loops for each data access instruction as needed. This further improves the accuracy of the data addresses calculated in advance.

According to the technical solution of the present invention, the structures and applications of the stride table may be varied. In addition to the above described way in which the BDW is used, two more examples are given here. The first approach uses a first-in-first-out (FIFO) register. The other approach uses a register to record the branch instruction address of the last successful branch. The stride tables used by these two methods are common memory array. The rows correspond to the branch instructions while the columns correspond to data access instructions.

When a stride table and a track table 110 have the same size, the track table addresses may be used to directly access the stride table because each track table address represents an instruction and as long as the branch instruction address is identified as X address of the stride table and the data access instruction address is identified as Y address of the stride table. When a stride table and a track table 110 have different sizes, a stride table address may need to include a tag array like common memories so that the track table address BN1 may be mapped into the stride table address. Similarly, the branch instruction address I mapped into X address and the data access instruction address is mapped into Y address.

The first approach uses a first-in-first-out (FIFO) register. The entry content includes at least one data access instruction track table address BN1 and the data cache address DBN1 currently pointed by the instruction. When the information of a data access instruction is read from the track table by using the address BN1, and after DBN1 is used to read the data from the primary data cache 204 for use, BN1 and DBN1 are stored into the FIFO register. Other data access instructions may be stored into the FIFO register in the same way.

Each branch instruction is inspected by the system for branch transfer occurrence. When a certain branch instruction is determined to have branch transfer occurrence, the branch instruction address is sent to the stride table to read the corresponding row. Then, BN1 stored in the FIFO register is used to orderly read a corresponding entry in the previously selected row, which is the stride information for the branch transfer loop where the data access instruction is located.

DBN1 output by the FIFO register is added to the stride to obtain a next DBN1. The next DBN1 is written back to the entry in the track table 110 pointed by the data access instruction address BN1. The operation is repeated until the FIFO register is empty.

This approach postpones the calculation of the next DBN1 by adding the stride to the current DBN1 until the branch determination is made and the stride is known. In some cases, the new data may be written before the FIFO register is empty. To deal with this situation, two FIFO registers may be used to operate alternately. Optionally, each entry in the FIFO register includes a flag bit to indicate the first data access instruction in the loop and to inform the system that this entry and the subsequent entries need to use a new branch transfer occurrence to select a row in the stride table for the stride calculation.

The second approach stores the branch instruction address of the last branch occurrence into a register. The content of the register may be used to address the rows of the stride table. When the information of a data access instruction is read from the track table 110 at the address BN1, where DBN1 is used to read the data from the primary data cache 204 for use, BN1 is used as Y address to access the stride table to read the stride from the row pointed by the register. That is, the stride and DBN1 are added to obtain the next DBN1. DBN1 and the stride are stored to the entry pointed by BN1 in the track table 110. Other data access instructions may be handled in the same way.

Each branch instruction is inspected by the system for branch transfer occurrence. When a certain branch instruction is determined to have branch transfer occurrence, the branch instruction address is sent to the stride table to read the corresponding row. When the information about the data access instruction is read again, the address BN1 is used again as Y address to address the stride table.

The stride is read from the row pointed by the register, and is compared with the stride stored in the track table 110. When equal, the next DBN1 is trusted, and may be used to access the primary data cache 204. When not equal, the stride recorded in the entry in the track table is subtracted from the next DBN1, and the result is added with the stride read from the stride table to obtain the next DBN1, which may be used to address the primary data cache 204. The essence of this approach is to use the stride corresponding to the last branch occurrence to derive the next DBN1. But, before DBN1 is used, DBN1 may be verified with the stride of the last branch occurrence corresponding to the current data instruction.

Both approaches calculate the cache address required for the data access before the actual execution of the data access instruction. When the data has not been loaded into the primary data cache, both approaches allow sufficient time for the system to load the required data into the primary data cache to eliminate or partially conceal the penalty of cache misses.

Of course, there is a third approach which is similar to the second approach. That is, the entries of the track table store the last data access DBN1. Thus, when the last data access DBN1 is read in advance from the track table, BN1 is used as Y address to read the corresponding stride (at this point, the branch instruction address of the last branch occurrence points to a row in the stride table) from the stride table, and to add the stride to DBN1 to obtain the current DBN1, which may be used to address the primary data cache 204. Such approach may not be able to completely conceal the primary data cache misses, but may still reduce the access delay and power consumption as compared to the conventional data cache.

Loading the stride table is a reverse operation of reading the stride table. When the DBN1 that is calculated from the stride read from the stride table is proved to be incorrect by the validation logic, the difference between a correct DBN1 and an incorrect DBN1 is the difference between a correct stride and an incorrect stride. Such difference is added to the stride originally stored in the stride table to obtain the new stride value, which is written back to the stride table to update the stride table. The addressing when loading the stride table is the same as when reading the stride table.

In one embodiment, for any data access instruction, a data stride may be obtained after the data access instruction has been executed twice. The data stride may be used to calculate the next data address (stride data address). For the first and second executions, an early base (EB) address method may be used to calculate the data address in advance. Thus, even if a data access instruction is not included in a loop (i.e., a data access instruction that may be executed only once), the data address may still be obtained in advance and the corresponding data may be pre-fetched and sent to the processor core in advance so that the data cache misses may be reduced and the time to access the data cache may be partially or completely covered. In the present invention, such technique is called the early base (EB) technique. The data address calculated by using the EB technique is called the EB data address. The corresponding DBN1 is called the EB DBN1.

As described in the previous example, for a data access instruction with an immediate data address, the data pre-fetch may be performed when the scanner 106 inspects the instruction. For the data access instruction having the data address (e.g., the data address is calculated by adding an offset to the base address) calculated based on the base address (e.g., the value in the base address register), the value in the base address register may be used to calculate the data address only until the update to the base address register where the base address is located is completed (i.e., the base address register is updated to have the value when the processor core 102 executes the data access instruction).

According to the technical solution of the present invention, a data pipeline (L/S pipeline) that runs in parallel with the main pipeline of the processor core may be added to process the data access instructions so that the data addresses of the data access instructions may be calculated up to M cycles ahead, where M is greater than 0. Once the base address register is completely updated, the data pipeline may calculate the data addresses and pre-fetch the data so that the time to access the memory may be concealed. According to the technical solution of the present invention, as long as the registers used by the data access instruction and the M preceding instructions are correlated, the update completion time for the base address register may be determined up to M cycles ahead.

FIG. 4 illustrates an exemplary process of determining whether a base address register update is completed according to the present disclosure. In one embodiment, the data address calculation is at most 3 cycles ahead. That is, M is equal to 3. Thus, only the register used by the data access instruction and the three preceding instructions may be correlated. For other cases that the data address calculation is required to start more cycles ahead, similar approaches may be used for the implementation.

In one embodiment, in order to determine the correlation of the registers used in the instructions, a field to store the target register number may be added to each track point in the track table 110, and a field to store the base address register number may be added to each data point. The read pointer 315 may address the bus 317 to read the target register number and the base address register number. Alternatively, an instruction read buffer (IRB) may be added to store the instruction block pointed by BN1X in the read pointer 115. The read pointer 315 addresses the track point of the row in the track table 110, which is pointed by BN1X. At the same time, the read pointer 315 also addresses the instruction read buffer for the corresponding instruction, and reads the target register number of the instruction and the base address register number of the data access instruction. For the convenience of illustration, in one embodiment, it is assumed that each instruction has at most one target register and the target register number is stored in the track table 110.

Thus, as the read pointer 315 of the data tracker 320 moves, the target register number in the track point through which the read pointer 315 traverses is sequentially read out through the bus 317 and is sent to the register 402 through the bus 401. The registers 402, 404 and 406 may form a FIFO structure. Thus, the registers 402, 404 and 406 store the target register numbers stored in the first, second, and third track points, respectively, before the track point currently pointed by the read pointer 315.

The outputs of these three registers are fed to one input of the comparators 412, 414, and 416, respectively. The base address register number of the track point currently pointed by the read pointer 315 is sent to the other input of the three comparators 412, 414, and 416, respectively, through the bus 137. The three comparators 412, 414, and 416 compare their respective two inputs and send the comparison results to the encoder 408 for encoding. The encoding result is the number of cycles in which the data addresses may be calculated in advance.

Specifically, when the output of the comparator 412 is "1", the first instruction preceding the data access instruction may update the base address register. Thus, the data address may not be calculated in advance. When the output of the comparator 412 is "0" and the output of the comparator 414 is "1", the second instruction preceding the data access instruction may update the base address register. Thus, the data address may be calculated in advance by one cycle. When the outputs of the comparators 412 and 414 are "0" and the output of the comparator 416 is "1", the third instruction preceding the data access instruction may update the base address register. Thus, the data address may be calculated in advance by two cycles. When the outputs of the comparators 412, 414, and 416 are "0", all three instructions preceding the data access instruction may not update the base address register. Thus, the data address may be calculated in advance by three cycles.

As shown in the pipeline diagram in FIG. 1, when the SUB instruction uses the data read by the LOAD instruction as the source operand, the E stage of the SUB instruction may not start, as described previously, until the M2 stage of the LOAD instruction is completed. That is, two bubbles are inserted.

FIG. 5A illustrates a schematic diagram of an exemplary pipeline using advance base address technique according to the present disclosure. After the advance based address technique is used, when the data access instruction LOAD may be executed in advance by three cycles, the M2 stage of the LOAD instruction and the I2 stage of the SUB instruction may be completed at the same time, as shown in the pipeline diagram in FIG. 5A. Thus, no bubbles may be inserted when executing the SUB instruction so that the overall performance of the processor system is improved.

In addition, as observed in FIG. 5A, because the LOAD instruction is executed in the data pipeline, the main pipeline is idle for one cycle accordingly. Thus, the SUB instruction in the main pipeline may be executed one cycle ahead of time so that the operation of the LOAD instruction is skipped completely in the main pipeline.

FIG. 5B illustrates a schematic diagram of another exemplary pipeline using advance base address technique according to the present disclosure. In the data pipeline, the LOAD instruction is executed in advance by three cycles. In the main pipeline, the ADD instruction enters into I2 stage at the same time as the SUB instruction enters into the I1 stage. As a comparison, the SUB instruction in FIG. 5B is executed one cycle ahead of the SUB instruction in FIG. 5A.

As shown in FIG. 5B, the M2 stage of the LOAD instruction in the data pipeline and the D stage of the SUB instruction in the main pipeline are completed at the same time. Thus, no bubbles may be inserted when executing the SUB instruction in the main pipeline. The total number of cycles for completely executing these three instructions is one cycle less than FIG. 5A so that the number of executed instructions per cycle (IPC) for the processor system is improved.

Figure 6:
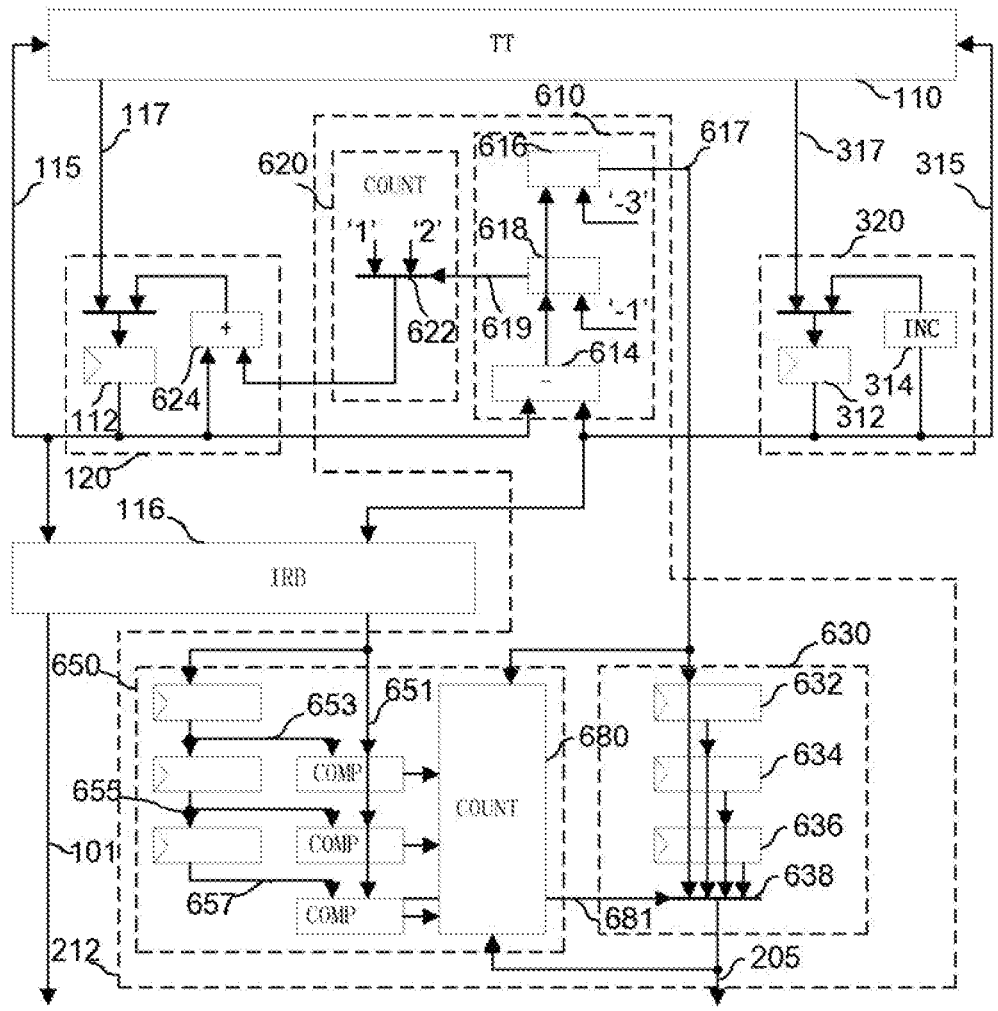
FIG. 6 illustrates an improved data cache architecture according to the disclosed embodiments.

The processor system as shown in FIG. 2 may be modified to implement the pipeline as shown in FIG. 5B. FIG. 6 illustrates an improved data cache architecture according to the present disclosure. For the convenience of illustration, in one embodiment, the data cache only includes a track table 110, a master tracker 120, a data tracker 320, and a newly added synchronization module 212, and other components are omitted. In one embodiment, the read pointer 115 of the master tracker 120 addresses the primary instruction cache 104 to read the instruction for execution by the processor core 102. In addition, it is assumed that the data access instruction calculates the data address in advance by a maximum of three cycles (M).

The synchronization module 212 has four parts, including a point-in-time detection module 610, a counting control module 620, a issuing control module 630, and a correlation detection module 650. In the point-in-time detection module 610, the subtractor 614 subtracts BN1 of the read pointer 115 from BN1 of the read pointer 315 to obtain a number of instructions separating between the instruction (current instruction) currently executed by the processor core 102 and the data access instruction, which is then fed into the comparators 616 and 618 to compare with constants "−3" and "−1".

Specifically, for the comparator 616, when the difference between the read pointer 115 and the read pointer 315 is equal to "−3", the read pointer 315 is ahead of the read pointer 115 by three track points, which corresponds to the maximum number of instructions "3" in advance in the present embodiment. At this point, the data access instruction is controlled to enter into the I stage in the data pipeline. When the difference between the read pointer 115 and the read pointer 315 is greater than "−3", the read pointer 315 is ahead of the read pointer 115 by less than three track points.

According to the technical solution of the present invention, the read pointer 315 is generally ahead of the read pointer 115. When the read pointer 115 moves close to the read pointer 315 (e.g., the distance is "3"), the execution of the data access instruction may start. However, occasionally, the branch occurrence may have the read pointer 115 directly updated to point to a location (e.g., the distance is "2", "1", or "0") closer to the read pointer 315. At this point, the execution of the data access instruction may start immediately.

Therefore, when the difference between the read pointer 115 and the read pointer 315 is greater than or equal to "−3", the data access instruction pointed by the read pointer 315 may enter into the I stage in the data pipeline. In addition, regardless of the distance between the read pointer 115 and the read pointer 315, as long as the data access instruction pointed by the read pointer 315 has already entered into the I stage in the data pipeline, the data access instruction may not be controlled to re-enter into the I stage in the data pipeline before the read pointer 315 points to the next data point.

At the same time, the comparator 616 outputs "1" to the counter 680 through the bus 617. The counter 680 samples the outputs, at that moment, of the three comparators in the correlation detection module 650. From the sampling, the information about whether there is any register dependency between the data access instruction and the three preceding instructions is obtained. The counter 680 encodes the obtained information to generate a control signal, and sends the control signal through the bus 681 to the selector 638 in the issuing control module 630.

In addition, the comparator 616 also outputs "1" through the bus 617 to the registers 632, 634, and 636 in the issuing module 630, and the selector 638. The registers 632, 634, and 636 output the signal from the bus 617 by delaying one, two, and three cycles, respectively. Thus, the four inputs of the selector 638 are the original signal of the bus 617, and the delayed signals of bus 617 by one, two, and three cycles. In this way, the selector 638 selects the output based on the selection signals obtained from the encoding of the correlation detection result to control whether the data access instruction may be issued in the D stage in the data pipeline (i.e., access the register stack in the D stage to acquire the base address register value for the data access instruction).

Similarly, for the comparator 618, when the difference between the read pointer 115 and the read pointer 315 is equal to "−1", the read pointer 315 is ahead of the read pointer 115 by one track point. That is, the processor core 102 has already executed the adjacent instruction preceding the data access instruction that is pointed by the read pointer 315. At this point, the read pointer 115 of the master tracker 120 may be incremented by "2" to skip the data access instruction following the instruction to directly point to the instruction following the data point. In other cases, the read pointer 115 of the master tracker 120 may be incremented by "1" to point to the next instruction following the current instruction.

In one embodiment, the correlation detection module 650 determines the register dependency of the data point and the preceding instructions. However, because the correlation detection is needed to determine the register dependency for the instructions located in different pipeline stages in the modern pipeline technology, the existing correlation determination logic (e.g., bypass logic) may be used to determine the register dependency in the present invention in order to reduce hardware cost.

In addition, because the read pointer 315 of the data tracker 320 moves to the data point ahead of the read pointer 115 of the master tracker 120, when the data access instruction corresponding to the data point is ready to be issued ahead of time, the instructions that require the correlation detection may have not completely entered into the main pipeline of the processor core 102. In this case, a register correlation detection logic may be used to determine the register dependency between the instructions (i.e., the instructions between the read pointer 115 and the read pointer 315) that have not entered the main pipeline and the data access instruction, and to encode the control signals to control the selector 638. Various embodiments according to the present disclosure may be referred to for specific implementation methods.

In this way, the control signal on the bus 681 may control the selection of the inputs of the selector 638. For example, when the register correlation determination logic detects no correlation between the data access instruction and the preceding instructions, the issue signal on the bus 617 may be output to issue the D stage of the data access instruction at the time point "−3" so that the data access instruction may fetch the data in advance by three cycles.

In another embodiment, when the register correlation determination logic detects no correlation between the data access instruction and the first preceding instruction, but the correlation between the data access instruction and the second preceding instruction, the issue signal output by the register 634 is selected. Because the value in the register 634 is obtained by delaying the signal on bus 617 by two cycles (i.e., after latching through the registers 632 and 634), the D stage of the data access instruction is issued at the time point "−1" so that the data access instruction may fetch the data in advance by one cycle.

In another embodiment, when the register correlation determination logic detects the correlation between the data access instruction and the first preceding instruction, the issue signal (delayed by three cycles) output by the register 636 is selected. In this case, the data access instruction may not fetch the data in advance.

When the comparison output of the comparator 618 is "successful" ("1"), the read pointer 115 has already reached or exceeded the "−1" time point. The "1" output from the comparator 618 is sent through the bus 619 to the counter control module 620 to control the selector 622 to select constant "2" as the output to be sent to the master tracker 120. When comparison output of the comparator 618 is "unsuccessful" ("0"), the read pointer 115 has not reached or exceeded the "−1" time point. The "0" output from the comparator 618 is sent through the bus 619 to the counter control module 620 to control the selector 622 to select constant "1" to be sent to the master tracker 120.

In the master tracker 120, an adder 624 may be used to replace the incrementer 114 as shown in FIG. 2. One input to the adder 624 comes from the register 612 and the other input comes from the counter control module 620. Thus, when the output of the comparator 618 is "somewhat unsuccessful", the counter control module 620 send "1" to the input of the adder 624 so that the read pointer 115 is incremented by one to point to the first track point following the original track point. The corresponding instruction is read and sent to, as described previously, the main pipeline for execution by the processor core 102.

When the comparison output of the comparator 618 is "somewhat successful", the counter control module 620 sends "2" to the input to the adder 624 so that the read pointer 115 is incremented by two to point the second track point following the original track point. The corresponding instruction is read and sent to, as described previously, the main pipeline for execution by the processor core 102, skipping the data access instruction (the data access instruction is executed in the data pipeline) corresponding to the data point to improve the performance of the main pipeline.

It should be noted that, in one embodiment, the time points at which the values are negative are used to more clearly express the meanings of the respective time points. Of course, in specific implementations, the BN1 value of the read pointer 115 may be subtracted from the BN1 value in the register 612. The result may be compared with the positive constants "3" and "1" in the comparators 616 and 618, respectively. The specifics of the process will not be repeated herein.

In order to take advantages of the methods according to the disclosed embodiments to use different pipelines to execute different types of instructions, the instructions may be divided into two categories: the instructions (hereinafter simply referred to as instruction of type "0") executed in the main pipeline and the instructions (hereinafter simply referred to as instruction of type "1") executed in the data pipeline. Specifically, in one embodiment, the data access instructions are type "1" instructions and the other instructions are type "0" instructions.

The scanner 106 inspects the instruction blocks to be loaded into the primary instruction cache 104 to determine whether the instructions are type "1" or type "0" and to store the type information in the corresponding track points in the track table 110. Thus, when the read pointer 115 addresses the primary instruction cache 104 to output the instruction to the processor core 102, the corresponding type information may be output from the track table 110 at the same time. Based on the type information, instructions are determined to be executed either in the main pipeline (when the type is "0") or in the data pipeline (when the type is "1").

The register dependencies between instructions may be further subdivided into the register dependency between type "0" instructions, the register dependency between type "1" instructions, the register dependency between the preceding type "1" instructions and the succeeding type "0" instructions, and the register dependency between the preceding type "0" instructions and the succeeding type "1" instructions.

For the first case, because the type "0" instructions are processed in the main pipeline, the register dependencies between the type "0" instructions may be detected by the bypass detection logic that exists in the main pipeline so that these instructions may be processed accordingly. Similarly, for the second case, the register dependencies between the type "1" instructions may be detected by the bypass detection logic that exists in the data pipeline so that these instructions may be processed accordingly.

For the third case, because the type "1" instructions are sent to the data pipeline in advance, the register dependencies between the preceding type "1" instructions and the succeeding type "0" instructions may be detected by the bypass detection logic so that these instructions may be processed accordingly.

For the fourth case, because the succeeding type "1" instructions are executed ahead of the preceding type "0" instructions, the existing bypass detection logic may not be able to determine the register dependencies. In this case, the correlation detection module 650 in the synchronization module 212 as shown in FIG. 6 may be able to detect the register dependencies between the preceding type "0" instructions and the succeeding type "1" instructions so that the issue time points for the type "1" instructions to enter the stage D in the data pipeline may be controlled.

Of course, for the case that the read pointer 115 and the instruction offset address are combined to address the primary instruction cache 104 (i.e., addressing by using BN1X in the read pointer 115 along with the instruction offset address output by the processor core 102) to read out the instructions for execution by the processor core 102, in addition to the modification of the master tracker 120 described above, the instruction address generator inside the processor core 102 may be modified accordingly, and the control signals from the time point detection module 602 may be received, so that the instruction address generator and the master tracker 120 may be incremented in synchronization to ensure that the instruction offset address of the outputs are correct.

Figure 7:
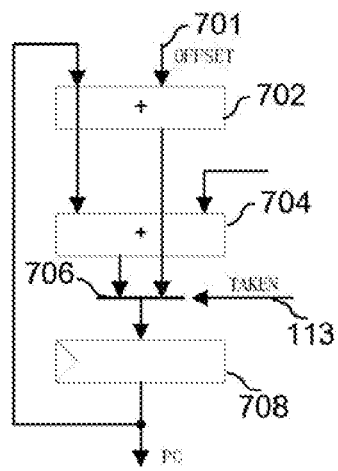
FIG. 7 illustrates an exemplary instruction address generator after the improvements according to the disclosed embodiments.

FIG. 7 illustrates an exemplary instruction address generator after the improvements according to the present disclosure. As shown in FIG. 7, the instruction address generator includes adders 702 and 704, a selector 706, and a register 708. These modules are implemented based on existing technologies. The register 708 stores the current instruction address (PC). The PC is sent to the adder 702 to be added to the branch offset 701 to obtain a branch target instruction address, which is sent to the selector 706 through the bus 703.

The other input of the selector 706 comes from the adder 704. The selector 706 is controlled by a TAKEN signal 113 to make selections. When the TAKEN signal 113 is "1", the branch transfer occurs, and the selector 706 selects the instruction address from the adder 702. When the TAKEN signal 113 is "0", no branch transfer occurs, and the selector 706 selects the instruction address from the adder 704. The output of the selector 706 is written to the register 708.

The difference between the instruction address generator according to the present disclosure differs from the conventional instruction address generator in that the adder 704 replaces the incrementer in the conventional instruction address generator (the incrementer is used to increment the instruction address PC by '1", i.e., the length of one instruction, to obtain the address of the next instruction in sequence). The one input of the adder 704 comes from the register 708, and the other input is the increment value ("1" or "2" as described previously) sent by the time point detection module 602.

In this way, depending on the number of the consecutive data access instructions following the current instruction (i.e., the instruction pointed by the PC in the register 708), the adder 704 adds a length of the corresponding number of instruction words to the current instruction address PC. When the TAKEN signal 113 is "0" at this point, the next instruction address may skip the consecutive number of data access instructions so that the same function as shown in FIG. 6 may be achieved.

According to the technical solution of the present invention, the one-level cache structure as shown in FIG. 2 may be improved and changed to a two-level cache structure to apply the stride technique and the EB technique at the same time for better performance. In this case, the validity bits in each data point may add another case where the validity bits value is "10", indicating that the data is in the EB state. In the EB state, the data address that is obtained by using the EB technique to calculate the address in advance is definitely correct.

Figure 8:
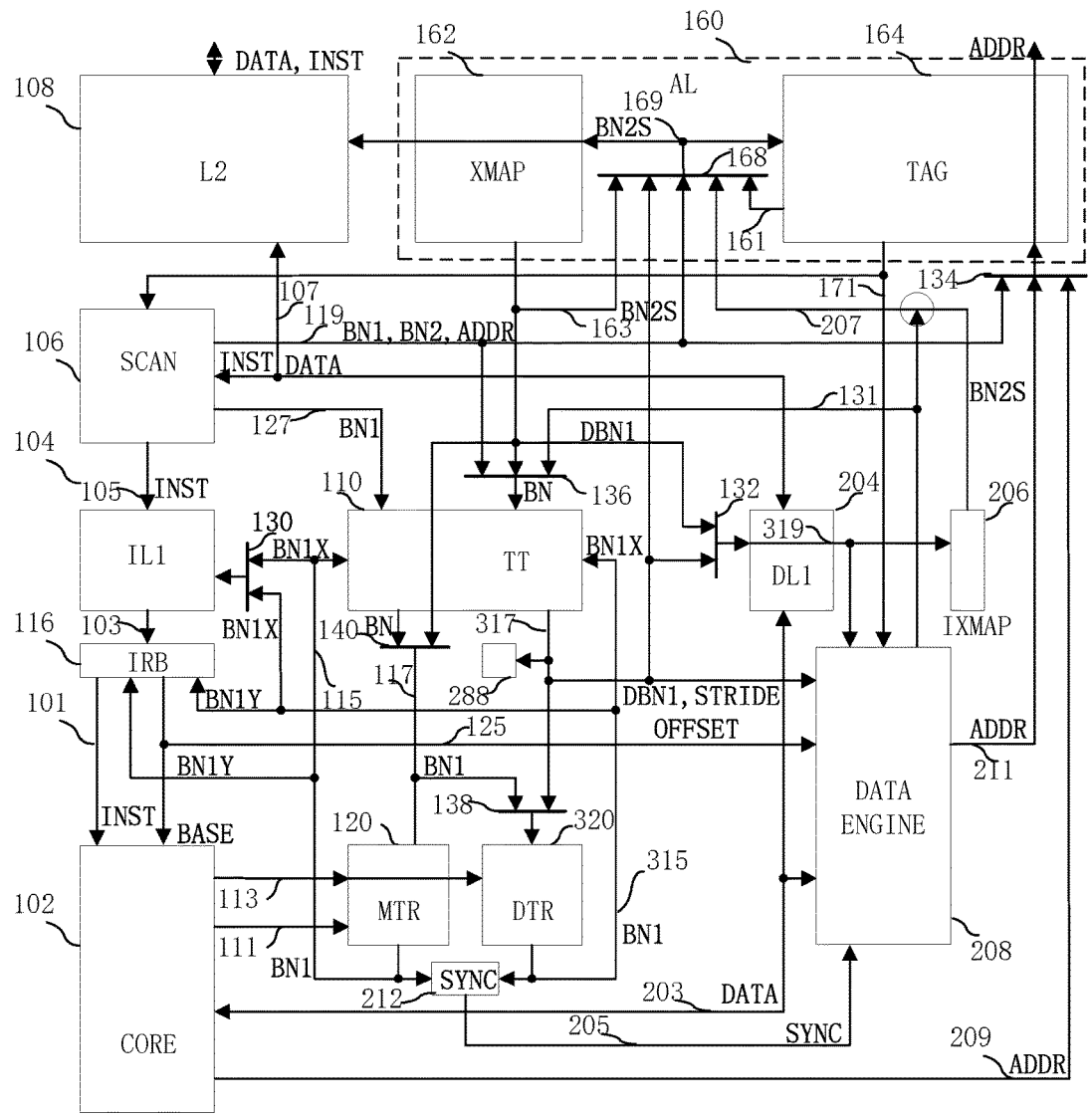
FIG. 8 illustrates an exemplary two-level cache system according to the disclosed embodiments.

FIG. 8 illustrates an exemplary two-level cache system according to the present disclosure. In one embodiment, the instructions and the data each have a separate one-level cache, and also share a common two-level cache. As shown in FIG. 8, the scanner 106, the primary instruction cache 104, the track table 110, the primary data cache 204, the master tracker 120, and the data tracker 320 are the same as shown in FIG. 2.

The processor core 102 is similar to the processor core as shown in FIG. 2. The difference is that the function for calculating the data address is moved from the processor core 102 to a data engine 208 as shown in FIG. 8, and the register stack or the base address register output (i.e., the base address register value) of the processor core 102 is sent to the data engine 208 through the bus 203. As shown in FIG. 8, new modules that are added include a secondary cache (L2 or level 2 cache) 108, an active table (AL) 160, an instruction read buffer (IRB) 116, a data engine 208, and a block number inverse mapping module (IXMAP) 206. As used herein, "secondary" may refer to "level 2" or "L2".

It should be noted that, in one embodiment, for the sake of clarity, the bidirectional bus 203 is used to transfer data between the processor core 102, the data engine 208, and the primary data cache 204. In the actual hardware implementation, two sets of unidirectional buses may be used to replace the bus 203 as specified to achieve the same functionality.

In addition, in order to better show the pipeline structure of the cache system of the present invention, only certain functions (e.g., the register value that is output from the processor core 102 is sent to the data engine 208) of the bus 203 are shown in the following embodiments.

The primary data cache 204 is a fully associative cache and the secondary cache 108 is a set associative cache. The secondary cache 108 is used to store instructions and data, and has an inclusion relationship with the primary instruction cache 104 and the primary data cache 204. That is, all the instructions in the primary instruction cache 104 and all the data in the primary data cache 204 have already been stored in the secondary cache 208.

According to the technical solution of the present invention, the first address BN2X and the second address BN2Y are used to represent the location information in the secondary cache 108 for the instruction or data. BN2X and BN2Y are combined to form BN2 to directly address the secondary cache 108. That is, BN2X is used to identify the memory block in the secondary cache 108, and BN2Y is used to identify the corresponding instruction or data in the memory block.

Figure 9A:
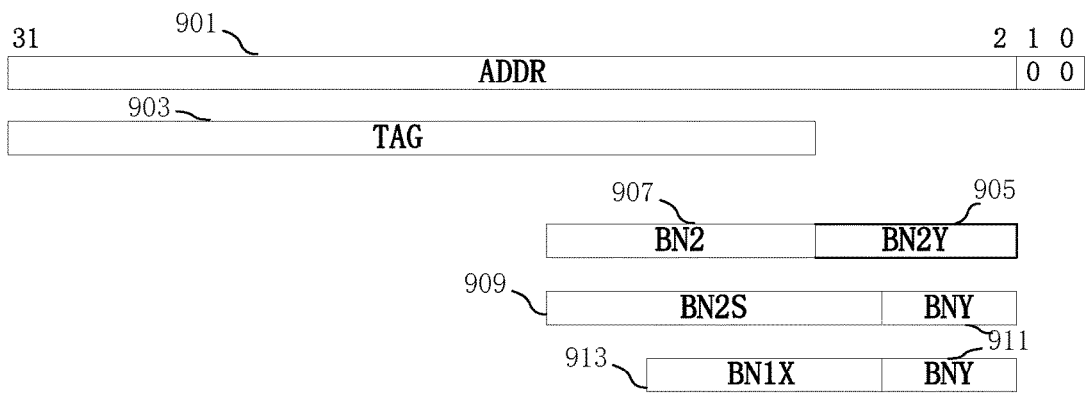
FIG. 9A illustrates a schematic diagram of an exemplary address format used in the cache system according to the disclosed embodiments.

FIG. 9A illustrates a schematic diagram of an exemplary address format used in the cache system according to the present disclosure. In one embodiment, it is assumed that the addresses for the instructions and data stored in the cache are both 32 bits. The lower 2 bits represent a byte offset in the instruction word or data word. The remaining 30 bits are divided into two portions: a secondary tag (i.e., L2 tag) 903 and a secondary intra-block offset (BN2Y) 905 (i.e., L2 intra-block offset).

The secondary tag 903 corresponds to the block address of the secondary memory block in the secondary cache 108, and the corresponding instruction or data may be identified within the secondary memory block (i.e., L2 memory block) based on the secondary intra-block offset 905. Here, similar to what is shown in FIG. 2, a mapping relationship between the secondary tag 903 and the secondary block number (BN2X) 907 (i.e., L2 block number) may be established. BN2X 907 and BN2Y 905 together may form a secondary cache address BN2 for the corresponding instruction or data.

Assuming that a secondary memory block corresponds to a block of four consecutive block addresses in the primary cache, it is obvious that the instruction or data may be identified by the sub-block number (i.e., the most significant bits) in BN2Y 905, which determines which memory block in the block of four primary memory blocks stores the instruction or data. The remaining portion of BN2Y is equivalent to BN1Y 911 in the primary memory block where the instruction or data is located. For the convenience of illustration, BN2X 907 and the sub-block number together may form BN2S 909.

In addition, as described previously, each primary memory block (instruction or data block) may correspond to a BN1X (or DBN1X) 913. BN1X (or DBN1X) 913 and BN1Y 811 together may form BN1 (or DBN1). Thus, any BN2 may be represented by BN2X and BN2Y together, or by BN2S and BN1Y (or DBN1Y) together. Both representations are completely equivalent.

Returning to FIG. 8, the active table 160 includes a block number mapping module 162, a selector 168, and a secondary tag memory (i.e., L2 tag memory) 164. A row of the block number mapping module (XMAP) 162, a row of the secondary tag memory 164, and a secondary instruction block of the secondary cache 108 correspond to each other, and are pointed by a same secondary block number BN2X.

Each row of the secondary tag memory 164 stores a block address corresponding to a secondary memory block (instruction block or data block) in the secondary cache 108. The selector 168 selects a BN2S that is sent to the active table 160 from different sources. The selected BN2S is sent, through the bus 169, to the block number mapping module 162 and the secondary tag memory 164 to select the corresponding row.

When the corresponding secondary memory block in the secondary cache 108 is partially or entirely stored in the primary instruction cache 104 or the primary data cache 204, each row of the block number mapping module 162 includes the information corresponding to a primary instruction block number BN1X or a primary data block number DBN1X. The block number mapping module 162 has an internal structure same as the block number mapping module 162 in FIG. 10.

Because each secondary memory block in the secondary cache 108 corresponds to four primary memory blocks (i.e., primary instruction block or primary data block), each row of the block number mapping module 162 includes four memory regions that store the primary block number (BN1X or DBN1X) and the corresponding validity bits. The validity bits are used to indicate whether the primary block number stored in this region is valid.

In addition, each row of the block number mapping module 162 also includes a memory region to store BN1X and the associated validity bit of a previous secondary memory block preceding the instruction address or data address of the secondary memory block corresponding to the row, and another memory region to store BN2X and its validity bit of a next secondary memory block succeeding the instruction address or data address of the secondary memory block corresponding to the row. By the block number mapping module 162, BN2 may be converted to the corresponding BN1 or DBN1.

In one embodiment, because the read pointer 315 of the data tracker 320 is ahead of the read pointer 115 of the master tracker 120, the read pointer 315 may point to a branch point earlier than the read pointer 115. When the read pointer 315 is moving and passing through the branch point, and the branch point content read from the bus 317 includes BN2, BN2 may be sent to the block number mapping module 162. BN2X in BN2S may be used to read the corresponding row content from the block number mapping module 162. The sub-block number in BN2S may be used to select one of the row's four memory regions that store BN1X.

When the validity bit of the selected memory region indicates that BN1X is not valid, a substitution algorithm (e.g., LRU algorithm) is used to allocate a BN1X. The instruction block corresponding to BN2S is loaded from the secondary cache 108 to the memory block pointed by BN1X in the primary instruction cache 104. At the same time, BN1X and the associated validity bit are loaded to the selected memory region. Thus, the valid BN1X and BN1Y in BN2 together may form a BN1, fulfilling the conversion from BN2 to BN1. When the read pointer 115 of the master tracker 120 points to the branch point, BN1 is read from the bus 117. In addition, BN1 may be selected by the selector 140 to be bypassed and sent to the master tracker 120 and the data tracker 320 for immediate use.

A similar approach may be used for data. That is, BN2X in BN2S may be used to read the corresponding row content from the block number mapping module 162, and the sub-block number in BN2S may be used to select one of the row's four regions storing DBN1X. When the validity bit of the selected region indicates that DBN1X is not valid, a substitution algorithm (e.g., LRU algorithm) may be used to allocate a DBN1X. The data block corresponding to BN2S may be loaded from the secondary cache 108 to the memory block pointed by DBN1X in the primary data cache 204. At the same time, the valid DBN1X and DBN1Y in BN2 together may form a DBN1, fulfilling the conversion from BN2 to DBN1. In addition, DBN1 may selected by the selector 132 to be bypassed and sent to the primary data cache 204 for immediate use.

Returning to FIG. 8, the active table 160 may be accessed in three modes: by BN2 or BN1 or DBN1 obtained through instruction or data address matching, by the corresponding block address read by BN2 addressing, and by the corresponding BN1 or DBN1 read by BN2 addressing. Specifically, in the first mode, a block address in the instruction or data addresses from the buses 119, 209, or 211 may be selected by the selector 134 to be sent to the secondary tag memory 164 to find a match.

BN2X corresponding to the matched entry and the sub-block number portion of the instruction or data address together may form BN2S, which may be sent to the block number mapping module 162 as described previously through the bus 161, the selector 168, and the bus 169. When a valid BN1X (or DBN1X) is read, BN1 (or DBN1) and BN1Y (or DBN1Y) in the instruction or data address together may form BN1 (or DBN1) to be output through the bus 163. Otherwise, BN2S and BN1Y (or DBN1Y) together may form BN2 to be output through the bus 163, fulfilling the conversion from the instruction or data address to BN2 or BN1 or DBN1.

In the second mode, BN2X that comes from the bus 163, 119, 317, 207, or 161 to may be selected by the selector 168 to address the secondary tag memory 164 to read to the block address in the corresponding row to be output through the bus 171. The block number and BN2Y in BN2 together may form the instruction or data address, fulfilling the conversion from BN2 to the instruction or data address.

In the third mode, BN2X that comes from the bus 163, 119, 317, 207, or 161 may be selected by the selector 168 to read the corresponding row content from the block number mapping module 162, and the sub-block number in BN2S may be used to select one of the four memory regions storing BN1X or DBN1X in the row, fulfilling the conversion from BN2 to the corresponding BN1 or DBN1.

Each row in the block number inverse mapping module 206 corresponds to a data block in the primary data cache 204, and both are pointed by a same BN1X. Each row of the block number mapping module 206 stores BN2S corresponding to the primary data block, i.e., the block number BN2X of the secondary memory block where the primary data block is located, and the location (sub-block number) in the secondary memory block where the primary data block is located. Through the block number inverse mapping module 206, DBN1 may be converted to the corresponding BN2. Specifically, DBN1X in DBN1 may be used to address the block number inverse mapping module 206 to read BN2S in the corresponding row. BN2S and DBN1Y in DBN1 together may form BN2, fulfilling the conversion from DBN1 to BN2.

In one embodiment, the scanner 106 inspects the instruction block sent from the secondary cache 108 through the bus 107, and extracts the track point information to fill the corresponding entry in the track table 110 so that at least one track for the primary instruction block corresponding to the secondary instruction block may be created. At the same time, the scanner 106 outputs the instruction block through the bus 105 to the primary instruction cache 104. Different from FIG. 2, for the filling initiated by the scanner 106, the track point content eventually filled the track table 110 may include BN1 or BN2, but may not store PC.

In the data engine 208, the base address register value, the address offset, DBN1 corresponding to the current data address, and the certain information of the data stride may be used to generate the data address or next DBN1. The data address may be converted to next DBN1 by the active table 160. Thus, for the filling initiated by the data engine 208, the data point content eventually filled the track table 110 definitely includes DBN1.

Figure 9B:
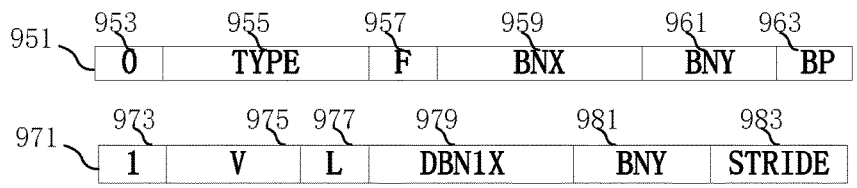
FIG. 9B illustrates a schematic diagram of contents of an exemplary track point according to the disclosed embodiments.

FIG. 9B illustrates a schematic diagram of contents of an exemplary track point according to the present disclosure. In the branch point format 951, the memory region 953 includes a track point type, for example, "0" indicates that the track point is a branch point. It should be noted that, in this case, "0" is the instruction type for the branch point, and is not the type "0" described elsewhere in the specification. The memory region 955 includes a branch instruction type, for example, a direct branch, an indirect branch, unconditional branch, or conditional branch, etc.

The memory region 957 includes the information about whether BN for the branch point is BN2 or BN1, for example, "1" indicates that the branch point includes BN2, and "0" indicates that the branch point includes BN1. The memory region 959 includes a corresponding BNX value. Depending on the value in the memory region 957, the value in the memory region 959 may be either BN1X or BN2X. The memory region 961 includes a corresponding BNY value. Depending on the value in the memory region 957, the value in the memory region 961 may be either BN1Y or BN2Y.

In the data point format 971, the memory region 973 includes a track point type, for example, "1" indicates that the track point is a data point. The memory region 975 includes a validity bit (V) as described previously. The memory region 977 includes a data access instruction type, for example, a data read instruction or a data store instruction, etc. The memory region 979 includes a DBN1X of the data address corresponding to the data point. The memory region 981 includes a DBN1Y of the data address corresponding to the data point. The memory region 983 includes a data stride as described previously.

Returning to FIG. 8, in one embodiment, once a certain primary instruction block is replaced, the branch target BN1 in the branch point of the other track table row which is now the branch target replaces the corresponding BN2. Specifically, an entry may be added to each row of the track table 110 to store BN2S corresponding to the track for the row so that BN2 corresponding to BN1 of all track points in the track may be obtained by conversion. When the track and the associated instruction block are replaced, as long as the track points on the track are the branch target track points of the branch points on the other track, BN1 stored in the branch points on the other track may be converted to the corresponding BN2.

Thus, as long as the size of the primary instruction cache 104 and the size of the secondary cache 108 maintain a certain ratio, it is possible to avoid the pointing errors of the branch target BN1 caused by the replacement of the primary instruction block. As such, there is no need to store PC in the branch points. Once a certain primary data block is replaced, only the validity bit in the data point pointing to the data block is set to "00" (i.e., IV state), indicating that DBN1 of the data point is not valid so that the pointing errors of the data DBN1 caused by the replacement of the primary data block may be avoided.

Figure 10:
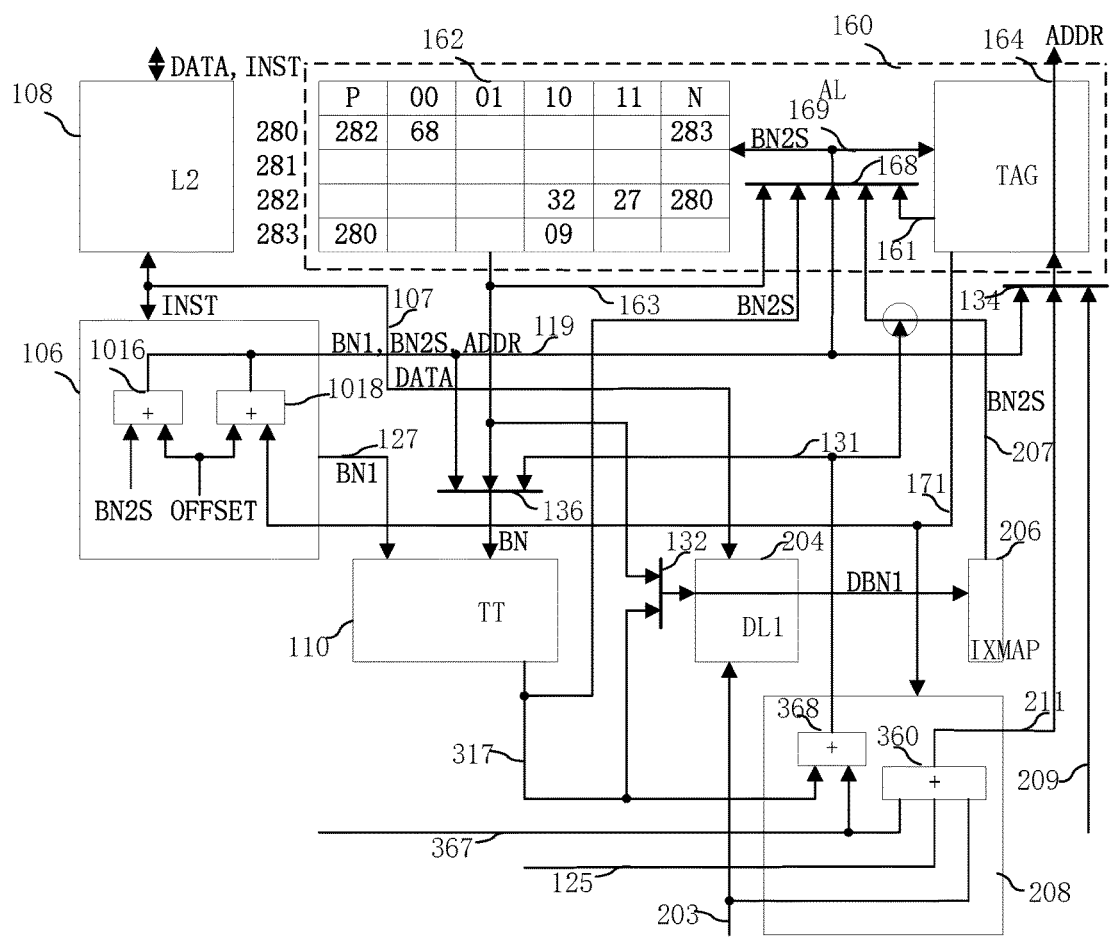
FIG. 10 illustrates an exemplary track point content generation according to the disclosed embodiments.

FIG. 10 illustrates an exemplary track point content generation according to the present disclosure. For the convenience of illustration, only some of the modules in FIG. 8 are shown in FIG. 10. The data points are described first.

As shown in FIG. 10, the data engine 208 includes a two-input adder 368 and a three-input adder 360. The adder 368 has the same function as the adder 216 in FIG. 2, and is used to calculate a stride DBN1 based on a DBN and a stride. When the EB technique is used to calculate the data address, one of the inputs to the adder 360 is "0" so that the base address register value coming from the bus 203 and the address offset coming from the bus 125 are added to obtain the data address, which is output to the bus 211.

When the stride technique is used to calculate the stride data address, one input to the adder 360 is the data stride so that the base address register value coming from the bus 203, the address offset coming from the bus 125, and the data stride are added to obtain the stride data address, which is output to the bus 211. In one embodiment, it is assumed that the data point has already been in the SR state, the adder 368 adds DBN1 of the data point sent from the track table 110 through the bus 317 and the stride. When the addition result does not exceed the boundary (i.e., no change to DBN1X) of one primary data block, the result DBN1 (i.e., stride DBN1) may be selected by the selector 136 through the bus 131 and may be written back to the data point in the track table 110 as the next DBN1. At the same time, the data point remains in the SR state.

When the addition result of the adder 368 exceeds the boundary of one primary data block, but does not exceed the boundary of the secondary cache block it is in, the original DBN1X on the bus 317 is selected by the selector 132 and is sent to the block number inverse mapping module 206 for conversion to BN2X, which is output to the bus 297. The sub-block number calculated by the adder 368 is output to the bus 131. BN2X and the sub-block number together may form BN2S corresponding to the next data address. Through the bus 207 and the selector 168, BN2S is sent to the block number mapping module 162 for conversion to the corresponding DBN1X as described previously. DBN1X and DBN1Y calculated by the adder 368 together may form the next DBN1, which is written back to the data point in the track table 110 through the bus 163 and the selector 136. At the same time, the data point remains in the SR state.

When the addition result of the adder 368 exceeds the boundary of one secondary memory block, but does not exceed the boundary of the previous one or next one secondary memory block, DBN1X is sent to the block number inversion mapping module 206 for conversion to BN2X. Through the bus 207 and the selector 168, BN2X is sent to the block number mapping module 162 to address and read BN2X of the previous one or next one secondary memory block stored in the corresponding memory region of the row. BN2X and the sub-block number calculated by the adder 368 together may form BN2S corresponding to the next data address. Through the bus 163 and the selector 168, BN2S is sent back to the block number mapping module 162 for conversion to DBN1X as described previously. DBN1X and DBN1Y calculated by the adder 368 together may form a stride DBN1. Through the bus 163 and the selector 136, the stride DBN1 is written back to the data point. At the same time, the data point remains in the SR state.

When the addition result of the adder 368 exceeds the boundary of the previous one or next one secondary memory block of the secondary memory block where the original DBN1 is located, the base address register value coming from the bus 203, the address offset coming from the bus 125, and the data stride are added by the adder 360 to obtain the next data address. As described previously, the block address portion of the data address is sent to the secondary tag memory 164 through the bus 211 and the selector 134 to find a match in the stored data addresses. The matched BN2S is sent to the block number mapping module 162 through the bus 161 and the selector 168 to read the corresponding stride DBN1. Through the bus 163 and the selector 136, the stride DBN1 is written back to the data point. At the same time, the data point remains in the SR state.

Specifically, as shown in FIG. 10, each secondary memory block includes four primary memory blocks (the sub-block numbers are "00", "01", "10", and "11", respectively). Each primary memory block includes eight data (DBN1Y ranges from "0" to "7", respectively). Each row of the block number mapping module 162 corresponds one BN2X. The memory regions from "00" to "11" store DBN1X correspond to the sub-block numbers in BN2X, respectively. The memory regions P and N store BN2X of the previous one and next one secondary memory block of the secondary memory block sequential address corresponding to the current BN2X, respectively.

The data corresponding to an exemplary data access instruction is described below for illustration. For the convenience of illustration, DBN1X is represented by two decimal digits, and BN2X is represented by three decimal digits. For example, the DBN1 value corresponding to the current data of the data access instruction is "32|3", indicating that DBN1X is "32" and DBN1Y is "3".

Each row of the block number mapping module 206 stores the location of the primary data block in the secondary cache, corresponding to the row. For example, when a row of the block number mapping module 206 corresponding to DBN1 "32|3" stores "282|2", BN2X of the secondary memory block corresponding to the primary data block (DBN1X is "32") is "282" and the sub-block number is "2". Thus, BN2 corresponding to DBN1 "32|3" is "282|2|3".

For example, it is assumed that the current data stride is "4". DBN1Y ("3") and the data stride ("4") are added to obtain a new DBN1Y ("7") and there is no carry output. So the new DBN1 is "32|7", and is located in the same primary data block.

In another example, it is assumed that the current data stride is "8". DBN1Y ("3") and the data stride ("8") are added to obtain "1,3". The "1" is the carry output. Then, BN2Y ("2|3") and the data stride ("8") are added to obtain the new BN2Y ("3|3"), and there is no carry output. Then, the new Bn2 is "282|3|3", which is located in the same secondary memory block as the original BN2 ("282|2|3").

At this time, as described previously, the sub-block number "3" is sent to the block number mapping module 162 to read the content "27" of the corresponding memory region (i.e., memory region "11") from the row pointed by BN2X ("282"). The content "27" is DBN1X corresponding to the new BN2. Thus, the DBN1 corresponding to the new BN2 is "27|3".

In another example, it is assumed that the current data stride is "16". BN2Y ("2|3") and the data stride "16") are added to obtain "1,0|3". The "1" is the carry output, which indicates that the secondary memory block corresponding to the new BN2 is the next secondary memory block following the secondary memory block corresponding to the original BN2, and the corresponding new DBN1 is the "0"th primary data block (sub-block number is "00") of the next one secondary memory block.

At this time, as described previously, the content "280" of the N memory region of the row pointed by the original BN2X ("282") in the block number mapping module 162 is the BN2X value in the new BN2. Then, the new BN2 is "280|0|3". Because the value of the memory region "00" of the row corresponding to BN2X "280" in the block number mapping module 162 is "68", then the new DBN1 is "68|3".

In another example, it is assumed that the current data stride is "64". BN2Y ("2|3") and the data stride "64") are added to obtain "2,2|3". The "2" is the carry output, which indicates that the secondary memory block corresponding to the new BN2 is the next secondary memory block following the secondary memory block corresponding to the original BN2.

At this time, as described previously, based on the original BN2X value "282", the value "280" (i.e., BN2X of the next one secondary memory block) of the corresponding N memory region is read from the block number mapping module 162. Then, based on BN2X "280" of the next one secondary memory block, the value "283" (i.e., BN2X of the next one secondary memory block) of the corresponding N memory region is read from the block number mapping module 162 so that the new BN2 "283|2|3" is obtained. Because the memory region "10" of the row corresponding to BN2X "283" in the block number mapping module 162 has a value "09", the new DBN1 is "09|3".

As shown in various embodiments described above, the current BN1 and the data stride may be added to directly determine the next DBN1. Moreover, the data strides are mostly positive in the disclosed embodiments. For the cases where the data strides are negative, the same approach may be used to obtain the next DBN1. Next, the branch points are described, and the process is similar to the data point's. The difference is that because the instruction block being inspected by the scanner 106 is read from the memory block pointed by BN2S in the secondary cache 108, and is loaded to the memory block pointed by BN1X in the primary instruction cache 104. Because the offset BN1Y in the instruction block is known for any one instruction in the instruction block, Bn1 and BN2 of the instruction is also known. This is unlike the data case where DBN1X is converted to BN2S through the block number inverse mapping module 206.

As shown in FIG. 10, the scanner 106 includes adders 1016 and 1018. Similar to the function of the adder 368, the function of the adder 1016 is to add the BN1 of the branch instruction and the branch offset. When the addition result does not exceed the boundary of the primary instruction block where the branch instruction is located, the scanner 106 directly outputs the result as the branch target BN1, which is written back to the branch point corresponding to the branch instruction through the bus 119 and the selector 136. At this time, the content in the branch point is BN1.

When the addition result of the adder 1016 exceeds the boundary of the primary instruction block where the branch instruction is located, but does not exceed the boundary of the secondary memory block where the branch instruction is located, BN2X of the branch instruction and the calculated BN2Y (i.e., sub-block number and BN1Y) together may form the branch target BN2, which is written to the branch point corresponding to the branch instruction through the bus 119 and the selector 136. At this time, the content in the branch point is BN2.

When the addition result of the adder 1016 exceeds the boundary of the secondary memory block where the branch instruction is located, but does not exceed the boundary of the previous one or the next one secondary memory block, BN2X of the instruction is sent to the block number mapping module 162 through the bus 119 and the selector 168 to address and read BN2X of the previous one or the next one secondary memory block stored in the corresponding memory region of the row. The read BN2X and BN2Y (i.e., the sub-block number and BN1Y) calculated by the adder 1016 together may form the branch target Bn2, which is written to the branch point corresponding to the branch instruction through the bus 119 and the selector 136. At this time, the content in the branch point is BN2.

When the addition result of the adder 1016 exceeds the boundary of the previous one or the next one secondary memory block of the secondary memory block where the branch instruction is located, the same approach of the previous example may be used. The original BN2X may be used to address the block number mapping module 162 to read the BN2X value in the corresponding memory region N, and the retrieved BN2X may be used to address the block number mapping module 162 to read the BN2X value in the corresponding memory region N. The process is repeated until the BN2X corresponding to the addition result is read. Then, as described previously, the retrieved BN2X and the BN2Y in the branch target address together may form the branch target BN2, which is then converted to BN1.

Alternatively, as described previously, the block address of the instruction block of the currently inspected instruction, the intra-block offset (i.e., BN1Y) of the branch instruction, and the branch increment are added together to obtain the branch target instruction address. The block address in the branch target address is sent, through the bus 119 and the selector 134, to the secondary tag memory 164 to find a match. As described previously, BN2X is obtained. BN2X and BN2Y in the branch target address together may form the branch target BN2, which is written to the branch point corresponding to the branch instruction through the bus 119 and the selector 136. At this time, the content of the branch point is BN2.

Of course, when the addition result of the adder 1016 exceeds the boundary of the primary instruction block where the branch instruction is located, as described previously, the branch target BN2 obtained by the above approach may be directly stored to the branch point corresponding to the branch instruction so that the content of the branch point is BN2. Alternatively, as described previously, BN2S in BN2 may be used to address the block number mapping module 162 to find the corresponding memory region. When the memory region is valid, BN2 is converted to the corresponding BN1, which is stored to the branch point corresponding to the branch instruction so that the content of the branch point is BN1.

Returning to FIG. 8, in one embodiment, the instruction read buffer 116 includes at least the instruction block (i.e., the current instruction block) where the instruction currently executed by the processor is located. The instruction read buffer 116 has one write port to write the row pointed by the read pointer 115 or 315 selected by the selector 130 in the primary instruction cache 104 to the instruction read buffer 116.

The instruction read buffer 116 also has two read ports. Based on the read pointer 115 addressing, the corresponding instruction is output and sent to the processor core 102 through the bus 101. At the same time, based on the read pointer 315 addressing, the corresponding instruction is output and sent to the processor core 102 and the data engine 208 through the bus 125. That is, the instruction read buffer 116 is a multi-port buffer. Although the primary instruction cache 104 may increase the number of ports to achieve the same function, the instruction read buffer is able to read instructions in a shorter time and with less hardware.

The first read port of the instruction read buffer 116 uses BN1 of the read pointer 115 to address and output the corresponding instruction that is sent to the processor core 102 for execution through the bus 101. The second read port uses BN1 of the read pointer 315 as the address. When the read pointer 315 points to the data point, the base address register number and the address offset of the data access instruction are output from the second read port. The base address register number is sent to the processor core 102 to read the corresponding base address register value. The output address offset is sent to the data engine 208 for data address calculation.

Of course, the instruction read buffer 116 may include more instruction blocks. For example, when the instruction read buffer 116 includes two instruction blocks, the instruction read buffer 116 may include the next one instruction block of the sequential address in addition to the current instruction block. In this way, when the read pointer 315 is ahead of the read pointer 115, even if the read pointer 315 already points to the next one instruction block following the current instruction block pointed by the read pointer 115, the instruction read buffer 116 may supply the correct instruction to processor core 102, and may, at the same time, read the base address register number and the address offset corresponding to the correct data point The primary function of the data engine 208 is to use the stride technique to calculate the stride DBN1, and to use the EB technique to calculate the data address (the data address may be sent to the active table 160 to be converted to the corresponding EB DBN1 as described previously). The detailed operation of the data engine 208 will be illustrated in FIG. 11.

As shown in FIG. 8, the major buses include the buses 107, 105, 103, 101, 203, 119, 115, 315, 117, 317, 205, and 125.

The instructions in the secondary cache 108 are sent to the scanner 106 through the bus 107, and from there, are sent to the primary instruction cache 104 through the bus 105, and from there, are sent to the instruction read buffer 116 through the bus 103, and from there, are sent to the processor core 102 through the bus 101.

The data in the secondary cache 108 may be loaded to the primary data cache 204 through the bus 107 while the data in the primary data cache 204 may also be written back to the secondary cache 108 through the bus 107. Similarly, the data in the primary data cache 204 may be sent to the processor core 102 through the bus 203 to write to the register stack (i.e., the processor core 102 reads the data when executing the data access instruction) while the data in the register stack of the processor core 102 may be written back to the primary data cache 204 (i.e., the processor core 102 stores the data when executing the data access instruction) through the bus 203. Thus, the bus 107 and the bus 203 are bi-directional buses.

The bus 119 is the output bus for the scanner 106. The format of the bus 119 is BN1, BN2, or instruction address. When the data access instruction uses an immediate number as the data address or uses the sum of the instruction address and an immediate number as the data address, the format of the bus 119 may also be the data address.

The bus 115 is the read pointer of the master tracker 120, which is used to control the output from the first read port of the primary instruction cache 104 and the track table 110, and from the first read port of the instruction read buffer 116. Specifically, BN1X of the bus 115 is used to address the tracks of the track table 110 and the rows of the primary instruction cache 104. BN1 of the bus 115 is used to address the track points in the track table 110 and the instructions in the instruction read buffer 116.

The bus 315 is the read pointer of the data tracker 320, which is used to control the output from the second read port of the primary instruction cache 104 and the track table 110, and from the second read port of the instruction read buffer 116. Specifically, DBN1X of the bus 315 is used to address the tracks of the track table 110 and the rows of the primary instruction cache 104. DBN1 of the bus 315 is used to address the track points in the track table 110 and the instructions in the instruction read buffer 116.

The bus 117 is the output of the first read port of the track table 110, which is used to read BN1 from the track table 110 and then send BN1 to the primary tracker 120 and the data tracker 320.

The bus 317 is the output of the second read port of the track table 110, which is used to read DBN1 from the track table 110 and then send DBN1 to the primary data cache 204, the block number mapping module 206, and the data engine 208. The bus 317 is also used to read the stride from the track table 110 and then send the stride to the data engine 208. The bus 317 is also used to read BN2 from the track table 110 and then send BN2 to the active table 160.

The bus 205 is the output of the synchronization module 212, which is used to send the synchronization signal to the data engine 208 to synchronize the operation (i.e., the access pipeline) of the data engine 208 with the operation (i.e., the main pipeline) of the processor core 102.

As described previously, the first read port of the instruction read buffer 116 send the instruction to the processor core 102 through the bus 101. The output of the second read port sends the base address register value through the bus 125 to the processor core 102 to read the corresponding register value from the register stack, and then to send the value through the bus 203 to the data engine 208.

The selector 130 selects between BN1X of the read pointer 115 of the master tracker 120 and BN1X of the read pointer 315 of the data tracker 320, and outputs one of them to address the primary instruction cache 104 to read the corresponding instruction block to load the instruction read buffer 116 through the bus 103.

The selector 140 selects between BN1 on the bus 163 obtained from conversion by the active table 160 and BN1 on the bus 317 read from the track table 110, and outputs one of them to send to the data tracker 320. In this way, when BN1 is needed immediately to update the read pointer 315 of the data tracker 320, at the same time the BN1 is stored to the track table 110, the BN1 on the bus 163 is bypassed by the selector 140 and sent to the data tracker 320 without having to wait for the BN1 to be stored in the track table 110 and then read BN1 from the bus 317.

The selector 132 selects between DBN1 on the bus 163 obtained from conversion by the active table 160 and DBN1 on the bus 317 read from the track table 110, and outputs one of them to address the primary data cache 204 to read the corresponding data to send to the processor core 102 through the bus 203. In this way, when DBN1 is needed immediately to address the primary data cache 204, at the same time the BN1 is stored to the track table 110, the BN1 on the bus 163 is bypassed by the selector 132 and sent to the primary data cache 204 without having to wait for the DBN1 to be stored in the track table 110 and then read DBN1 from the bus 317.

The selector 134 selects between the data address output by the data engine 208, the instruction address or data address output by the scanner 106 on the bus 119, and the instruction address output by the processor core 102 on the bus 209, and outputs one of them to send to the secondary tag memory 164 in the active table 160 to find a match, and performs the subsequent operations as described previously.

The selector 136 selects between BN1 or BN2 output by the scanner 106 on the bus 119, DBN1 output by the data engine 208 on the bus 131, and BN1, BN2, or DBN1 output by the block number mapping module 162 in the active table 160 on the bus 163, and outputs one of them to write to the corresponding track point in the track table 110.

The selector 138 selects between BN1 output from the first read port of the track table 110 on the bus 117 and BN1 output from the second read port of the track table 110 on the bus 317, and outputs one of them to send to the data tracker 320. In this way, when the branch transfer occurs for the branch instruction, the selector 138 selects BN1 (i.e., the branch target BN1) on the bus 117 to update the value of the read pointer 315 so that the read pointer 315 of the data tracker 320 and the read pointer 115 of the master tracker 120 both point to the branch target track point.

When the read pointer 315 of the data tracker 320 reaches the end track point ahead of the read pointer 115 of the master tracker 120, the selector 138 selects BN1 (i.e., BN1 for the first instruction in the next one instruction block) on the bus 317 to update the value of the read pointer 315 so that the read pointer 315 points, in advance, to the track corresponding to the next one instruction block, and moves to the first data point on the track.

The selector 168 has five inputs, including BN2S output by the block number mapping module 162 on the bus 163, BN2S output from the first read port of the track table 110 on the bus 317, BN2S output by the scanner 106 on the bus 119, BN2S output by the block number inverse mapping module 206 on the bus 207, and BN2S output by the secondary tag memory 164 match on the bus 161. The selector 168 selects between the five inputs, and outputs one BN2S to address the block number mapping module 162 through the bus 169 to read the content (previous one BN2 or next one BN2 or BN1 or DBN1) of the corresponding memory region of the row, to address the secondary tag memory 164 to read the secondary memory block address stored in the corresponding row, and to address the secondary cache 108 to read the content of the corresponding secondary memory block.

The operation of the cache system depicted in FIG. 8 is similar to that of FIG. 2. As shown in FIG. 8, in one embodiment, the difference is that the instruction read buffer 116 provides the instructions to the processor core 102 while the primary instruction cache 104 directly provides the instructions in FIG. 2. The data engine 208 includes more functions than the adders 206 and 208 as shown in FIG. 2. The data engine 208 also includes the data pipeline (load/store pipeline) to perform all the processing of the data access instructions. The active table 160 may match and map all addresses (e.g., the primary cache address for data and instructions, and the secondary cache address) to obtain, through one conversion, the information about whether there is a match in the primary cache and the secondary cache, as well as the corresponding BN1, DBN1, or BN2.

Therefore, in one embodiment, the primary instruction tag memory 144 and the primary data tag memory 244 in FIG. 2 are no longer needed. Because cache system according the present disclosure includes two layers of cache, compared with FIG. 2, FIG. 8 adds the block number inverse mapping module 206, configured to convert DBN1 to BN2. In addition, FIG. 2 only adopts the stride technique while FIG. 8 adopts both the stride technique and the EB technique. So the synchronization module 212 is added in FIG. 8 to synchronize the access pipeline in the data engine 208 and the main pipeline in the processor core 102 when using the EB technique to calculate the EB DBN1.

The operation of the cache system shown in FIG. 8 is described further details in the following. For the convenience of illustration, the read pointer 115 of the master tracker 120 is used to address the instruction read buffer 116 to read the instructions for execution by the processor core 102. Specifically, BN1Y of the read pointer 115 reads the corresponding instruction in the current instruction block pointed by BN1X of the read pointer 115 from the instruction read buffer 116. The same approach may apply to the case where the instruction address offset generated by the processor core 102 replaces BN1Y of the read pointer 115 to address the instruction in the current instruction block in the instruction read buffer.

In one embodiment, because the operations related to the data access instructions are performed in the data engine 208, the read pointer 115 of the master tracker 120 skips all data access instructions so that the data access instructions are not sent to the processor core 102 for execution.

As described previously, the scanner 106 inspects the instructions loaded from the secondary cache 108 to the primary instruction cache 104. When the scanner 106 finds an instruction is a direct branch instruction, the branch target address is calculated. When the branch target and the branch source (i.e., the direct branch instruction) are located in the same primary instruction block, the corresponding BN2 is generated as described previously. When the branch target and the branch source are located in different primary instruction blocks of the same secondary memory block, the corresponding BN2 is generated as described previously. When the branch target is located in the adjacent memory block (i.e., the previous one or the next one memory block) of the secondary memory block where the branch source is located, BN2 of the branch source is converted, by the block number mapping module 162, to BN2 or BN1 of the branch target.

For other cases, the calculated branch target instruction address is sent to the secondary tag memory 164 to find a match to convert to the corresponding BN2. The BN2 is sent, through the bus 161 and the selector 168, to the block number mapping module 162 to read the corresponding memory region. When the memory region is valid, the BN2 is converted to the corresponding BN1. The BN1 or BN2 and the instruction type of the direct branch instruction together are selected by the selector 136 to write to the branch point corresponding to the branch source in the track table 110.

When the scanner 106 finds an instruction is an indirect branch instruction, the corresponding instruction type is written to the branch point corresponding to the branch source in the track table 110. Then, when the reader pointer of the master tracker 120 points to the track point and finds that the instruction type is an indirect branch, the processor core 102 calculates and generates the branch target address. The branch target address is sent, through the bus 209, to the secondary tag memory 164 to match and convert to BN2 or BN1, which is selected by the selector 136 to write to the branch point corresponding to the branch source in the track table 110.

When the scanner 106 finds an instruction is a data access instruction, the corresponding validity bits and DBN1 are generated as shown in FIG. 2, and along with the instruction type, are selected by the selector 136 to write to the data point corresponding to the data access instruction in the track table 110.

Assuming that the read pointer 115 of the master tracker 120 points to an addition (ADD) instruction in the current instruction read buffer 116, the addition instruction is read and is sent, through the bus 101, to the processor core 102 for execution. As described previously, the read pointer 115 increments by itself to point to the next one instruction in the current instruction block in the instruction read buffer 116 and the corresponding track point in the track table 110.

At this time, it is assumed that the instruction type output by the track table 110 on to the bus 117 indicates that the instruction is a direct branch instruction. As described previously, BN1 is read on the bus 117. The master tracker 120 temporarily stores the branch target BN1, and as described previously, the branch instruction is read from the instruction read buffer 116 for execution by the processor core 102. The read pointer 115 continues to increment by itself and moves to point to the next instruction and the corresponding track point.

Assuming that, at this time, the read pointer 115 points to a bitwise OR instruction, as described previously, the instruction is read from the instruction read buffer 116 for execution by the processor core 102, and the read pointer 115 continues to increment by itself and moves to point to the next instruction and the corresponding track point.

It is further assumed that the read pointer 115 points to a subtraction (SUB) instruction. However, at this time, the processor core 102 generates the information that the branch transfer of the previous branch instruction is successful. Then the temporarily stored branch target BN1 is written to the corresponding registers in the master tracker 120 and the data tracker 320 so that the values in the read pointers 115 and 315 are updated to the branch target BN1 at the same time.

Then, the selector 130 selects BN1X of the read pointer 115 to address the primary instruction cache 104 to read the corresponding instruction block (i.e., the instruction block where the branch target instruction is located), and to load the instruction read buffer 116 based on a certain substitution algorithm (e.g., LRU algorithm). At the same time, based on BN1Y of the read pointer 115, the corresponding instruction (i.e., the branch target instruction) is read from the instruction block (i.e., the new current instruction block) which is loaded into the instruction read buffer 116, and is sent, through the bus 115, to the processor core 102 for execution. Then, as described previously, the master tracker 120 restarts the stride and provides the instructions in sequence following the branch target instruction to the processor core 102 for execution.

It is assumed that the branch instruction following the addition instruction is an indirect branch instruction. when the read pointer 115 points to the branch point and reads the instruction type as the indirect branch, the processor core 102 calculates and generates the branch target address. Then, the block address of the branch target address is sent, through the bus 209 and the selector 134, to the secondary tag memory 164 in the active table 160 to find a match. As described previously, BN2X is obtained. Then, the content of the corresponding memory region is read from the block number mapping module 162, is bypassed by the selector 140, and is sent to the data tracker 320. The procedure that follows is as described previously.

After the branch transfer is completed, the read pointer 315 of the data tracker 320 starts to move from the branch target instruction, and reaches the first data point following the track point pointed by the read pointer 115 of the master tracker 120. For example, a high frequency clock signal may be provided to the data tracker 320 to make the read pointer 315 move faster than the reader pointer 115.

When the read pointer 315 points to the data point, the content of the data point is read on to the bus 317. The validity bits of the data point are decoded to determine the state of the current data point. When the data point is in the SR state (the validity bits are "11"), DBN1 on the bus 317 is sent to the primary data cache 204 at the appropriate time to read the corresponding data, which is sent, through the bus 203, to the processor core 102 for use.

When the data point is in other states (the validity bits are not "11"), DBN1Y of the read pointer 315 reads the corresponding data access instruction at the appropriate time from the instruction read buffer 116, which is output on to the bus 125. The base address register number of the data access instruction is sent to the register stack of the processor core 102 to read the value of the corresponding base address register, which is sent the data engine 208 through the bus 203. The address offset of the data access instruction is directly sent, through the bus 125, to the data engine 208. In the data engine 208, the base address register value and the address offset are added to obtain the data address. The block address of the data address is sent, through the bus 211 and the selector 134, to the secondary tag memory 164 to find an address match.

When the address match is unsuccessful, as described previously, the corresponding data block in the lower level memory is loaded to the secondary cache 108 to update the corresponding contents of the secondary tag memory 164 and the block number mapping module 162. When the address match is successful, BN2X corresponding to the successfully matched entry points to a row of the block number mapping module 162 through the bus 161, the selector 168, and the bus 169.

Of course, in a specific implementation, each row of the secondary tag memory 164 may correspond to a row of the block number mapping module 162. In this way, as long as there is an address match in the secondary tag memory 164, the corresponding row in the block number mapping module 162 may be found directly.

Then, as described previously, the block number mapping module 162 outputs the corresponding DBN1, which is loaded, through the bus 163 and the selector 136, to the data point in the track table 110, and updates the validity bits to the SR state. At the same time, the DBN1 is bypassed to the primary data cache 204 to read the corresponding data, which is sent, through the bus 203, to the processor core 102 for use.

At the same time, as described previously, DBN1 and the stride are added by the data engine 208. When the addition result does not exceed the boundary of the original DBN1, the addition result is directly used as the next DBN1, which is written back, through the bus 131 and the selector 136, to the data point in the track table 110.

When the addition result exceeds the boundary of the original DBN1, the addition result is sent, through the bus 131, to the block number inverse mapping module 206 to convert to the corresponding BN2S. The BN2S is sent, through the bus 207, the selector 168, and the bus 169, to the block number mapping module 162 to read the content of one row.

In this case, when the addition result does not exceed the boundary of the BN2, as described previously, the corresponding memory region that stores DBN1X in the content of the row is read from the block number mapping module 162. When the DBN1X in the corresponding memory region is valid, the DBN1X is output and forms DBN1 as described previously. The DBN1 is written back, through the bus 163 and the selector 136, to the data point in the track table 110. When DBN1X is not valid, as described previously, a DBN1X is allocated, and the corresponding data block is loaded from the secondary cache 108 to the memory region pointed by the DBN1X in the primary data cache 204. As described previously, the DBN1X is output and forms DBN1. The DBN1 is written back, through the bus 163 and the selector 136, to the data point in the track table 110.

When the addition result is located in the memory block adjacent to the BN2, as described previously, the corresponding memory region corresponding to the previous one or next one memory block BN2X stored in the content of the row is read. When the BN2X stored in the memory region is valid, the BN2X is output, through the bus 163, the selector 168, and the bus 169, to the block number mapping module 162 to find the corresponding row. The subsequent operations are the same as described previously. When the BN2X in the memory region is not valid, as described previously, a BN2X is allocated, and the corresponding data block is loaded from the lower level memory to the memory region pointed by the BN2X in the secondary cache 108. The subsequent operations are the same as described previously.

When the read pointer 315 of the data tracker 320 points to the end track point, the content (i.e., BN1 corresponding to the first instruction in the next instruction block) of the end track point is read and sent, through the bus 317 and the selector 138, to the data tracker 320 to update the value of the read pointer 315 to BN1 of the first instruction in the next one instruction block. At this time, BN1X of the read pointer 315 is selected by the selector 130 to address the primary instruction cache 104 to read the corresponding instruction to load to the instruction read buffer 116.

Thus, the read pointer 315 of the data tracker 320 may continue to move on the track corresponding to the next instruction block, may read the content of the corresponding track points through the bus 317, and may read the corresponding instruction from the instruction read buffer 116 to output through the bus 125. The subsequent operations are the same as described previously.

Figure 11:
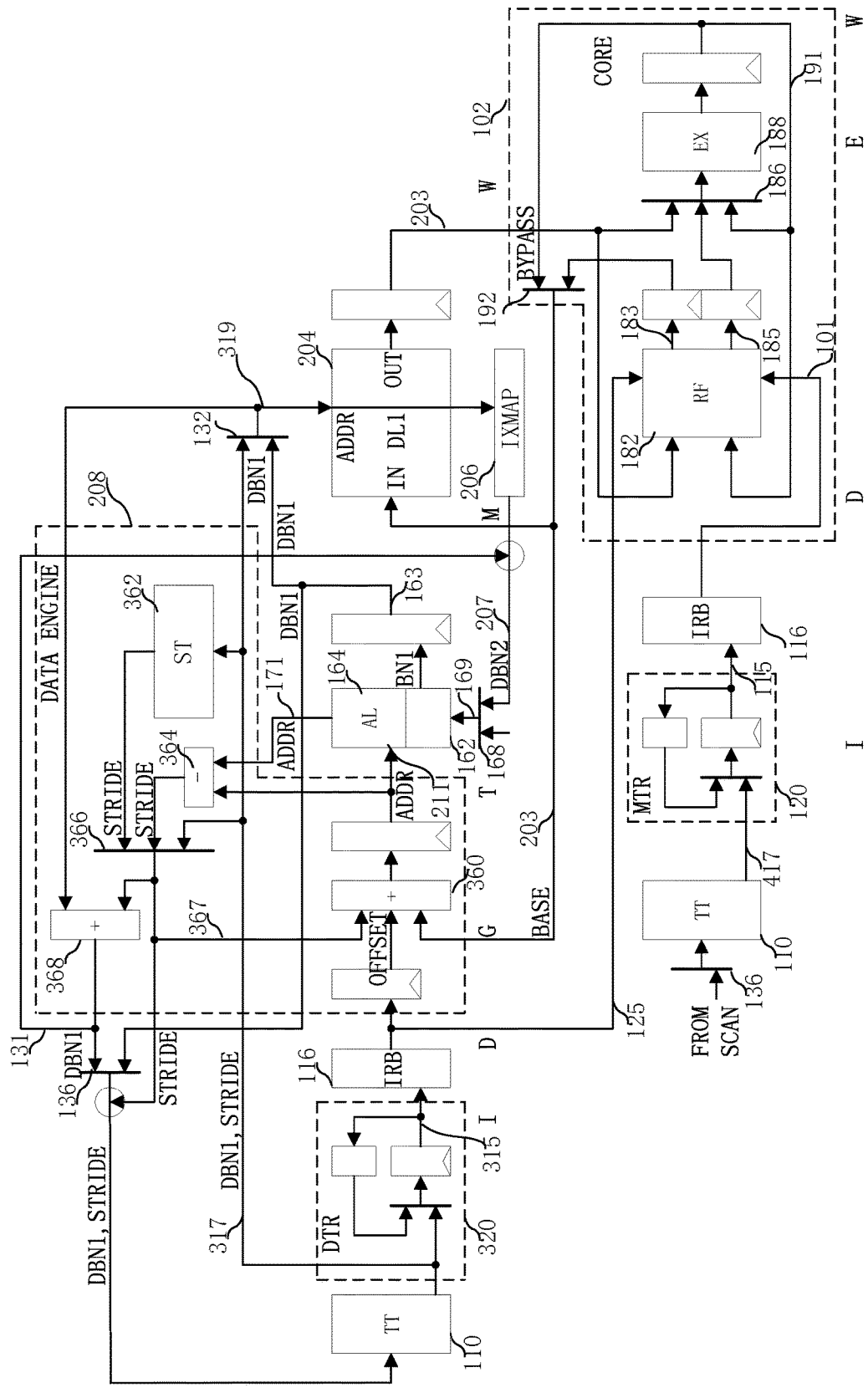
FIG. 11 illustrates a schematic diagram of an exemplary pipeline structure for the processor systems according to the disclosed embodiments.

FIG. 11 illustrates a schematic diagram of an exemplary pipeline structure for the processor systems according to the present disclosure. FIG. 11 depicts the pipeline structure corresponding to the processor system as shown in FIG. 8. In the pipeline structure, the main pipeline is divided into four stages, including a fetch stage (I), a decode stage (D), an execute stage (E), and a write back stage (W). The data pipeline is divided into six stages, including a fetch stage (I), a decode stage (D), an execute stage (E), an address generation stage (G), and an address conversion stage (T), a memory access stage (M), and a write back stage (W).

According to FIG. 8, the main pipeline is mainly used by the track table 110 (the first read port), the master tracker 120, the instruction read buffer 116, and the processor core 102. The data pipeline is mainly used by the track table (the second read port), the data tracker 320, the instruction read buffer 116, the data engine 208, the block number mapping module 162, the secondary tag memory 164, and the primary data cache 204.

Specifically, in the I stage of the main pipeline, the read pointer 115 of the master tracker 120 reads the corresponding instruction from the instruction read buffer 116. In the D stage of the mina pipeline, the processor core 102 receives the instruction on the bus 101, decodes the instruction by the decoder in the processor core 102, controls the register stack 182 to read a single or a plurality of operands, and outputs to the bus 185. In the E stage of the main pipeline, the bypass selector 186 selects between the data read from the data pipeline, the operand or operands read from the register stack 182, and the execution result bypassed from the bus 191, and outputs the selection to the execution unit 188 for calculation. In the W stage of the main pipeline, the calculation result is written back to the register stack 182 through the bus 191, is bypassed to the bypass selector 186 of the E stage at the same time, and is sent to the bypass selector 192 in the G stage of the data pipeline.

According to the technical solution of the present invention, the data pipeline is divided into two paths based on the functions: the EB pipeline using the EB technique, and the stride pipeline using the stride technique. The EB pipeline uses all six stages of the data pipeline. When there is no bubble in the data pipeline, in the I stage, when the read pointer 315 of the data tracker 320 points to a data point, the read pointer 315 addresses the instruction read buffer 116 to read the corresponding data access instruction and to output to the bus 125. Because there is no bubble in the data pipeline, in the D stage, the base address register number of the data access instruction is sent, through the bus 125, to the register stack 182 of the processor core 102 to read the corresponding register value (i.e., the base address register value) to output to the bus 183. The address offset is temporarily stored as an input to the adder 360 in the G stage.

In the G stage, the bypass selector 192 selects between the base address register value read from the register stack 182 in the D stage of the data pipeline and the execution result output by the execution unit 188 in the E stage of the main pipeline, and the selection is sent, through the bus 203, to another input of the adder 360. The third input of the adder 360 is "0" or the data stride selected by the selector 366 from the bus 367. When the third input is "0", the output of the adder 360 is the current data address. When the third input is "1", the output of the adder 360 is the next data address. In the T stage, the data address calculated by the adder 360 is sent, through the bus 211, to the active table 160 to be converted to DBN1 as described previously, and the corresponding data is ensured to be loaded to the primary data cache 204.

In addition, DBN1 previously stored in the data point is converted to BN2 by the block number inverse mapping module 206 to read the corresponding block address from the secondary tag memory 164 to reconstruct the data address corresponding to the previous data. The previous data address is subtracted by the subtractor 364 from the current data address on the bus 211 to obtain the latest data stride. In the M stage, the converted DBN1 is sent to the primary data cache 204 to read the corresponding data. In the W stage, the data is written back, through the bus 203, to the register stack 182, and is sent to the bypass selector 186 for use by the execution unit 188 in the E stage of the main pipeline.

As shown in FIG. 11, the data access instruction is issued three cycles in advance, and the T stage (the fourth stage) in the data pipeline coincides with the I stage (the first stage) in the main pipeline. In this way, when the there is no register correlation between the preceding data access instruction and the succeeding non data access instruction, the data obtained in the M stage (the fifth stage) in the data pipeline may be bypassed by the selector 186 to the execution unit 188 of the E stage (the third stage) in the main pipeline, eliminating the delay slots where the data access instruction fetches the data in the conventional pipeline.

For the convenience of illustration, inter-stage registers are omitted in the stride pipeline. When the read pointer 315 of the data tracker 320 points to a data point, once the synchronization module 212 detects that the read pointer 115 of the master tracker 120 reaches one track point preceding the current data point (i.e., the time point is "−1"), the content of the data point is read. The primary data cache 204 is addressed through the bus 317, the selector 132, and the bus 319. The corresponding data is read in advance and is sent, through the bus 203, to the register stack 182 of the processor core 102 and the bypass selector 186.

As described previously, in the stride pipeline, the adder 386 adds DBN1 on the bus 319 and the stride on the bus 367 to obtain the stride DBN1, which is output to the bus 131. Here, the stride on the bus 367 has three sources, including the stride on the bus 317 from the content of the track point in the track table 110, the stride from the stride table 362, and the subtraction result from the subtractor 364. As shown in FIG. 3A, the stride point SP the stride stored in the data point in the track table 110 and the corresponding branch decision word (BDW) together may address and read the stride stored in the corresponding entry to form the stride table 362. The function and effect of the subtractor 364 will be described in more details later in the specification.

According to the technical solution of the present invention, as described previously, whether the addition result of the adder on the bus 131 exceeds certain boundaries may determine different subsequent operations. Specifically, when the operation result of the adder 368 indicates that the stride DBN1 does not exceed the boundary of the primary data memory block where the original DBN1 (i.e., DBN1 on the bus 319), the selector 136 selects the stride DBN1 on the bus 131 as the output to be written back to the data point in the track table 110.

It should be noted that, only when the previously stored stride is found to be incorrect, the new stride (generated by the subtractor 264) obtained by the current calculation may be written back to the data point, or the entry pointed by the stride pointer (SP) of the data point in the stride table 362. Otherwise the stride of the data remains unchanged.

When the operation result of the adder 368 indicates that the stride DBN1 is located outside of the primary data memory block where the original DBN1 is located, but does not exceed the boundary of the secondary memory block, as described previously, the original DBN1X on the bus 319 is sent to the block number inverse mapping module 206 to convert to the corresponding BN2X. Along with the sub-block number and BN1Y of the stride DBN1, the BN2X is sent, through the bus 207 and the selector 168, to the block number mapping module 162 to select the corresponding BN1, which is written back to the data point through the bus 163 and the selector 136.

When the operation result of the adder 368 indicates that the stride DBN1 exceeds the boundary of the secondary memory block where the original DBN1 is located, as described previously, the data address calculated by the adder 360 is converted to DBN1 to be written back to the data point.

Thus, whenever a BN1 is read from the data points in the track table 110, DBN1 may be used to address the primary data cache 204 to read the corresponding data for use by the processor core 102 when executing the data access instruction corresponding to the data point. At the same time, the DBN1 and the stride are added to calculate the stride DBN1 corresponding to the next data. At this time, when the data corresponding to the stride DBN1 has not been stored in the primary data cache 204, as described previously, the corresponding data block is loaded from the lower level memory to the primary data cache 204. In addition, the stride DBN1 is written back to the data point for use by the next data read.

As shown in FIGS. 6 and 8, in the pipeline in FIG. 11, the synchronization module 212 controls the issuing time points for the data access instructions in the EB pipeline. In the example of the issuing of three cycles in advance, the synchronization module 212 only needs to check the register correlation between the data access instruction and the three preceding instructions as described previously, and based on the result, generates the corresponding number of bubbles to postpone the issuing of the data access instruction.

FIG. 12 illustrates a schematic diagram of another exemplary pipeline architecture for the processor systems according to the present disclosure. As shown in FIG. 12, the data access instruction issues three cycles in advance (i.e., the synchronization module 212 does not generate any bubble). The instruction I1, I2, I3, I4, I6, and I8 are arithmetic and/or logic operations which are executed in the main pipeline, traversing four pipeline stages. The instruction I5 is a data read instruction (LOAD) which is executed in the EB pipeline of the data pipeline, traversing six pipeline stages.

In one embodiment, because the E stage of the instruction I1 is completed before the G stage of the instruction I5, the execution result of the instruction I1 may be bypassed to the G stage of the instruction I5 for use. That is, regardless of the register correlation between the instruction I5 and the instruction I1 according to the present disclosure, the instruction I5 issuing time point may not be affected. In addition, when there is no register correlation between the instruction I5 and the instructions I2, I3, and I4 according to the present disclosure, the instruction I5 may issue three cycles in advance. FIG. 12 depicts the pipeline states in these two cases, that is, the I stage of the instruction I5 and the I stage of the instruction I2 issue at the same time.

When there is a register correlation between the instruction I5 and the instructions I2, I3, and I4, the synchronization module 212 generates a corresponding number of bubbles. Specifically, when there is a register correlation between the instruction I5 and instruction I2, the G stage of the instruction I5 must wait until the E stage of the instruction I2 in completed before proceeding further. At this time, the synchronization module 212 generates a bubble so that the instruction I5 postpones the issuing by one cycle with the reference to the baseline in FIG. 12. That is, the instruction I5 issues two cycles in advance.

When there is no register correlation between the instruction I5 and the instruction I2, but there is a register correlation between the instruction I5 and the instruction I3, the G stage of the instruction I5 must wait until the E stage of the instruction I3 is completed before proceeding further. At this time, the synchronization module 212 generates two bubbles so that the instruction I5 postpones the issuing by two cycles with the reference to the baseline in FIG. 12. That is, the instruction I5 issues one cycle in advance.

When there is no register correlation between the instruction I5 and the instructions I2 and I3, but there is a register correlation between the instruction I5 and the instruction I4, the G stage of the instruction I5 must wait until the E stage of the instruction I4 is completed before proceeding further. At this time, the synchronization module 212 generates three bubbles so that the instruction I5 postpones the issuing by three cycles with the reference to the baseline in FIG. 12. That is, the instruction I5 does not issue in advance.

As described above, under the control of the synchronization module 212 according to the present disclosure, the data access instructions may issue by between zero and three cycles in advance.

It should be noted that the bubbles in the EB pipeline do not necessarily cause the bubble generation in the main pipeline. According to the technical solution of present invention, whether the main pipeline generates any bubbles depends on the distance between the first instruction following the LOAD instruction that uses the data read by the LOAD instruction and the last instruction preceding the LOAD instruction that has a register correlation with the LOAD instruction. As long as there is a sufficient distance between these two instructions, the LOAD instruction may prevent the bubbles from being generated in the main pipeline no matter where the LOAD instruction itself is located (i.e., the instruction address).

The distance that ensures that no bubbles are generated in the main pipeline is called the critical distance. In one embodiment, the critical distance is "5", that is, as long as the distance between two instructions is greater than or equal to five instructions, no bubble may be generated in the main pipeline. When the distance is less than "5", a corresponding number of bubbles may be inserted in the main pipeline. Specifically, when the distance is "4", one bubble may be inserted. When the distance is "3", two bubbles are inserted. When the distance is "2", three bubbles are inserted (the distance between two instructions is at least "2"). Obviously, the existing correlation detection logic or bypass logic in the main pipeline may be used to determine the inter-instruction distance.

Taking the pipeline shown in FIG. 12 as an example, it is assumed that the first instruction following the instruction I5 that uses the data read by the instruction I5 is the instruction I6, the last instruction preceding the instruction I5 that has a register correlation with the instruction I5 is the instruction I1, and the distance between these two instructions is "5". At this time, as described previously, the instruction I5 may issue three cycles in advance. The M stage of the instruction I5 coincides with the D stage of the instruction I6. So the data read by the instruction I5 may be bypassed to the E stage of the instruction I6 for use to avoid any bubbles to be inserted for the instruction I6 in the pipeline.

In another example, it is assumed that the first instruction following the instruction I5 that uses the data read by the instruction I5 is the instruction I8, the last instruction preceding the instruction I5 that has a register correlation with the instruction I5 is the instruction I3, and the distance between these two instructions is "5". At this time, as described previously, the instruction I5 may issue one cycle in advance, and may postpone the issuing by two cycles in the pipeline with reference to the baseline in FIG. 12. The M stage of the instruction I5 coincides with the D stage of the instruction I8. So the data read by the instruction I5 may be bypassed to the E stage of the instruction I8 for use to avoid any bubbles to be inserted for the instruction I8 in the pipeline.

In another example, it is assumed that the first instruction following the instruction I5 that uses the data read by the instruction I5 is the instruction I6, the last instruction preceding the instruction I5 that has a register correlation with the instruction I5 is the instruction I2, and the distance between these two instructions is "4". At this time, as described previously, the instruction I5 may issue two cycles in advance, and may postpone the issuing by one cycle in the pipeline with reference to the baseline in FIG. 12. So the M stage of the instruction I5 coincides with the E stage of the instruction I6 and is impossible to bypass. So one bubble needs to be inserted for the instruction I6 in the pipeline.

In the present invention, because the EB data address and EB DBN1 generated by using the EB technique are absolutely correct, when there is no bubble generated in the main pipeline, it indicates that using the EB technique may conceal the execution of the data access instructions so that the subsequent instruction may be executed in advance to improve the pipeline performance. And once the bubbles are generated, it indicates that using the EB technique is insufficient to conceal the execution of the data access instructions. In this case, the stride technique may be used to read the data in advance by using the stride DBN1 stored in the data points.

In addition, for some data points, sometimes the EB technique may be able to conceal. But in other cases, the EB technique may not be able to conceal. For example, for a data point in a cyclic code, the last instruction that has a register correlation with the data point may be located far away outside the loop when the loop is entered for the first time. The instruction distance (i.e., the distance between the instruction and the first instruction following the data point that uses the data read by the instruction) is greater than or equal to the critical distance. So the EB technique may be used to conceal the data access operation of the data point.

However, once the looping occurs, and at this time, the last instruction that has a register correlation with the instruction is also located in the loop, the instruction distance is likely to be less than the critical distance. Then, the stride technique may be used to avoid waiting in the main pipeline as much as possible. Here, the bubble generation in the main pipeline may be used as a trigger condition to switch from using the EB technique to using the stride technique. For example, for each data point, the EB technique is used for the first visit. Once any bubble is generated in the main pipeline, it is switched to using the stride technique. Otherwise the EB technique continues to be used.

Accompanied with FIG. 8 and FIG. 11, another complete example is used to provide more detailed description. When the scanner 106 inspects the instruction being loaded and determines the instruction is a data access instruction, a corresponding data point is generated in the track table 110. Specifically, when the scanner 106 inspects and finds that the data access instruction uses the direct addressing mode (e.g., the data address is equal to the instruction address plus an immediate number), the scanner 106 computes the data address.

The data address is sent to the active table 160 through the bus 119. When the secondary tag memory 164 is fully associative, the block address of the data address is matched with the block addresses stored in all the sets of the secondary tag memory 164. When the secondary tag memory 164 is set associative, the block address of the data address is matched with the block addresses stored in all the sets of the corresponding group of the secondary tag memory 164.

When the block address match is unsuccessful, it indicates that the data has not been stored in the secondary cache 108. At this time, a substitution algorithm (e.g., LRU algorithm) may be used to allocate a BN2X. Through the bus 835, the data address is sent to the lower level memory to read the corresponding data block to load the secondary memory block pointed by the BN2X in the secondary cache 108. At the same time, a substitution algorithm is used to allocate a DBN1X. the corresponding portion of the secondary memory block is bypassed and loaded to the primary data block pointed by the DBN1X in the primary data cache 204.

Along with the instruction type, the validity bits "11", and the stride value "0", the DBN1 are written, through the bus 163 and the selector 136, to the data point in the track table 110. Then, the DBN1 may provide the corresponding data to the processor core 102. The DBN1X is also written to the memory region DBN1X of the row pointed by the BN2 of the block number mapping module 162 of the active table 160.

When the block address match is successful, but there is no valid DBN1X in the corresponding memory region of the row corresponding to the successfully matched entry of the block number mapping module 162, it indicates that the data has been stored in the secondary cache 108, but the data has not been stored in the primary data cache 204. At this time, as described previously, the operation such as allocating a DBN1X, loading the data block, writing the track table 110, and writing the memory region DBN1X, etc., may be performed.

When the block address match is successful, and there is a valid DBN1X in the corresponding memory region of the row corresponding to the successfully matched entry of the block number mapping module 162, it indicates that the data has been stored in the primary data cache 204. At this time, as described previously, the operation of writing the track table 110 may be performed.

Thereafter, each time the content of the data point us read, DBN1 stored in the data point may be used to address the primary data cache 204 to directly read the corresponding data for use by the processor core 102.

On the other hand, when the scanner 106 inspects and finds that the data access instruction does not use the direct addressing mode, the validity bits of the data point are directly set to "00", and other fields are also set to "0". Then the creation of the data point is completed. Subsequently, the data engine 208 is used in the operation of the data point.

Here, the function of the data engine 208 is similar to a time-division-multiplexed finite state machine. The validity bits of the data point include the corresponding states such that, when the read pointer 315 of the data tracker 320 points to a data point, the data engine 208 becomes a finite state machine for the data point. When the operation of the data point is completed, the state is saved in the validity bits for next time use. Thus, at different times, the data engine 208 functions as a finite state machine in conjunction with the validity bits in different data points. The specific operation of the finite state machine will be described accompanying with FIG. 13A. FIG. 13A illustrates a state transition diagram of an exemplary finite state machine according to the present disclosure.

In the following, primarily, the data read (LOAD) instruction is used for illustration. Later, the data store (STORE) instruction will be described. In addition, for the convenience of illustration, it is assumed that the data needed for the LOAD instruction has already been stored in the primary data cache 204. For the data that has not been stored in the primary data cache 204, as described previously, a DBN1X may be allocated and the corresponding data block may be loaded to the primary data cache 204.

When the read pointer 315 of the data tracker 320 points to a data point, the validity bits included in the content of the read data point may have four cases: "00", "01", "10", and "11", respectively corresponding to the IV state 1302, the LE state 1304, the EB state 1306, and the SR state 1308 as shown in FIG. 13A.

For the first case (the validity bit value is "00"), the data point is in the IV state 1302. At this time, the data engine 208 uses the EB technique. As described previously, the EB pipeline is used to calculate the EB data address, which is sent to the active table 160 to convert to the EB DBN1 as described previously. Through the bus 163 and the selector 132, the EB DBN1 is sent to address the primary data cache 204 to read the data for use by the processor core 102. In addition, the EB DBN1 and the new validity bit value "01" are written back to the data point so that the data point enters into the LE state 1304. As shown in FIG. 13A, the data point is transitioned from the IV state 1302 to the LE state 1304.

For the second case (the validity bit value is "01"), the data point is in the LE state 1304. At this time, the data engine 208 still uses the EB technique. As described previously, the EB pipeline computes the EB data address, converts to the EB DBN1, and reads the data in advance. In addition, the EB pipeline reads the DBN1 previously stored in the data point. In this way, the stride may be obtained by computing the difference between the two DBN1s or the two data addresses.

Specifically, the DBN1 is read from the track table 110. Through the bus 317, the DBN1 is sent to address the block number inverse mapping module 206 to read the corresponding BN2S. Through the bus 207 and the selector 168, the BN2S is sent to address the secondary tag memory 164 to read the corresponding block address. The block address and the previously converted BN2Y together may form the data address. Through the bus 171, the data address is sent to the subtractor 364 in the data engine 208. The subtractor 364 subtracts the EB data address on the bus 211 from the merged data address from the bus 171. The subtraction result is the data stride. According to the technical solution of the present invention, each newly computed stride may be written back to the data point. Alternatively, the newly computed stride is written back to the data point only when the newly computed stride and the stride previously stored in the data point are different.

Alternatively, the EB data address on the bus 211 may be sent to the secondary tag memory 164 and the block number mapping module 162 to match and convert to the EB DBN1 according to the present disclosure. Then, the EB DBN1 is subtracted from the DBN1 on the bus 317. When the two DBN1s are located in a same primary data block, the subtraction result is the data stride.

In the process describe above, when the execution of the data point in the EB pipeline does not cause the subsequent instruction to generate bubbles in the main pipeline, the EB technique is successful in concealing the data access process of the data point and the validity bits of the data point are set to "10" (i.e., entering to the EB state 1306). As shown in FIG. 13A, the data point transitions from the LE state 1304 to the EB state 1306. Otherwise, the EB technique is not successful in completely concealing the data access process of the data point and the validity bits of the data point are set to "11" (i.e., entering the ST state 1308). As shown in FIG. 13A, the data point transitions from the LE state 1304 to the SR state 1308.

After entering the SR state 1308, the stride data address is calculated and converted to the stride DBN1, which is written back to the data point to prepare the data as early as possible. Specifically, the selector 366 selects between the data stride generated by the subtractor 364, the data stride output from the stride table 362, and the data stride output by the track table 110 on the bus 317. The selection result of the correct data stride is sent to the adder 368 to be added with the current DBN1 on the bus 319 to calculate the next DBN1, which is written back to the data point in the track table 110. Alternatively, the correct data stride selected by the selector 366 may be directly written back to the data point in the track table 110. By the next time the data point is executed or soon to be executed (i.e., the read pointer 315 of the data tracker 320 points to the data point again), the next DBN1 is then calculated.

Alternatively, the validity bits of the data point may be directly set to "11" (i.e., entering the SR state 1308) regardless of the generation of the bubbles in the main pipeline. This may be considered as a special case.

For the third case (the validity bit value is "10"), the data point is in the EB state 1306. At this time, like the second case, the EB technique is used for the subsequent operations. Similarly, when the EB pipeline causes bubbles to be generated in the main pipeline, the validity bits are set to "11" (i.e., entering to the SR state 1308). As shown in FIG. 13A, the data point transitions from the EB state 1306 to the SR state 1308. Otherwise, the validity bits remains to be "10". As shown in FIG. 13A, the data point transitions from the EB state 1306 to itself.

For the fourth case (the validity bit value is "11"), the data point is in the SR state 1308. At this time, the DBN1 (i.e., previously calculated and converted stride DBN1) stored in the data point is used to address the primary data cache 204 to read to the corresponding data for use by the processor core 102. At the same time, as described previously, the DBN1 and the stride are added to obtain the new stride DBN1. Depending on whether the new stride DBN1 exceeds the boundary of the primary or secondary data block where the old DBN1 is located, proper operations may be performed so that the data corresponding to the stride DBN1 is ensured to store in the primary data cache 204, and the stride DBN1 is written to the data point for use by the next data access. The validity bit value of the data point remains unchanged. As shown in FIG. 13A, the data point transitions from the SR state 1308 to itself.

According to the technical solution of the present invention, the EB DBN1 obtained by using the EB technique is definitely correct. However, it may not be successful in completely concealing the data access process, causing a halt in the main pipeline. And the power consumption of the EB pipeline is greater than the stride pipeline. As described previously, when the data point is in the EB state 1306, and the EB pipeline causes the bubble generation in the main pipeline, then the validity bits are set to "11", entering to the SR state 1308 to avoid the performance loss due to the main pipeline halt. At this time, the stride DBN1 keeps updated so that the data that may be used next time the data point is executed is loaded to the primary data cache 204 in advance.

Of course, according to the technical solution of the present invention, in order to reduce the power consumption, when the data point transitions from the EB state 1306 to the SR state 1308, only the stride and the EB DBN1 are stored in the data point without performing the operations for the stride data address calculation and the stride DBN1 conversion. Alternatively, when the EB pipeline causes the bubble generation in the main pipeline, the validity bits may be directly set to "00", returning to the IV state 1302 to start over. For these cases, the descriptions may be referred to various embodiments according to the present disclosure.

According to the technical solution of the present invention, the stride technique requires smaller power consumption, does not halt the main pipeline, and substantially reduces the data cache miss rate. However, the stride DBN1 may not be correct. Thus, when the data point is in the SR state 1308, it is necessary to verify the data address generated during the actual execution of the data point in the data pipeline with the previously calculated and converted stride DBN1. Obviously, the EB pipeline may be used to generate the data address for verification.

Specifically, there are many methods of verifying the data addresses. For example, in the first method, the EB data address generated by the adder 360 in the EB pipeline us sent through the bus 211 to the active table 160 to convert to EB DBN1. The EB DBN1 is compared with the stride DBN1 of the data point in the track table 110. When the two DBN1s are the same, the stride DBN1 is correct and the main pipeline may continue to operate. When the two DBN1s are different, the stride DBN1 is not correct and it is necessary to clear the intermediate execution result of the instruction that uses the data of the LOAD instruction in the main pipeline. At the same time, the EB DBN1 is used to read the data from the primary data cache 204 to the processor core 102 so that the instruction that has the data cleared may obtain the correct data to re-execute in the main pipeline. In addition, the EB DBN1 and the validity bits "01" together are written back to the data point to make the data point enter the LE state 1304. As shown in FIG. 13A, the data point transitions from the SR state 1308 to the LE state 1304. At this time, the stride of the data point is not valid.

In the second method, for example, the stride DBN1 of the data point in the track table 110 is read and sent to the block number inverse mapping module 206 and the active table 160 to convert to the stride address. The stride address is compared with the EB data address generated by the adder 360. Depending on the comparison result, the corresponding subsequent operations may be performed as described previously. This method does not require the EB DBN1 generation by the tag match and further reduces the power consumption.

In the third method, for example, an extra memory may be used to store the base address corresponding to the data point. As described previously, the memory may be addressed by the stride pointer (SP) of the data point or the read pointer 315 of the data tracker 320. At this time, the base address value stored in the memory for the last execution of the data point is read from the memory. The base address value and the stride are added to obtain a value that is compared with the current base address on the base 203 that comes from the register stack 182 of the processor core 102. Depending on the comparison result, the corresponding operations may be performed as described previously. This method does not require the generation of the EB data address and EB DBN1, and further reduces the power consumption.

In the fourth method, for example, an extra memory may be used to store the branch decision word (BDW) corresponding to the data point. That is, at the same time the stride DBN1 corresponding to the next data address of the data point is calculated, the current BDW is saved. For example, each data point in the track table 110 may add a BDW field configured to store the BDW corresponding to the data point. Every time the next DBN1 of the data point is calculated, the current BDW is saved in the BDW field of the data point.

When the read pointer 315 of the data tracker 320 points to the data again, the BDW value in the BDW field (the predicted BDW, i.e., the branch transfer status when predicting the DBN1) is read and compared with the BDW (the actual BDW, i.e., the branch transfer state when executing). When the two BDWs are the same, the looping status at the time of predicting the stride of the data point is consistent with the looping status at the time of actual execution. The previously predicted stride and the stride DBN1 are considered to be correct. When the two BDWs are different, the looping status at the time of actual execution has changed. Then, the EB pipeline calculates the EB data address and the EB DBN1, reads the data from the primary data cache 204 for use by the processor core 102.

The EB DBN1 and the validity bits "01" together are written back to the data point to make the data point enter the LE state 1304. As shown in FIG. 13A, the data point transitions from the SR state 1308 to the LE state 1304. Obviously, an entry may be added to each column of the stride table 362 to store the BDW value.

Alternatively, when the predicted BDW and the actual BDW are different, it is not necessary to use the EB pipeline to calculate the EB DBN1. Instead, the previously calculated stride DBN1 (i.e., the incorrect DBN1) is subtracted by the predicted data stride (i.e., the stride stored in the track table 110 or the stride read from the stride table 362 by using the predicted BDW), and then added by the actual data stride (i.e., the stride read from the stride table 362 by using the actual BDW), to obtain the correct DBN1.

Alternatively, when the predicted BDW and the actual BDW are different, the predicted data stride is subtracted from the actual data stride to obtain the data stride difference. The previously calculated stride DBN1 (i.e., the incorrect DBN1) and the data stride difference are added to obtain the correct DBN1.

From the above description, when the data point being executed is in the SR state 1308, it is necessary to verify the stride DBN1 in real time. However, it is not necessary to use the EB pipeline to calculate the EB data address or the EB DBN1. So the power consumption may be reduced. In addition, once the stride DBN1 is found to be incorrect during the verification, the data point enters to the LE state 1304, and uses the EB pipeline to calculate the EB data address and the EB DBN1 to provide the processor core 102 with the correct data.

According to the technical solution of the present invention, when the data engine 208 is used a finite state machine, other state transition cases are possible. FIG. 13B illustrates a state transition diagram of another exemplary finite state machine according to the present disclosure. The four states in FIG. 13B are the same as those in FIG. 13A except that when the data point being executed is in the LE state 1304, the data point enters to the EB state 1306 whether or not the EB pipeline causes the bubble generation in the main pipeline. Only when the data point being executed is in the EB state 1306, and the EB pipeline causes the bubble generation in the main pipeline, then the data point enters to the SR state 1308. Otherwise the data point remains in the EB state 1306. Of course, FIG. 13B depicts only one possible state transition case as an example. For other various cases, the corresponding operations may be deducted from this specification and will not be described here.

According to the technical solution of the present invention, whether or not the data point may transition from the EB state 1306 to the SR state 1308, other suitable determination methods may be used in addition to the previously described method that whether the EB pipeline generates any bubbles in the main pipeline determines the state transition.

For example, a counter may be added to each data point. As described previously, the stride pointer SP or the read pointer 315 may be used to address the counter corresponding to the data point. Here, when the data point is in the EB state 1306, determine whether the previously predicted stride and the actual stride are equal. When equal, the corresponding counter is incremented by one. Otherwise, the corresponding counter is cleared. In addition, when the counter is greater than a pre-configured value, the data point enters to the SR state 1308. Otherwise the data point remains in the EB state 1306. Of course, the other suitable determination methods may be used, and the corresponding operations may be deducted from this specification and will not be described here.

The data store instruction (STORE) is illustrated below. According to the technical solution of the present invention, it is not necessary to use the EB technique for the data point corresponding to the STORE instruction. at this time, the conventional method may be used to calculate the data address, which is then mapped to the DBN1 to address the primary data cache 204 so that the data is written to the corresponding memory unit. Because the LOAD instruction has higher priority than the STORE instruction, a write buffer may be added between the processor core 102 and the primary data cache 204 to temporarily store the data and the corresponding address (DBN1) to be written to the primary data cache 204. When the primary data cache 204 is idle, the content of the write buffer is written to the primary data cache 204.

However, when the STORE instruction uses the EB technique to issue from the data engine 208, the read pointer 115 of the master tracker 120 may skip the STORE instruction, and may execute in advance the instruction following the STORE instruction in the main pipeline to improve the system performance. The specific method is similar to the previously described method where the LOAD instruction is skipped except that the data address (DBN1) may be postponed by a certain number of cycles as needed, coinciding with the moment the data read from the register stack 182 arrives. The data may be store to the memory unit pointed by the DBN1 in the primary data cache 204.

FIG. 14A illustrates executing an exemplary data read instruction according to the present disclosure. In one embodiment, the instructions I1, I2, I3, I4, I6, I7, and I8 are arithmetic and logic operation instructions to be executed by the main pipeline. Each instruction may traverse four pipeline stages. The instruction I5 is a data read instruction. The stride technique may used to use the stride pipeline (three pipeline stages) in the data pipeline to directly read the corresponding data from the primary data cache 204. And at the same time, the EB pipeline in the data pipeline verifies the DBN1 (six pipeline stages).

As shown in FIG. 14A, the data read instruction I5 is sent to the data pipeline for execution in advance by three cycles. That is, at the same time the instruction I2 enters into the I stage of the main pipeline, the instruction I5 enters into the I stage of the EB pipeline (in this case, the EB state), or enters into the I stage of both the stride pipeline and the EB pipeline (in this case, the SR state) simultaneously.

Thereafter, when the data point is in the EB state, the instruction I5 passes through the D stage, the G stage, and the T stage of the pipeline in this order to generate the EB DBN1. When the data point is in the SR state, the instruction I5 still passes through the D stage, the G stage, and the T stage of the pipeline. In addition, the M stage of the stride pipeline is delayed by three cycles (indicated by "d" in FIG. 14A) accordingly. The comparison result between the EB DBN1 and the stride DBN1 is used to determine to read the data from the M stage of the stride pipeline or the M stage of the EB pipeline.

In the M stage of the data pipeline, the date is read from the primary data cache 204, and is written to the to the register stack in the W stage. At the same time, the data may be bypassed to the E stage of the instruction I6 and the D stage of the instruction I7 as needed. This, in the best case, the data access instruction skipped in the main pipeline (the data access process is completely concealed) so that the performance of the processor core 102 is improved.

FIG. 14B illustrates an exemplary worst case of executing a data read instruction according to the present disclosure. in one embodiment, it is assumed that the data read instruction I5 is in the EB state, and has the register correlation with the instructions I4 and I6. That is, before the E stage of the instruction I4 is completed, the instruction I5 may not enter the G stage of the EB pipeline. Before the M stage of the I5 is completed, the instruction I6 may not enter the E stage of the main pipeline.

Thus, although the instruction I5 still enters into the EB pipeline three cycles in advance, due to the presence of the register correlation, the synchronization module 212 outputs three bubbles through the bus 205 to insert to the EB pipeline to postpone the issuing of D stage (indicated by "d" in FIG. 14B). As shown in FIG. 14B, the D stage of the EB pipeline and the E stage of the instruction I4 issue simultaneously so that the execution result of the E stage of the main pipeline may be bypassed to the G stage of the EB pipeline to calculate the EB data address. The subsequent operations of the EB pipeline are as described previously.

Accordingly, because the register correlation between the instructions I5 and I6, the number of bubbles in the instruction I6 in the main pipeline is equal to the number of delayed cycles of the instruction I5 in the EB pipeline. Thus, the D stage of the instruction I6 in the main pipeline and the M stage of the instruction I5 in the EB pipeline issue simultaneously so that the data read in the M stage of the EB pipeline may be bypassed to the E stage of the main pipeline. That is, in the worst case, the data read instruction may not be completed in advance, and the data access process may not be concealed (bubbles in the main pipeline).

FIG. 14C illustrates another exemplary worst case of executing a data store instruction according to the present disclosure. Obviously, the data store instruction may have register correlation with the preceding instructions. However, because the data store instruction does not have a target register, the data store instruction may not have any register correlation with the succeeding instructions. As shown in FIG. 14C, because the data store instruction I5 and the instruction I4 have a register correlation, although the instruction I5 enters into the data pipeline three cycles in advance, the D stage of the instruction I5 is postpone by three cycles (indicated by "d" in FIG. 14C).

However, the instruction I6 is not affected by the bubbles in the data pipeline, and still enters into the main pipeline immediately following the instruction I4. That is, the I stage of the instruction I6 and the D stage of the instruction I4 in the main pipeline issue simultaneously. Thus, in the worst case, although the data store instruction may not be completed in advance, the data access process is completely concealed, there is no bubble in the main pipeline, and the performance of the processor system is improved.

In the examples described above, the read pointer 315 of the data tracker 320 may move ahead and point to the first data point passing the read pointer 115 of the master tracker 120. Of course, the data tracker 320 may be further improved to add two more registers that are used to store the content of the data point from the bus 317 (i.e., DBN1, stride, and the validity bits) and the value of the read pointer 315, respectively.

Under the control of the synchronization module 212, the BN1 temporarily stored in the register may address the instruction read buffer 116 at the suitable time to read the corresponding data access instruction, and may perform the subsequent operations as described previously so that the read pointer 315 may continue to move and point to the next (i.e., the second) data point. Similarly, the data tracker 320 may temporarily store more related information of the data points so that the read pointer 315 may point to more distant data points sooner.

According to the technical solution of the present invention, in addition to skipping the data access instructions in the main pipeline, similar approaches may be used to skip the branch instructions so that the efficiency of the main pipeline is higher and the overall performance of the processor system is improved.

FIG. 15 illustrates a schematic diagram of an exemplary pipeline when skipping a branch instruction according to the present disclosure. as shown in FIG. 15, the instructions I1, I2, I3, I4, I6, I7, I8, T6, T7, and T8 are arithmetic and logic operation instructions which are executed in the main pipeline each instruction passes through four pipeline stages (the stages in the main pipeline are the same as shown in FIG. 12). The instruction I5 is a branch instruction which is executed in the branch pipeline and passes three pipeline stages, including a fetch stage (I), a decode stage (D), and a branch decision stage (B).

The I stage and the D stage of the branch pipeline are the same as the I stage and the D stage of the data pipeline, which are used for fetching and decoding the instructions. The B stage of the branch pipeline is used to generate the branch decision result. In addition, in one embodiment, when the branch transfer of the instruction I5 does not occur, the instructions following the instruction I5 are I6, I7, and I8. Otherwise the instructions following the instruction I5 are T6, T7, and T8.

Specifically, in the I stage, the read pointer 315 of the data tracker 320 reads the register number of the corresponding branch instruction from the instruction read buffer 116, which is used for determine the branch transfer decision. Depending on the architecture, the register may store data of different natures.

For example, the register may be used to store an operand. At this time, in the D stage, the register number may be used to read the corresponding operand from the register stack 182 of the processor core 102. In the B stage, the fetched operand is compared, and the comparison result is used to determine the branch transfer decision. In another example, the register is used to store a flag. At this time, the branch transfer decision is made based on the flag value. At this time, in the D stage, the register number is used to read the corresponding flag from the register stack 182 of the processor core 102 to determine the branch transfer decision immediately or to determine the branch transfer decision later in the B stage.

As shown in FIG. 15, in one embodiment, in order to skip the branch instruction I5 (i.e., the I stage of I6 or T6 coincides with I4) in the main pipeline, I5 must be executed three cycle s in advance so that the branch transfer decision generated by the B stage of I5 may be used to select between I6 or T6 to enter the I stage of the main pipeline. Thus, the I stage of the branch instruction I5 coincides with the I stage of the instruction I2.

As described previously, for a direct branch instruction, at the same time the branch instruction is loaded into the primary instruction cache 104, the scanner 106 calculates the branch target address and sends the calculated branch target address to the active table 160 to convert to the corresponding BN, which is written to the corresponding branch pint in the track table 110. The BN is the cache address and may be used to directly address the primary instruction cache 104 or the secondary cache 108 to read the branch target instruction.

In addition, because the address BN1 for the branch point in the track table 110 is also the cache address, the next instruction (fall through instruction) following the branch instruction in order may be obtained by incrementing the BN1Y of the branch point BN1. That is, the BN1 of the next instruction following the branch instruction may be obtained from the structure of the track table 110 itself, and the BN1 may be used to directly address the primary instruction cache 104 to read the corresponding next instruction.

Thus, when the read pointer 315 of the data tracker 320 points to the branch point of the direct branch instruction, both the BN of the next instruction following the branch instruction and the BN of the branch target are ready. Once the branch transfer decision is available, the BN of the next instruction or the BN of the branch target may be selected to obtain the corresponding instruction.

For an indirect branch instruction, the calculation method of the data address may be referred to the previous description. The data engine 208 is used to calculated the branch target address. Other operations are the same as the case for the direct branch instruction. It should be noted that because the indirect branch instruction is processed by the data engine 208, the memory region 953 in the format 951 of the corresponding branch point in the track table 110 includes a track point type set to "1" so that the data engine 208 is able to recognize the indirect branch instruction to perform the operations accordingly.

According to the technical solution of the present invention, in various embodiments, the data engine 208 and the data pipeline may be used not only to process the branch instructions and the data access instructions, but also to process any type "1" instructions. The type "1" instructions may not be limited to the branch instructions and the data access instructions, and may be any instructions that require a plurality of execution cycles (i.e., long execution time) and early issuing (e.g., multiplication instructions, division instructions, etc.).

Therefore, no matter the branch instructions are direct branch instructions or indirect instructions, the technical solution of the present invention may be used to skip the branch instructions in the main pipeline.

Similar to the previous examples, when the branch instruction has a register correlation (i.e., due to the early issuing of the branch point, when the register value is read in the D stage of the branch pipeline, the register value has not been updated to the correct value), bubbles may be generated to insert into the pipeline to postpone the D stage of the branch pipeline. Once a bubble is present in the branch pipeline, the selection between the next instruction and the branch target instruction may be postponed, causing the generation of bubbles in the main pipeline.

Thus, the branch transfer decision result generated in the branch pipeline may be stored (e.g., stored in the branch transfer field of the corresponding branch point in the track table 110) for the next branch prediction when the branch point is executed again. When the read pointer 315 of the data tracker 320 points to the branch point, both the branch target BN and the last branch transfer decision result stored in the branch point may be read. The selection between the next instruction and the branch target instruction may be predicted in advance based on the last branch transfer decision result to avoid the bubble generation in the main pipeline.

Of course, it is also possible to store the last branch transfer decision result in an extra memory as described previously for storing the stride in the data point. The BN1 or the instruction address may be used to address the memory to read the corresponding last branch transfer decision result. In addition, a counter may be added to the branch point. When the counter value is less than or equal to a pre-configured value, no predicted is made. When the last branch transfer decision result read from the branch point is the same as the actual branch transfer status, the counter is incremented by one. Otherwise the counter is cleared to zero. When the counter value is greater than the pre-configured value, the last branch transfer decision result is used for the branch transfer prediction.

According to the technical solution of the present invention, the branch pipeline may share the same I stage and D stage with the data pipeline, and additional branch decision module may be added to perform the function of the B stage of the branch pipeline. This is described in details with the accompanying drawings of FIG. 16A and FIG. 17.

Figure 16A:
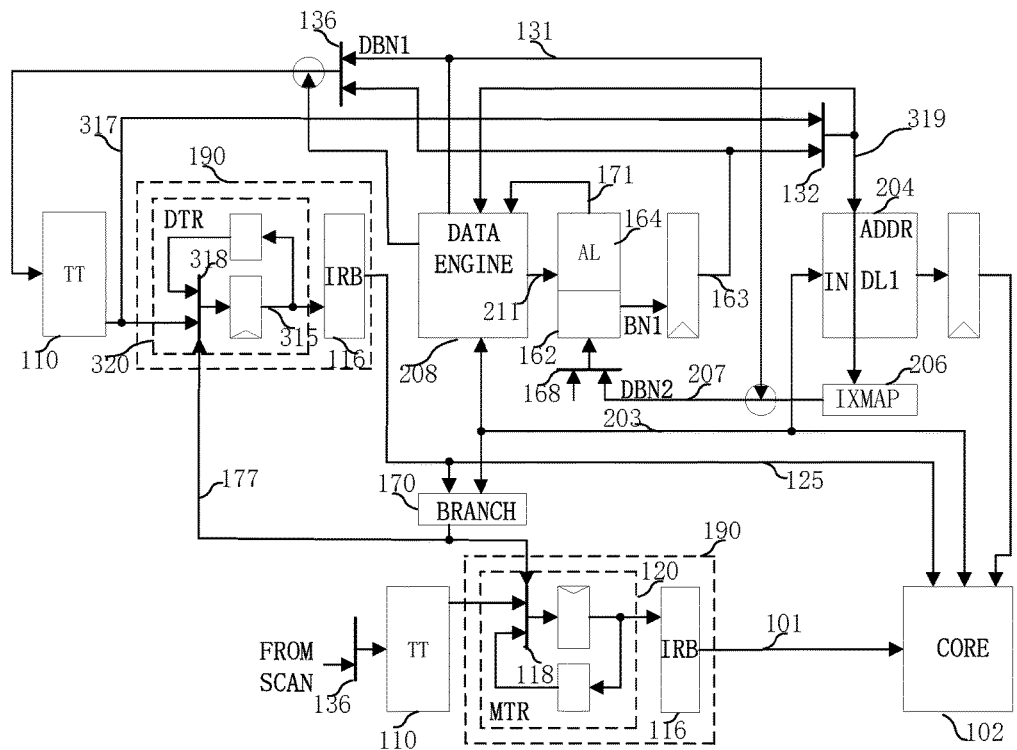
FIG. 16A illustrates a schematic diagram of another exemplary pipeline architecture for processor systems according to the disclosed embodiments.

FIG. 16A illustrates a schematic diagram of another exemplary pipeline architecture for processor systems according to the present disclosure. As shown in FIG. 16A, the main pipeline and the data pipeline are the same as those in FIG. 11. However, for the convenience of illustration, the internal structures of the data engine 208 and the processor core 102 are not shown. The branch pipeline shares the same I stage and the D stage with the data pipeline. A branch module 170 is added in the location corresponding to the G stage of the data pipeline for determining the branch transfer decision so that the function of the B stage of the branch pipeline may be achieved.

In one embodiment, similar to the data engine 208, the instruction read buffer is addressed by the read pointer 315 of the data tracker 320 to output the instruction to the decoder of the branch module 170 through the bus 125. The register number of the instruction on the bus 125 is also sent to the register stack 182 of the processor core 102 to read the corresponding operand, which is sent back through the bus 203 to the branch module 170 or the data engine 208.

The branch module 170 uses the branch type obtained by the decoder and the received operand to generate the branch transfer decision result, which is sent through the bus 177 to the selector 118 of the master tracker 120 and the selector 318 of the data tracker 320. When the branch transfer does not occur, both selectors 118 and 318 select the input from the incrementer. At this time, because the write enable signal for the register 312 of the data tracker 320 is invalid, the output of the selector 318 does not affect the value of the read pointer 315. In the master tracker 120, as long as the stepping signal 111 from the processor core 102 is valid, the write enable signal for the register 112 is valid. The output of the selector 118 is written to the register 112 so that the read pointer 115 is updated to the BN of the next instruction following the branch instruction, and the instruction read buffer 116 is addressed by the read pointer 115 to output the next instruction for execution by the processor core 102.

When the branch transfer occurs, both selectors 118 and 318 select the branch target BN1 from the track table 110. At this time, the write enable signals for both registers 112 and 312 are valid so that both read pointers 115 and 315 are updated to the branch target BN of the branch instruction. When both read pointers 115 and 315 are updated, the primary instruction cache 104 is addressed by the BN1X of the read pointer 115 to output the corresponding instruction block to be loaded to the instruction read buffer 16. The instruction read buffer is addressed by the read pointer 115 to directly bypass the branch target instruction to the processor core 102 for execution.

Figure 16B:
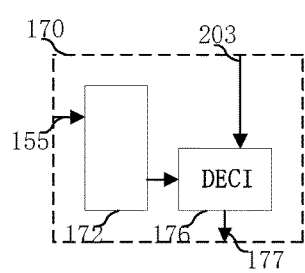
FIG. 16B illustrates an exemplary branch module according to the disclosed embodiments.

According to the technical solution of the present invention, the basic function of the branch module 170 is to obtain and decode the corresponding operand to obtain the instruction type. The branch transfer decision is determined based on the instruction type and the operand. Depending on the instruction set structure, the branch module 170 may have different internal structures. FIG. 16B illustrates an exemplary branch module according to the present disclosure.

For the convenience of illustration, in one embodiment, it is assume that the operands in two registers are compared to determine whether the branch transfer occurs. For other cases where more operands are compared or some operands are immediate numbers, the process may be similar.

In the branch module 170, the decode controller 172 receives and decodes the instruction from the bus 125. When the decoding determines the instruction is not a branch instruction, the instruction is ignored. When the decoding determines the instruction is a branch instruction, the branch instruction is further decoded to obtain the branch type and to generate the corresponding control signal to be sent to the determination module 176.

In the branch pipeline according to the present disclosure, because the branch instruction is processed three cycles in advance, it is necessary to determine the register correlation between the branch instruction and the three preceding instructions, and to calculate the number of bubbles (i.e., to determine the issuing time for the D stage) to be inserted in the branch pipeline. The specific implementation may be referred to various embodiment described previously. Thus, at certain time, when the register correlation is absent, the register number of the branch instruction is sent through the bus 125 to the register stack 182 of the processor core 102 to read the corresponding operand, which is sent back through the bus 203 to the determination module 176 of the branch module 170.

The determination module 176 makes a decision to the operand based on the control signal from the decode controller 172 so that the generated branch transfer decision result is sent out through the bus 177. For example, when the control signal indicates that the two operands are equal, the branch transfer occurs. The determination module 176 compares the two operands to determine whether the two operands are equal, and generates the branch transfer decision result based on the comparison result. In another example, when the control signal indicates the first operand is greater the second operand, the branch transfer occurs. The determination module 176 compares the two operands to determine which operand is greater, and generates the branch transfer decision result based on the comparison result.

Figure 16C:
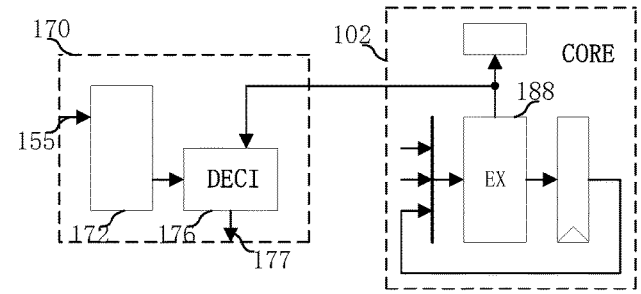
FIG. 16C illustrates another exemplary branch module according to the disclosed embodiments.

FIG. 16C illustrates another exemplary branch module according to the present disclosure. In one embodiment, the branch instruction determines whether the branch transfer occurs based on the execution result or flag of the previous instruction. At this time, the decode controller 172 of the branch module 170 is the same as the one in FIG. 16B, decodes the received branch instruction to obtain the instruction type, and generates the corresponding control signal to be sent to the determination module 176. The difference lies in the number of bubbles generated.

As shown in FIG. 16B, under the worst case, the previous one instruction preceding the branch instruction updates the registered used by the branch instruction, causing the generation of three bubbles. However, as shown in FIG. 16C, under the worst case, the previous one instruction preceding the branch instruction generates the flag used by the branch instruction, causing the generation of two bubbles. That is, under the worst case, the branch module in FIG. 16C generates one less bubble compared with the branch module in FIG. 16B. In addition, because the branch instruction makes the branch decision based on the flag, the branch pipeline does not need to read the operand from the register stack 182 when executing the branch instruction.

Specifically, as show in FIG. 16C, the intermediate result of the flag generated by the execution unit of the processor core 102 is sent to the flag generator 194, and at the same time, to the determination module 176. At the same time the flag generator 194 generates the flag, the determination module 176 uses the control signal sent from the decode controller 172 and the intermediate result sent from the execution unit 188 to generate the branch transfer decision result, which is output to the bus 177. The subsequent operations are the same as those in FIG. 16B.

Figure 16D:
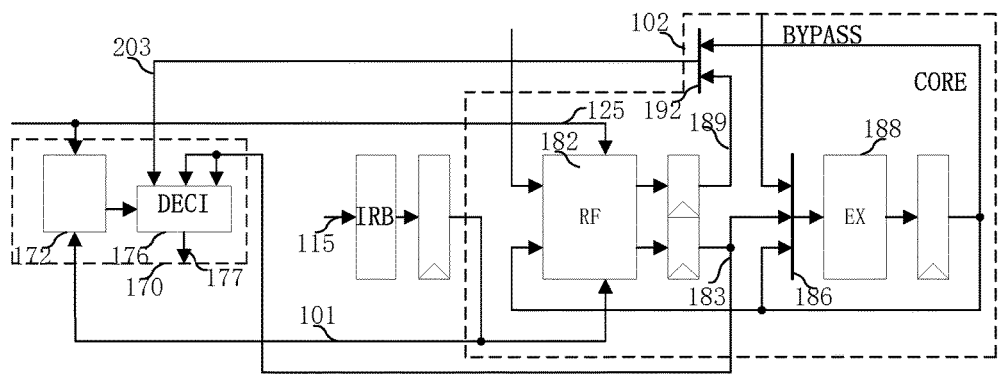
FIG. 16D illustrates another exemplary branch module according to the disclosed embodiments.

In addition, the branch module 170 in FIG. 16B may be further improved such that, in the worst case, the branch pipeline only needs to generate two bubbles, that is, achieving the same performance as in FIG. 16C. FIG. 16D illustrates another exemplary branch module according to the present disclosure.

In one embodiment, the decode controller 172 not only decodes the branch instruction on the bus 125, but also decodes the instruction on the bus 101 (i.e., the previous one instruction preceding the branch instruction). The determination module 176 has three inputs. Two inputs are the operands on the bus 183 from the register stack 182, corresponding to the two operands used by the previous one instruction preceding the branch instruction. The other input is the operand sent through the bus 189, the selector 192, and the bus 203 from the dedicated read port of the register stack 182 addressed by the register number on the bus 125. Thus, at the same time the previous one instruction reads the operand in the D stage of the main pipeline and sends through the bus 183 to the E stage of the execution unit, the operand is bypassed through the bus 183 to the determination module 176 of the branch module 170.

Here, similar to FIG. 16B, the decode controller 172 checks the register correlation between the branch instruction and the three preceding instructions. When the register correlation is absent, the register number on the bus 125 is sent to the register stack 182 of the processor core 102 to read the corresponding register value, which is sent back through the bus 189, the selector 192 and the bus 203 to the determination module 176 to generate the branch transfer decision result. At this time, the previous one instruction preceding the branch instruction being executed in the E stage of the main pipeline coincides with the branch instruction being executed in the B stage of the data pipeline so that the flag and the branch transfer decision result are generate simultaneously and the execution process of the branch instruction is completely concealed.

When the register correlation is present, the operand in the register that does not have a register correlation is called non-critical operand. The operand in the register that does have a register correlation is called critical operand. The instruction that generates the critical operand is called critical instruction. That is, the branch instruction is register correlated with the critical instruction.

At this time, the decode controller 172 not only sends the number of the register where the non-critical operand is located on the control bus 125 as described previously to the register stack 182 to obtain the non-critical operand, but also extracts the instruction type of the critical instruction as a control signal to be sent the determination module 176.

On the other hand, when the processor core 102 reads the register stack 182 due to the execution of the critical instruction, the operand read for calculating the critical operand is sent to the execution unit 188 and at the same is bypassed to the determination module 176 through the bypass path 183.

The determination module 176 uses the control signal received from the decode controller 172 to process the three operands (e.g., one non-critical operand and two operands for calculating the critical operands). For example, when the critical instruction is a subtraction instruction, and the determination criteria for the branch instruction is an equal test, at this time in the determination module 176, the subtraction operation is performed on the two operands for calculating the critical operand are subtracted, and then the result is subtracted by the non-critical operand to obtain the branch transfer decision result.

Specifically, it is assumed that the critical instruction is a subtraction instruction "SUB R3, R2, R1" (the register R2 value is subtracted by the register R1 value, the result is written back to the register R3), and the branch instruction is "BEQ R4, R3" (when the register R4 value and the register R3 value are equal, the branch transfer occurs). According to the technical solution of the present invention, the determination module 176 executes the equivalent branch instruction "BEQ R4, (R2−R1)" (the register R2 value is subtracted by the register R1 value, and then when the register R4 value is equal to the subtraction result, the branch transfer occurs) in the B stage of the data pipeline.

In another example, when the critical instruction is a logic operation instruction, and the determination criteria for the branch instruction is an equal test, at this time in the determination module 176, the corresponding logic operation is performed on the two operands for calculating the critical operand, and then the result is subtracted by the non-critical operand to obtain the branch transfer decision result. The subsequent operations are the same as those in FIG. 16B. Thus, the branch decision result is at least obtained at the same time as the execution result of the previous one instruction preceding the branch instruction is available. That is, in the worst case, the branch pipeline only needs to generate two bubbles and achieves the effect of FIG. 16C.

Figure 17:
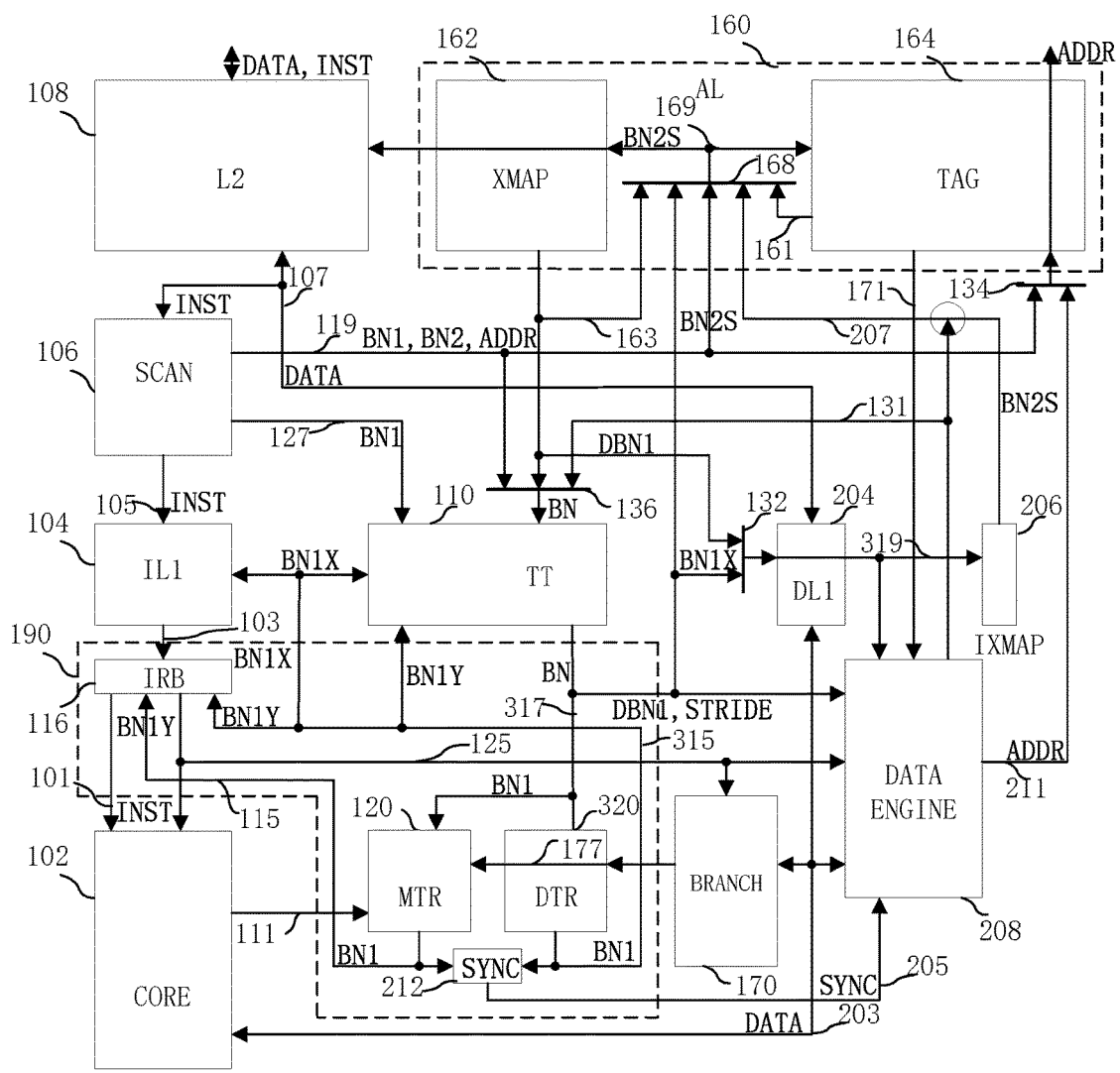
FIG. 17 illustrates another exemplary two-level cache system according to the disclosed embodiments.

FIG. 17 illustrates another exemplary two-level cache system according to the present disclosure. This example corresponds to FIG. 16. For the convenience of illustration, the instruction read buffer 116, the master tracker 120, the data tracker 320, and the synchronization module 212 are combined into a track module 190. Compared with FIG. 8, a branch module 170 is added to replace the processor core 102 to generate the branch transfer decision result. In addition, this example has more differences compared with FIG. 8. The read pointer 315 of the data tracker 320 according to the present disclosure includes BNX and BNY while the read pointer 115 of the master tracker 120 only includes BNY.

In one embodiment, the branch points and the data points passed by the read pointer 315 are not sent to the main pipeline for execution. Specifically, when the content of the track point read by the pointer 315 from the track table 110 indicates the track point is a branch point or a data point, the content of the track point is sent through the bus 317 to the data engine 208. Accordingly, when the track point is a branch point, the instruction is read by the read pointer 315 from the instruction read buffer 116 and is sent to the branch module 170. When the track point is a data point, the instruction is read by the read pointer 315 from the instruction read buffer 116 and is sent to the data engine 208.

In one embodiment, the instruction read buffer 116 is addressed by the read pointer 115 to output the corresponding instruction for execution by the processor core 102. In addition, in the synchronization module 212, the branch instruction is processed in the way as the data access instruction so that the read pointer 115 not only skips the data access instructions, but also skips the branch instructions. That is, the read pointer 115 does not point to any branch instructions or data access instruction in the instruction read buffer 116 so that other instructions are sent to the processor core 102 for execution in the main pipeline.

Here, the instruction read buffer 116 may include one or two instruction blocks. When the instruction read buffer only includes one instruction block, the instruction block is the current instruction block. At this time, only the BNY output by the read pointer 15 of the master tracker 120 is needed to read the corresponding instruction from the instruction read buffer 116 to send to the processor core 102 for execution. When the instruction read buffer 116 includes two instruction blocks, one is the current instruction block, and the other is the next one instruction block in order. Because the read pointer 315 is ahead of the read pointer 115, the read pointer 315 may point to the next one instruction block following the current instruction block early. At this time, only the BNX of the read pointer 315 is needed to address the primary instruction cache 104 to read the next one instruction block to load into the instruction read buffer 116.

Accordingly, a line feed signal is added to the instruction read buffer 116 to point to the current instruction block of the two the instruction blocks. Thus, after the last instruction of the current instruction block is sent to the processor core 102, the line feed signal points to the other instruction block in the instruction read buffer 116, and turns it into a new current instruction block. At the same time, the read pointer of the master tracker 120 overflows to zero or is cleared to point to the first instruction of the new current instruction block.

Of course, the read pointer 115 of the master tracker 120 may also include BNX so that the BNX may, as described previously, point to the correct instruction to read and send to the processor core 102 for execution, regardless of the number of the instruction blocks included in the instruction read buffer 116. In addition, in one embodiment, the selector 118 of the master tracker 120 and the selector 318 of the data tracker 320 both are controlled by the output of the branch module 170.

The case where the read pointer 115 of the master tracker 120 only includes a BNY is illustrated in the following. Unlike FIG. 8, the read pointer 115 does not address the track table 110. Similar to the previous example, a branch point in the track table 110 includes an instruction type and a branch target BN. A data point includes an instruction type, a flag, a DBN1, and a data stride. When the read pointer 315 is moving, the content of the branch point that is read and sent to the bus 317 includes a branch target BN2. As described previously, the BN2 is sent to the block number mapping module 162 to convert to a BN1. As described previously the primary instruction cache 104 is loaded as needed in the process so that the content of the branch point includes a branch target BN1.

In one embodiment, when the read pointer 315 points to a branch point or a data point, the movement is stopped. After the read pointer 115 approaches (i.e., satisfy the advance cycles described previously) and issues the corresponding branch instruction or data access instruction to the branch pipeline or the data pipeline, the read pointer 315 continues to move. Of course, the BN1 of the branch point or the data point and the branch target BN1 of the content of the branch point or the BN1 of the content of the data point may be stored to a FIFO so that the read pointer 315 may continue to move, and convert the branch target BN2 of the subsequent branch point to BN1. This case will be described in FIG. 18.

In addition, in one embodiment, another tracker may be added. The read pointer of the tracker is exclusively used to point to the branch point to replace the branch target BN2 of the branch point with the BN1 as described previously. When the read pointer 315 pauses the movement, the newly added read pointer may continue to move. This case will be described in FIG. 21.

In addition, in the above example, the read pointer 315 of the data tracker 320 may move in advance and point to the first branch point or data point following the read pointer 115 of the master tracker 120. Of course, the data tracker 320 may be further improved to add two more registers. The two registers may be used to store the branch point or data point sent from the bus 317 and the value of the read pointer 315, respectively. Under the control of the synchronization module 212, at the suitable time, the BN1 temporarily stored in the register may be used to address the instruction read buffer 116 to read the corresponding branch instruction or data access instruction. As described previously, the subsequent operations are performed so that the read pointer 315 may continue to move and may point to the next branch point or data point. Similarly, more related information of the branch point or data point may be temporarily stored in the data tracker 320 so that the read pointer 315 may point to more distant branch point or data point sooner.

Figure 18:
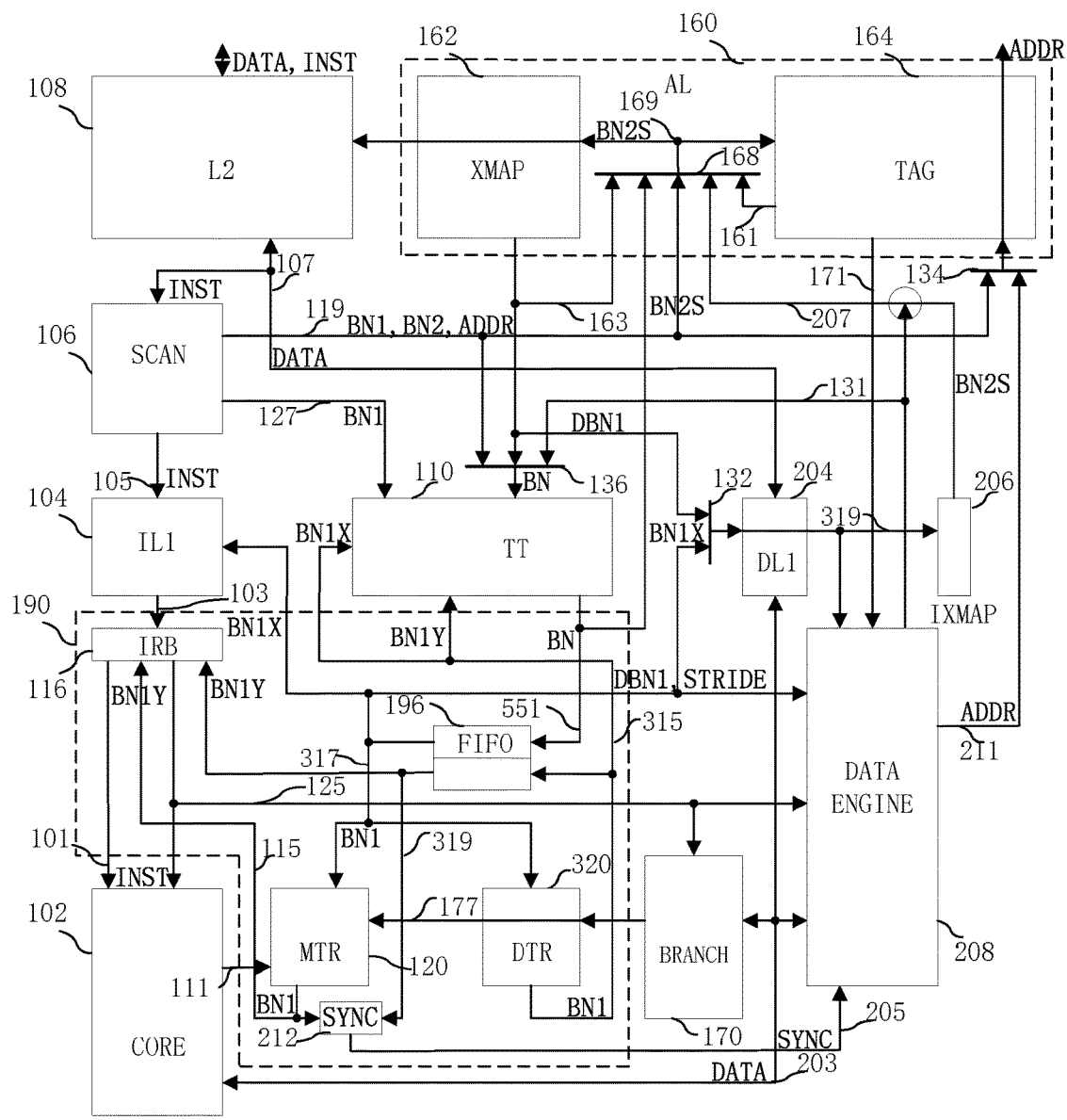
FIG. 18 illustrates another exemplary two-level cache system according to the disclosed embodiments.

FIG. 18 illustrates another exemplary two-level cache system according to the present disclosure. The cache system shown in FIG. 18 is substantially the same as FIG. 17, except that a first-in-first-out (FIFO) 196 is added to the track module 190. Thus, unlike FIG. 17, the read pointer 315 is first temporarily stored in the FIFO 196, and then is sent to the synchronization module 212, the primary instruction cache 104, and the instruction read buffer 116. On the other hand, the content of the track point output from the track table 110 through the bus 317 is temporarily stored in the FIFO 196, and then is sent to the master tracker 120.

Because the track table 110 is addressed by the read pointer 315 to output the corresponding track point content through the bus 551, the value of the read pointer 315 and the value on the bus 551 together may form a BN pair having an associative relationship. Specifically, when the read pointer 315 points to a branch point, the BN pair includes a BN1 of the branch point (hereinafter referred to as source BN1) and a branch target BN1 (when the branch content stores branch target BN2, the BN2 may be converted to the corresponding BN1 as described previously). When the read pointer 315 points to a data point, the BN includes a BN1 of the data point (source BN1) and a DBN1 corresponding to the data. In one embodiment, the FIFO 196 only stores the BN pair corresponding to the branch point and the data point.

Because the FIFO 196 stores the information about the branch points or data points passed by the read pointer 315, as long as the FIFO 196 is not full and the distance between the read pointer 115 and the branch points or data points is greater than the number of advance cycles (at this time, the branch point and the data point are not processed, i.e., not issued to the corresponding branch pipeline or data pipeline), the read pointer 315 may continue to move. In addition, because the FIFO 196 temporarily stores the source BN1 of the branch points or data points, the instruction read buffer 116 may be directly addressed by the source BN1 output by the FIFO 196 to output the corresponding instruction through the bus 125.

Specifically, when the read pointer 315 of the data tracker 320 reaches a branch point or a data point during the movement, the value of the read pointer 315 (i.e., source BN1) and the track point content read from the track table 110 by the source BN1 together may form a BN pair to be stored in the FIFO 196. Then, the read pointer 315 continues to move and points to the next branch point or data point.

In this process, once the branch point pointed by the read pointer 315 includes BN2, the read pointer 315 pauses the movement. As described previously, the BN2 is converted to the BN1. After the BN1 is written back to the branch point (and the instruction block is loaded from the secondary cache 108 to the primary instruction cache 104 as needed) pointed by the read pointer 315, the read pointer continues to move. Alternatively, a FIFO is added to store the value (i.e., the BN1 of the branch point) of the read pointer 315 at the moment. When the BN2 is converted to BN1 which is then written back to the branch point pointed by the BN1 output by the FIFO. In this way, the read pointer 315 continues to move without waiting.

According to the technical solution of the present invention, when the read pointer 315 moves to the end track point of one track, the read pointer 315 may pause, or may read the next track BN1X and the constant "0" (the fixed location of the end track point in the track, no need to be addressed by the read pointer 315) in the track point content from the bus 551 to update the read pointer 315 of the data tracker 320 so that the read pointer 315 may point to the first track point of the next track in the track table 110, and may continue to move and point to the next branch point or data point.

When the FIFO 196 is full, the read pointer 315 pauses until the FIFO 196 is no longer full again. The BN pair currently output by the FIFO 196 includes the first branch point or data point following the instruction pointed by the read pointer 115 of the master tracker 120. As described previously, the source BN1 of the BN pair is sent in advance to the second read port of the instruction read buffer 116 to read the corresponding instruction. The instruction type of the instruction is sent through the bus 125 to the branch module 170. The register number of the instruction and the instruction opcode are sent to the data engine 208. Depending on whether the source BN1 corresponds to a branch point or data point, the branch module 170 or the data engine 208 may perform the corresponding subsequent operations as described previously. At the same time, the first read port of the instruction read buffer 116 is addressed by the read pointer 115 of the master tracker 120 to provide the instruction for the processor core 102.

As described previously, the synchronization module 212 compares the read pointer 115 of the master tracker 120 with the source BN1 output by the FIFO 196 to determine the issuing time point of the branch instruction or data access instruction. Specifically, for a data point, when the difference between the read pointer and the source BN1 is greater than or equal to "−3", the source BN1 is used to address the instruction read buffer 116 to read the instruction. The register number of the instruction is sent through the bus 125 to the register stack 182 of the processor core 102 to read the corresponding register value. The register value is sent to the data engine 208 to be added with the address offset of the instruction on the bus 125 to obtain the EB data address.

Figure 19A:
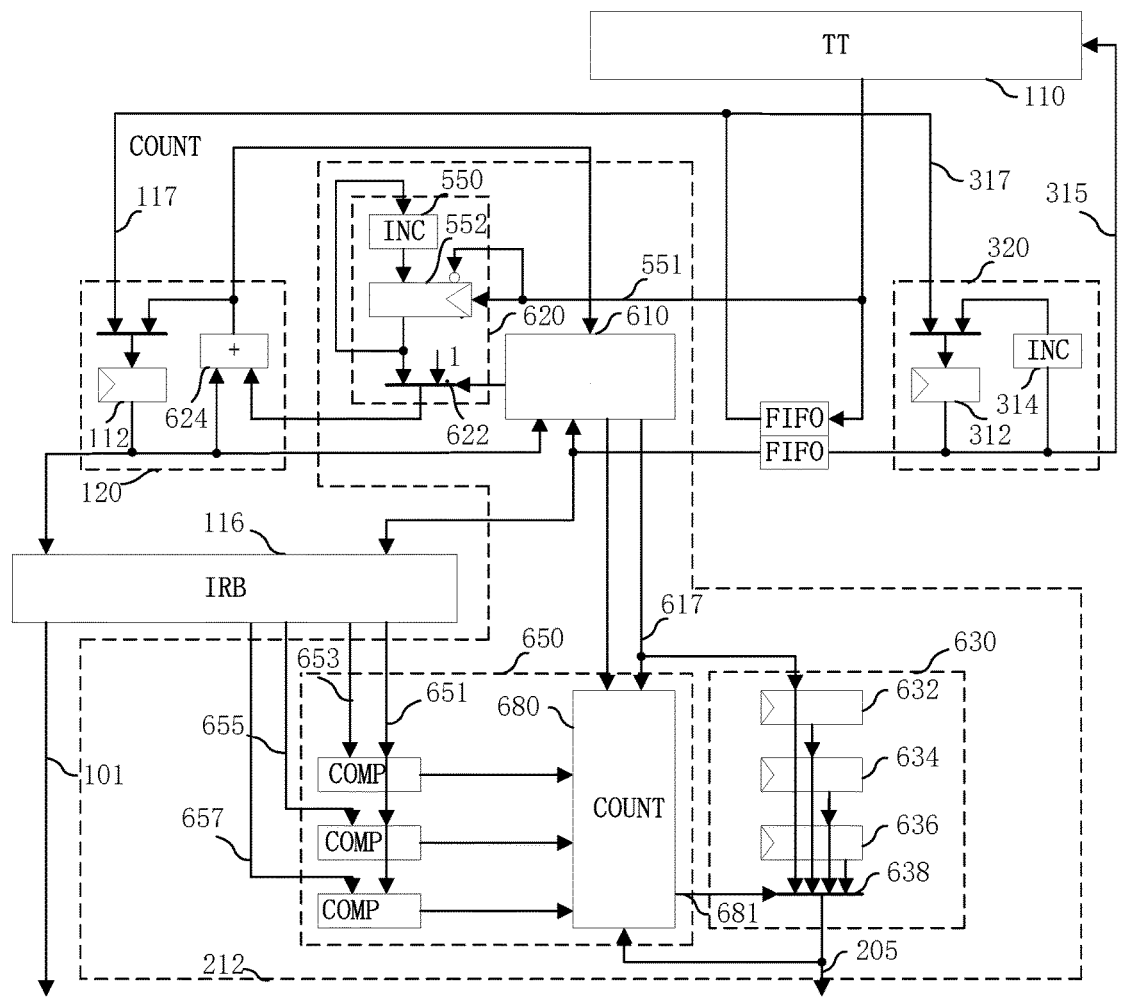
FIG. 19A illustrates an exemplary synchronization module according to the disclosed embodiments.

In one embodiment, unlike the previous case where the read pointer 315 of the data tracker 320 approaches the branch point or data point, the source BN1 output by the FIFO 196 is sent to the synchronization module 212 to determine the issuing time point. So the synchronization module 212 is slightly modified based on FIG. 6. FIG. 19A illustrates an exemplary synchronization module according to the present disclosure. In one embodiment, only the track table 110, master tracker 120, the data tracker 320, the instruction read buffer 116, the FIFO 196, and the synchronization module 212 in FIG. 18 are shown.

In one embodiment, not only the data access instructions are skipped, but also the branch instructions are skipped. So both the data access instructions and the branch instructions are type "1" instructions. All other instructions are type "0" instructions.

One of the differences between FIG. 19A and FIG. 6 is the structure of the correlation detection module 650. As shown in FIG. 6, because the read pointer 315 moves along the instruction read buffer 116 sequentially, when the read pointer 315 points to a branch point or data point (i.e., the type "1"), the target register numbers of the preceding instructions (three preceding instructions as shown in FIG. 6) have been stored in the corresponding register of the correlation detection module 650, and are available for correlation detection with the source register number of the branch instruction or data access instruction. In one embodiment, the FIFO 196 directly outputs the source BN1 to address the instruction read buffer 116. So it is necessary to read the target register numbers of the instructions preceding the source BN1 from the instruction read buffer 116 at the same time.

In one embodiment, it is assumed that the register correlation detection is performed between the branch instruction or data access instruction and the three preceding instructions. The instruction read buffer 116 is addressed by the source BN1 output by the FIFO 196 to output the source register number of the corresponding branch instruction or data access instruction. The source register number is sent through the bus 651 to the three comparators of the correlation detection module 650 as the first inputs. At the same time, the instruction read buffer 116 also outputs the target register numbers of three previous instructions preceding the instruction corresponding to the source BN1. Through the buses 653, 655, and 657, the target register numbers are sent to the three comparators of the correlation detection module 650 as the second inputs. Each of the three comparators compares the two received inputs to perform the register correlation detection as described previously.

Another difference between FIG. 19A and FIG. 6 is the structure of the counter control module 620. As shown in FIG. 6, when the read pointer 115 of the master tracker 120 has not reached the location "−1" away from the branch point or data point, the counter control module 620 outputs a "1", which is sent to the master tracker to increment the read pointer 115 by "1" to point to the next instruction. When the read pointer 115 of the master tracker 120 has reached the location "−1" away from the branch point or data point, the counter control module 620 outputs a "2", which is sent to the master tracker 120 to increment the read pointer 115 by "2" to skip the next instruction (i.e., the branch instruction or data access instruction) to directly point to the instruction following the next instruction.

However, when the instruction following the next instruction is also a branch instruction or data access instruction, the branch instruction or data access instruction may be sent to the branch pipeline or data pipeline for execution accordingly, causing the main pipeline to pause for one cycle. Further, when a plurality of consecutive branch instructions or data access instructions is present, the main pipeline may pause for a plurality of cycles.

In one embodiment, the counter control module 620 adds a counter formed by a register 552 and an incrementer 550 in addition to the selector 622 and a constant '1' present at one of the inputs of the selector 622 as shown in FIG. 6. The incrementer 550 increments the output of the register 552 by "1" and send the result back to the register 552. The register 552 includes a "0" effective asynchronous setting terminal. That is, when the input of the setting terminal is "0", the value of the register 552 is set to "1" regardless of whether the clock signal is active or not. In addition, when the clock signal of the register 552 is active "1", the value of the register 552 may be updated to the output of the incrementer 550.

Thus, when the track point pointed by the read pointer 315 is neither a branch point nor a data point, the track point type (e.g., "0") is read and sent through the bus 551 to both the setting terminal and the clock input of the register 552 at the same time to set the value of the register 552 to "1". At this time, the increment 550 increments the value of the register 552 by "1" to obtain a "2". Then, when the read pointer 315 points to a branch point or a data point, the track point type (e.g., "1") is read and sent through the bus 551 to both the setting terminal and the clock input of the register 552 at the same time. At this time, the input of the setting terminal is "1", and has no effect to the register 552. Because the clock input is "1", the "2" output by the incrementer 550 is written to the register 552, indicating that the read pointer 155 of the master tracker 120 should increment by "2" when skipping one branch instruction or data access instruction. At this time, the incrementer 550 increments the value of the register 552 by "1" to obtain a "3".

Because the FIFO temporarily stores the source BN1, the read pointer 315 may continue to move to the track point following the branch point or data point pointed by the source BN1. When the track point is found to be a branch point or a data point (e.g., the track point type is "1"), the corresponding track point type is sent through the bus 551 to both the setting terminal and the clock input of the register 552 at the same time to update the value of the register 552 to a "3" as described previously. At this time, the output of the incrementer 550 is "4", indicating that the read pointer 115 of the master tracker 120 should increment by "3" when skipping two consecutive branch instructions or data access instructions.

By repeating this process, the corresponding value "N+1" may be output from the register 552 based on the number "N" (i.e., the number of consecutive type "1" instructions) of consecutive branch instructions or data access instructions so that when the difference between the read pointer 115 and the source BN1 output from the FIFO 196 is "−1", the read pointer may increment by "N+1" at one time to skip N consecutive branch instructions or data access instructions.

In certain embodiments, however, for example, when more consecutive type "1" track points are present, the read pointer 315 passes these type "1" track points as described previously, and controls the register 552 of the synchronization module 212 to increment by "1" sequentially. When the read pointer 115 has reached the location "−1" away from the first branch point or data point of the consecutive type "1" track points, it is possible that the read pointer 315 has not moved to the first type "0" track point following the consecutive type "1" track points.

At this time, the value of the register 552 is less than "N+1" (N is the number of consecutive type "1" instructions). When the read pointer 115 is updated to this value, the read pointer 115 may point to one of the consecutive type "1" track points. At this time, the read pointer 115 is used to address the instruction read buffer to output a type "1" instruction. As described previously, the type "1" instruction is sent to the data pipeline for execution, and a bubble is inserted to the main pipeline accordingly. The process is then repeated until the read pointer 115 reaches the first type "0" track point. At this time, the instruction output from the instruction read buffer 116 is sent to the main pipeline for execution.

Alternatively, when the read pointer 115 has reached the location "−1" away from the first branch point or data point of the consecutive type "1" track points, and the read pointer 315 still points to one of the consecutive type "1" track points (i.e., the read pointer 315 has not reached the first type "0" track point following the consecutive type "1" track points), the read pointer 115 may pause updating until the read pointer 315 points to a type "0" track point. In this process, as described previously, the type "1" instructions are sent to the data pipeline for execution. When the read pointer 315 points to a type "0" track point, the value of the register 552 is "N+1". After being updated, the read pointer 115 directly points to the first type "0" track point, and instruction output from the instruction read buffer 116 is sent to the main pipeline for execution.

Specifically, a finite state machine (FSM) may be used to implement the above process. When the read pointer 315 points to a type "0" track point, the FSM is in a count wait state, and the counter is set to "1". At this point, once the read pointer 315 points to a first type "1" track point the FSM enters into a count state. Every time the read pointer 315 passes a type "1" track point, the counter is incremented by "1" (when passing N consecutive type "1" track points, the counter reaches "N+1").

When the read pointer 315 points to the first type "0" track point following consecutive type "'1" track points, the counter stops counting and enters into a count complete state. At the same time, the count result ("N+1") is sent to the adder 624 of the master tracker 120 to be added with the value of the register 112. The addition result is written back to the register 112 so that the read pointer 115 is able to skip N consecutive type "1" track points at one time to point directly to the first type "0" track point following consecutive type "1" track points. Then, the FSM enters into the count wait state, and the counter is set to "1" again. When the read pointer 315 points to the first type "1" track point, the FSM enters into the count state again. The above process is repeated.

As shown in FIG. 19A, the point-in-time detection module 610 has similar functions as the point-in-time detection module in FIG. 6. Both are used to detect the distance between the address of the instruction waiting for issuing and the read pointer of the master tracker. But the point-in-time detection module 610 may also be used to achieve an elastic issuing distance. Some instructions may be issued to the corresponding pipeline in advance at the "−2", "−1", or even "0".

The counter 680 includes a finite state machine, which has a receiving request state as an initial state. When the point-in-time detection module 610 determines that the issuing time is up, the issue request is sent through the bus 617 to the counter 680 and the issuing control module 630. In response to the request, the counter 680 reads the outputs of the three comparators of the correlation detection module 650 for priority encoding. This process is also controlled by the information 611 sent from the point-in-time detection module 610. The information 611 informs the actual distance between the current tracker address and the address waiting for issuing.

For example, the distance is two instructions. The comparators on the buses 657 and 651 may be ignored in the encoding because at this time, the instruction that is present on the bus 657 may be bypassed and may not have any correlation with the instruction waiting for issuing. The counter 680 includes the correlation relationship in the priority encoding to control the selector 638 through the bus 681 to select the corresponding delay cycles.

At the same time, the counter 680 enters into a lockdown state, where any subsequent issuing requests may not be responded by the counter 680. The selector 638 selects different delay cycles in response to different issuing requests. The left most input corresponds to zero delay cycle. The other three inputs correspond to one, two, and three delay cycles, respectively. It is assumed that the current bus 681 controls the selector 638 to select the right most input. The issuing request on the bus 617 passes through the register 632, the register 634, and the register 636 to be delayed by three clock cycles, and then appears on the bus 205 to control the corresponding instruction to issue into the pipeline in advance. At this time, the bus 205 unlocks the counter 680 so that the counter 680 enters into the receiving request state and is ready to receive the next issuing request.

Returning to FIG. 18, for a direct branch point, the BN pair output from the FIFO 196 already includes the corresponding branch target BN1. It is only necessary to wait for the branch transfer decision result generated by the branch module 170 as shown in FIG. 16B, FIG. 16C, or FIG. 16D to determine the corresponding subsequent instruction.

When the branch transfer does not occur, the read pointer 115 of the master tracker 120 continues to increment (increment by "1" or "N+1" in the case N consecutive type "1" instructions are present) to address the instruction read buffer 116 to read the subsequent instruction in the current instruction block for execution by the processor core 102. The FIFO outputs a BN pair. When the difference between the read pointer 115 and the source BN1 of the BN pair is greater than or equal to "−3", repeat the above process.

When the branch transfer occurs, the selector of the master tracker 120 selects the branch target BN1 of the BN pair output from the FIFO 196 to write to the register 112 of the master tracker 120. The branch target BN1 may be selected by the selector 318 of the data tracker 320 to write to the register 312 of the data tracker 320. Thus, both pointers 115 and 315 are updated to the branch target BN1.

As described preciously, the primary instruction cache 104 is addressed by the BN1X (i.e., the BN1X of the branch target BN1) of the read pointer 315 to output the corresponding instruction block (i.e., the instruction block where the branch target is located) to load the instruction read buffer 116. So that the instruction read buffer 116 may be addressed by the read pointer 115 to output the correct branch target instruction for execution by the processor core 102. At the same time, the FIFGO is cleared, the read pointer 315 starts to move from the branch target BN1, and the above process is repeated.

For an indirect branch point, when the difference between the read pointer and the source BN1 is greater than or equal to "−3", the source BN1 is used to address the instruction read buffer 116 to read the instruction, and through the bus 125, the register number of the instruction is sent to the register stack 182 of the processor core 102 to the corresponding register value, which is sent to the data engine 208. The address offset of the instruction is also sent through the bus 125 to the data engine 208. Thus, in the G stage of the data pipeline, the adder 360 of the data engine 208 adds the register value and the address offset to obtain the branch target address. Then, the same approach of processing the data points is used to convert the branch target address to BN1 in the T stage of the data pipeline.

The subsequent operations are similar to the operations for the direction branch point. The difference is that the branch target BN1 of the direct branch point comes from the output of the FIFO 196 while the branch target BN1 of the indirect branch point comes from the active table 160. Thus, when the branch transfer occurs, both the selector 118 of the master tracker 120 and the selector 318 of the data tracker 320 select the branch target BN1 output from the active table 160 to write to the respective registers (i.e., the registers 112 and 312) so that both read pointers 115 and 315 are updated to the branch target BN1. In order make FIG. 18 easy to read, this path is not shown in FIG. 18. Obviously, the specifics of the path implementation may be deducted from the technical solution of the present invention and the various embodiments according to the disclosure. The subsequent operations are the same as the direct branch point.

Thus, in the cache system according to the present invention, both the branch instructions and the data access instructions do not occupy the main pipeline, and are issued as early as possible so that the other instruction following the branch instructions and data access instructions may be executed as early as possible in the main pipeline to improve the system performance.

In one embodiment, the data correlation between the type "0" instructions issued to the main pipeline may be ensured by the interlock and bypass logic in the main pipeline. Similarly, the data correlation between the type "1" instructions issued to the EB pipeline may be ensured by the interlock and bypass logic in the EB pipeline. The data correlation from the type "1" instruction to the type "0" instruction has already been ensured by the interlock and bypass logic in the main pipeline (e.g., when the cache misses occur in accessing the data cache in the ordinary pipeline, the pipeline pauses until the required data is ready).

In the present invention, the conventional methods may not be able to ensure the data correlation from the type "0" instruction (in the main pipeline) to the type "1" instruction (in the EB pipeline). Because the type "1" instructions with long latency are issued in advance, the three type "0" instructions preceding the type "1" instruction may not enter the main pipeline when determining whether the type "1" instruction needs to be issued, it is necessary to check the correlation between the type "1" instruction waiting to be issued and the type "0" instructions that have not been issued. In the present invention, the target register numbers of the type "0" instructions that have not been issued are compared with the source register number of the type "1" instruction waiting to be issued. When the comparison result is the same, the correlation exists.

In the present invention, the register numbers of the type "0" instructions are read from the instruction read buffer 116 in advance (or from the primary instruction cache 104 when multiple read ports are available). The moment before the type "1" instruction is about to be issued is the right time for the correlation detection. It is also possible to check the correlation in advance when the entry corresponding to the type "1" instruction is read from the track table 110 or the track read buffer by the read pointer 315 of the data tracker 320 because the required register numbers may be obtained from the instruction pointed by the read pointer in the instruction read buffer 116 or the primary instruction cache 104, and the preceding instructions. The issuing timeslot information obtained from the correlation detection may be saved to the FIFOs 196 or 198, waiting for the instruction address to be read from the FIFO until the issuing time is up.

Figure 19B:
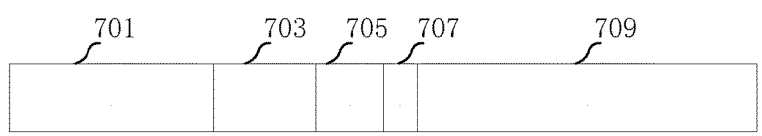
FIG. 19B illustrates an exemplary first-in-first-out mechanism according to the disclosed embodiments.

FIG. 19B illustrates an exemplary first-in-first-out mechanism according to the present disclosure. In one embodiment, each entry in the FIFO 196 saves the information about the issuing time of the type "1" instruction in addition to the source address (i.e., the track table address BN1) of the type "1" instruction, and the branch target address or the data cache address (i.e., the track table content BN1 or DBN1, etc.).

In one embodiment, the information about the issuing time may be stored in two methods. In the first method, when a type "0" instruction is present in the advance issuing timeslot, the time point information is a type "0" represented by the BN1Y of the type "0" instruction. In the second method, when a type "1" instruction is present in the advance issuing timeslot, the type "1" instruction issues after the preceding one type "1" instruction is issued. Because this means that at least one type "1" instruction is present in the three instructions preceding the type "1" instruction, the type "1" instruction may issue in any of the three timeslots as long as the type "1" instruction is issued after the preceding one type "1" instruction is issued. That is, when an instruction of the instruction type "0" that is read from the FIFO 196 or 198 is present in the instruction issuing timeslot, the instruction may be issued when the read pointer 115 of the master tracker 120 reaches the address output from the FIFO. When an instruction of the instruction type "1" is present, the instruction is issued immediately (the output from the FIFO indicates that the preceding type "1" instruction has been issued).

This is different from the previous example where the issuing signal is issued at the issuing time point by the distance between the main tracker 120 and the data tracker 320, and then the correlation detection logic determines how many clock cycles the signal may be delayed. In one embodiment, the correlation detection result has already been included in the timeslot information stored in the FIFO. The logic that generates the information unit may be subtle. When the three instructions preceding the type "1" instruction includes any other type "1" instruction, the issuing timeslot may be adjusted accordingly to load up the pipeline stages in both pipelines as much as possible.

Alternatively, different issuing time points may be set depending on the type and the state of the instruction. For example, a read data instruction in the SR ("11") state may not be necessary to be issued at the "−3" time point, and may be even issued at the "+1" time point. A write data instruction in the SR ("11") state may be executed at the "+2" time point. When making such adjustments, the data hazard and the necessary arbitration in the pipeline may be taken into consideration.

Further, each entry of the FIFO 196 includes the fields as shown in FIG. 19B. The field 701 is for the address (source address) of the instruction waiting for issuing. The field 703 is for the address of the issuing time point. The field 705 is for the pointer number of the issuing time point. The field 707 is for the type of the instruction waiting for issuing. The field 709 is for the content of the track table entry.

When read from the FIFO, the field 701 is used to point to the instruction waiting for issuing in the instruction read buffer 116. The field 703 is the BN1Y address of the issuing time point. The field 705 is the tracker pointer number of the issuing time point. For example, the master tracker 120 is coded as "0", and the data tracker 320 is coded as "1". The field 707 is the type of the instruction pointed by the field 701. For example, the field 707 has a value "0" for type "0" instructions and a value "1" for type "1" instructions.

Thus, when the tracker pointer recorded in the field 705 reaches the address of an instruction with the type shown in the field 707, the instruction pointed by the field 701 is issued to either the EB pipeline or the main pipeline depending on the type in the field 707. The content of the field 709 is suitable for the structure shown in FIG. 18. That is, the entry in the track table 110 corresponding to the address in the field 701 is stored in this field for use when issueting. The FIFO 198 shown in FIGS. 19, 20, 23, 24, and 25 have similar entry format to that of the FIFO 196 except that the field 709 is absent. Because in these embodiments there is a track read buffer 178, the track read buffer 178 stores all the entries for an entire track. The field 701 (i.e., the read pointer 319 in these embodiments) is used to point to the track read buffer 178 to read the entry content for use.

FIG. 20 illustrates another exemplary two-level cache system according to the present disclosure. In one embodiment, the FIFO 198 replaces the FIFO 196 shown in FIG. 18, and a track read buffer (TRB) 178 is added. Here, the track read buffer 178 stores the track corresponding to the instruction block of the instruction read buffer 116, that is, each instruction block of the instruction read buffer 116 is one-to-one mapped with a track in the track read buffer 178.

While the read pointer 315 of the data tracker 320 addresses the track table 110, the BN1 of the read pointer 315 is stored into the FIFO 198 at the same time. In this way, similar to FIG. 18, the read pointer 315 may not have to wait for the execution of a branch instruction or a data access instruction by the processor core 102 and may continue to move directly to point to a subsequent branch point or data point. In addition, the source BN1 output from the FIFO 198 may be used to read the branch target BN1 or the data DBN1 corresponding to the source BN1 from the track read buffer 178. In one embodiment, unlike the FIFO 196 shown in FIG. 18, it is not necessary to store an entire BN pair and only the source BN1 needs to be stored.

Similar to FIG. 19A, when the read pointer 315 addresses the track table 110 and moves to the end track point of one track, the end track point content read from the bus 417 includes a next track BN1X and a constant "0", which may be used to update the read pointer 315 of the data tracker 320. As such, the read pointer 315 may be able to point to the first track point of the next track in the track table 110, and may continue to move to point to the next branch point or data point. Similar to FIG. 18, once the FIFO 198 is full, the read pointer 315 pauses the movement. The read pointer 315 may resume the movement when the FIFO 198 is no longer full. In the movement, when the track point content read from the track table 110 is BN2, as described previously, the BN2 is sent to the active table 160 to convert to BN1, and then the BN1 is written back to the track point.

In one embodiment, the FIFO 198 stores the source BN1 of the BN pair stored in the FIFO 196. Similar to the FIFO 196 in FIG. 18, the source BN1 output from the FIFO 198 is sent to the synchronization module 212. In addition, the output source BN1 is also sent to the track read buffer 178 to read the corresponding branch point or data point.

The track read buffer 178 is addressed by the source BN1 output from the FIFO 198 to output the corresponding track point content through the bus 317. When the track point is a branch point, the branch target BN1X of the branch point content is sent through the bus 317 to the primary instruction cache 104 to read the corresponding instruction block. When the branch transfer occurs, the branch target BN1X of the branch point content updates the read pointer 115 of the master tracker 120 and the read pointer 315 of the data tracker 320 through the bus 317. The updated read pointer 315 is used to address the instruction blocks of the primary instruction cache 104 and the rows of the track table 110 to read the corresponding branch target instruction block and the track, which are loaded through the buses 103 and 417 to the corresponding locations in the instruction read buffer 116 and the track read buffer, respectively.

In this way, both read pointers 115 and 315 point to the branch target instruction or track point, respectively, and the branch target instruction block and the corresponding track are ready for access. The subsequent operations are the same as in the previous embodiments. Of course, it is also possible not to wait until the read pointer 315 is updated to the branch target BN1 and then the updated read pointer 315 is used to read the corresponding branch target instruction block and track from the primary instruction read cache 104 and the track table 110, respectively. Instead, the branch target BN1 output from the track read buffer 178 may be used to address the primary instruction cache 104 and the track table 110 to read the branch target instruction block and the track in advance to load to the instruction read buffer 116 and the track read buffer 178, respectively.

In actual implementations, a selector may be added to select between the BN1X of the read pointer 315 and the branch target BN1X output from the track table 110 to address the primary instruction cache 104 and the track table 110 to read the corresponding track. On the other hand, when the branch transfer does not occur, the FIFO 198 outputs the next source BN1 to continue the above process.

When the track point pointed by the source BN1 output from the FIFO 198 is an end track point, the next track BN1X of the end track point is used to update the read pointer 115 of the master tracker 120 and the read pointer 315 of the data tracker 320 through the bus 317, and the updated read pointer 315 is used to address the instruction block of the primary instruction cache 104 and the row of the track table to read the corresponding instruction block and track, which are loaded through the buses 103 and 417 to instruction read buffer 116 and the track read buffer 178, respectively. As such, both read pointers 115 and 315 point to the first instruction of the next instruction block or the corresponding track point, and the next instruction block and the corresponding track are ready for access. Th subsequent operations and the same as in the previous embodiments.

When the track point pointed by the source BN1 output from the FIFO 198 is a data point, the DBN1 and the stride of the data point content are sent to the data engine 208 through the bus 317. The subsequent operations are the same as in the previous embodiments.

In addition, in one embodiment, the operations of the main pipeline, the data pipeline, and the branch pipeline are the same as in the previous embodiments. That is, the read pointer 115 of the master tracker 120 controls the instruction read buffer 116 to provide the main pipeline with instructions (non-branch instructions and non-data instructions). The read pointer 315 of the data tracker 320 is temporarily stored in the FIFO 198 and then is output to control the instruction read buffer 116 to provide the data pipeline with the branch instructions or data access instructions. The specifics of this process are repeated here.

Figure 21:
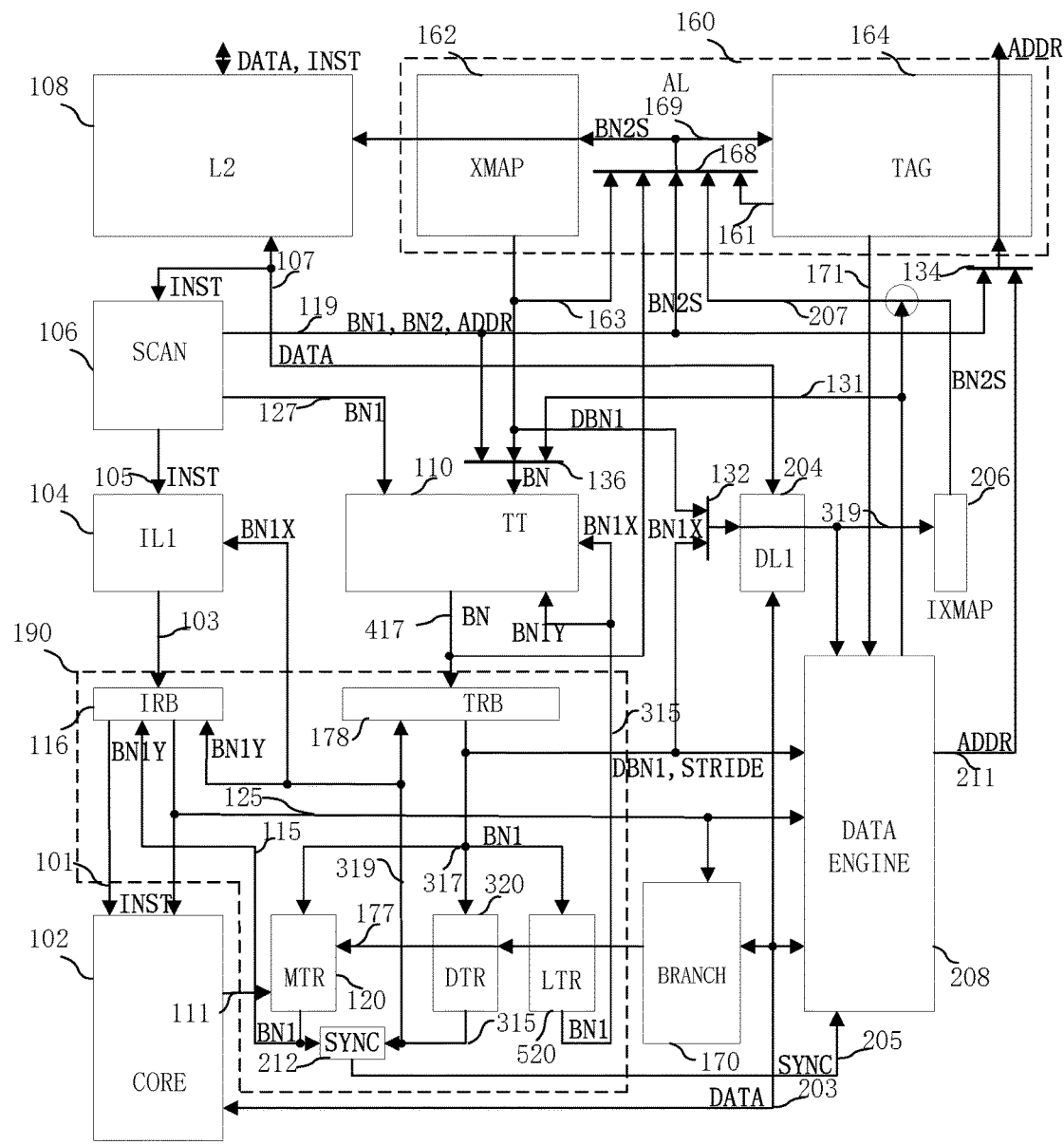
FIG. 21 illustrates another exemplary two-level cache system according to the disclosed embodiments.

FIG. 21 illustrates another exemplary two-level cache system according to the present disclosure. In one embodiment, a look ahead tracker (LTR) 520 is added to replace the FIFO 198 in FIG. 20.

The look ahead tracker 520 has a structure same as the data tracker 320, including a selector 518 (corresponding to the selector 318 of the data tracker 320), a register 512 (corresponding to the register 312 of the data tracker 320), an incrementer 514 (corresponding to the incrementer 314 of the data tracker 320), and an output read pointer 515 (corresponding to the read pointer 315 of the data tracker 320). The look ahead tracker 520 functions as the data tracker 320 in FIG. 20. The read pointer 515 does not need to wait for the execution of a branch instruction or a data access instruction by the processor core 102, instead the read pointer 515 continues to move directly to the subsequent branch points, and replaces the BN2 of the read pointer 515 with the corresponding BN1 as described previously.

In one embodiment, the read pointer 315 of the data tracker 320 points to the first branch point or data point following the track point pointed by the read pointer 115 of the master tracker 120, that is, outputting the source BN1 to the track read buffer 178. In this way, the read pointer according to the present disclosure is equivalent to the output of the FIFO 198 as shown in FIG. 20. Accordingly, in one embodiment, both read pointers 315 and 115 are sent to the synchronization module 212 to determine the issuing time point for the branch instructions or data access instructions, and performs the same functions as in FIG. 20.

In the process the read pointer 515 addresses the track table 110, when moving to an end track point of one track, a next track BN1X and a constant "0" of the end track point content read from the bus 417 update the read pointer 515 of the look ahead tracker 520. As such, the read pointer 515 is able to point to the first track point of the next track in the track table 110, and continues to move to point to the subsequent branch points or data points.

Here, because the data tracker 320 performs the function of the FIFO 198, there is no such case the FIFO 198 is full, and the read pointer 515 never pauses the movement. In addition, when the branch transfer occurs, in addition to both read pointers 115 and 315, the read pointer 515 is also updated to the branch target BN1 as described previously. Specifically, the branch target BN1 is stored to the register 512 of the look ahead tracker 520 through the bus 317 and the selector 518 so that the value of the read pointer 515 is updated to the branch target BN1. Then, the read pointer 515 of the look ahead tracker 520 starts to move from the BN1 to the subsequent branch points, and replaces the BN2 of the read pointer 515 with the corresponding BN1.

According to the technical solution of the present invention, the main pipeline and the data pipeline may be further divided into a front-end pipeline and a back-end pipeline. Both pipelines use the pipeline stages that generate the source operands required for the branch instruction (when executing a branch instruction, the source operand is used to generate the branch transfer decision result) as the first stages of the back end pipelines, respectively. The pipeline stages preceding this stage belong to the front-end pipelines. The pipeline stages succeeding this stage belong to the back-end pipelines.

Specifically, the main pipeline according to the present disclosure is illustrated. The E stage is the pipeline stage that generates the source operand. So in the main pipeline, the front-end pipeline includes the I stage and the D stage. The back-end pipeline includes the E stage and the W stage. Accordingly, in the data pipeline, the front-end pipeline includes the I stage and the D stage. The back-end pipeline includes the G stage, the T stage, the M stage, and the W stage.

Thus, a front-end pipeline is added to the main pipeline and the data pipeline, respectively so that before the branch transfer decision result of the branch instruction is generated, the different front-end pipelines respectively execute the next instruction following the branch instruction sequentially and the branch target instruction, and the respective subsequent instructions. When the branch transfer decision result is generated, the result for one of the two front-end pipelines is sent to the back-end pipeline to continue the execution. Thus, regardless of whether the branch transfer occurs, the main pipeline may not pause or generate bubbles due to the branch instruction.

FIG. 22A illustrates a schematic diagram of an exemplary pipeline containing two front-end pipelines according to the present disclosure. In one embodiment, the instructions I1, I2, I3, I4, I6, T6, I7, T7, I8, and T8 are arithmetic and logic operation instructions which are executed in the main pipeline, and each passes through four pipeline stages. The instruction I5 is a direct branch instruction which is executed in the branch pipeline, and passes three pipeline stages. In Addition, the instructions I6, I7, and I8 are the subsequent instructions following the direct branch instruction I5. The instructions T6, T7, and T8 are the branch target instruction of the branch instruction I5 and subsequent instructions.

According to the technical solution of the present invention, when the read pointer 315 of the data tracker 320 points to a branch point, the next instruction following the branch point has already been stored in the primary instruction cache 104 (at this time, the branch point content is BN1) or the secondary cache 108 (at this time, the branch point content is BN2). As described previously, when the branch point content is BN2, the instruction block where the branch target instruction is located may be loaded to the primary instruction cache 104 in advance, and may update the branch point content to the corresponding BN1. Thus, when the synchronization module 212 detects the difference between the read pointer 115 of the master tracker 120 and the read pointer 315 of the data tracker 320 is greater than or equal to "−3", both the next instruction following the branch point and the branch target instruction are ready for execution in the two front-end pipelines of the processor core 102, respectively.

In one embodiment, the worst case (i.e., the branch instruction I5 and the instruction I4 are register correlated) when executing a branch instruction is illustrated. For more desired cases, similar operations may be performed. Specifically, as shown in FIG. 22A, the branch instruction I5 is sent to the branch pipeline three cycles in advance. That is, at the same time the instruction I2 enters into the I stage of the main pipeline, the instruction I5 enters into the I stage of the branch pipeline. In the subsequent two cycles, the instructions I3 and I4 enter into the I stage of the main pipeline sequentially. Because the instructions I5 and I4 are register correlated, the D stage of the instruction I5 in the branch pipeline is delayed by three cycle before the issuing.

However, in one embodiment, because the main pipeline has two front-end pipelines, the main pipeline may not generate any bubble due to the delay in the branch pipeline. That is, when the instruction I4 is issued to enter to the next cycle of the I stage of the main pipeline, the instructions I6 and T6 are issued to enter to the I stages of the current front-end pipeline and the target front-end pipeline, respectively. In the next cycle, the instructions I7 an dT7 are issued to enter to the I stages of the current front-end pipeline and the target front-end pipeline, respectively. At the same time, the instructions I6 and T6 are issued to enter to the D stages of the current front-end pipeline and the target front-end pipeline.

By using the methods described in FIG. 16C or FIG. 16D, the branch transfer decision result may be obtained in advance in the E stage of the instruction I4 in the main pipeline. In this way, the main pipeline may not have to wait, and may use the branch transfer decision result to select the execution result in the D stage of the instruction I6 or T6 to send to the back-end pipeline. Specifically, when the branch transfer does not occur, the execution result in the D stage of the instruction I6 is selected and sent to the back-end pipeline. When the branch transfer occurs, the execution result in the D stage of the instruction T6 is selected and sent to the back-end pipeline.

In addition, depending on the branch transfer decision result, only one front-end pipeline may continue to operate. The corresponding I stage of the instruction I7 or T7 is selected and sent to the D stage to continue the execution. The corresponding one of the instruction I8 or T8 is read and sent to the I stage in the main pipeline for execution.

Specifically, when the branch transfer does not occur, the current front-end pipeline continues to operate. The execution result in the I stage of the instruction I7 is sent to the D stage to continue the execution. The instruction I8 is fetched and sent to the I stage in the current front-end pipeline for execution. The target front-end pipeline may no longer operate. When the branch transfer occurs, the target front-end pipeline continues to operate. The execution result in the I stage of the instruction T7 is sent to the D stage to continue the execution. The instruction T8 is fetched and sent to the I stage in the target front-end pipeline for execution. The current front-end pipeline may no longer operate. Thus, the methods described in FIG. 16C or FIG. 16D may be used to determine the branch transfer decision result, and even in the worse case, no bubble may be generated in the main pipeline.

FIG. 22B illustrates a schematic diagram of another exemplary pipeline containing two front-end pipelines according to the present disclosure. This pipeline is essentially the same as in FIG. 22A. The difference is that the instruction I5 is an indirect branch instruction. After the instruction I5 enters to the branch pipeline, it is necessary to calculate the branch target address by the data engine 208 in the data pipeline. That is, the G stage in the data pipeline is used to calculate the branch target address, and the T stage in the data pipeline is used to convert the branch target address to BN1.

In one embodiment, the branch target BN1 is generated in the T stage of the data pipeline while the branch transfer decision result is generated in the B stage of the branch pipeline. And the register for calculating the branch target address is different from the register for determining the branch transfer decision result. In this way, the potential register correlation may be different in the data pipeline and the branch pipeline. That is, the numbers of bubbles respectively generated in the data pipeline and the branch pipeline may be different.

As shown in FIG. 22B, when the instruction I5 uses the register in the data pipeline, which has no register correlation with any preceding instructions, the T stage of the data pipeline may be completed at the same time as the D stage of the instruction I4 is completed, and may provide the branch target BN1 (corresponding to the instruction T6). Thus, in the next cycle, the instructions I6 and T6 may enter into the I stage of the main pipeline. Accordingly, when the instruction I5 uses the register in the data pipeline, which has a register correlation with the preceding instructions, the data pipeline may be delayed by a corresponding number of cycles. So the time point for the instructions I6 and T6 to enter into the main pipeline may be delayed accordingly. However, it is still possible that fewer bubbles (branch delay) are generated when compared with the execution of the indirect branch instruction in the main pipeline. The specifics of the operations may be referred to the previous embodiments.

Referring to FIG. 22A, the B stage of the branch pipeline only needs to be completed before the E stage of the subsequent instruction. In one embodiment, even if three bubbles of delay are generated in the branch pipeline, the B stage may still be completed before the E stages of the instructions I6 and T6 are completed. In this case, the E stage of the instruction I4 is completed before the B stage of the instruction I5 is completed. Regardless of whether the instruction in the branch pipeline has any register correlation with the preceding instructions, the branch transfer decision result is always generated before the E stage of the subsequent instruction. That is, the delay in the branch pipeline may not cause extra bubbles to be generated in the main pipeline.

Presently, further improvements may be made such that the instructions I6 and T6 may enter the I stage of the main pipeline at different time points. Because the instruction I6 is the next sequential instruction, and the BN1 is known before the instruction I5 is executed, the instruction I5 may enter the I stage at the same time as the instruction I4 enters the D stage of the main pipeline. However, the instruction T6 may only enter the I stage of the main pipeline in the next cycle following the T stage of the instruction I5 in the data pipeline so the instruction T6 may enter the I stage one cycle behind the instruction I6.

Thus, when the delay in the branch pipeline does not exceed two cycles and the branch transfer does not occur, the D stage of the instruction I6 is selected and sent to the E stage of the back-end pipeline to continue the execution so that the branch instruction I5 is skipped in the main pipeline. When the branch transfer occurs, the I stage of the instruction T6 is elected and sent to the D stage to continue the execution, and in the next cycle, is sent to the E stage of the back-end pipeline to continue the execution. The specifics of the operations may be referred to the previous embodiments.

In order to implement the functions shown in FIG. 22A and FIG. 22B, both the main pipeline and the data pipeline need two front-end pipelines, and the track module 190 is modified to the corresponding scheduler. Specifically, the next instruction sequentially following the branch instruction and the subsequent non-branch and non-data instructions are executed in the current front-end pipeline of the main pipeline. The next instruction sequentially following the branch instruction and the subsequent branch and data instructions are executed in the current front-end pipeline of the data pipeline. The branch target instruction of the branch instruction and the subsequent non-branch and non-data instructions are executed in the in the target front-end pipeline of the main pipeline. The branch target instruction of the branch instruction and the subsequent branch and data instructions are executed in the target front-end pipeline of the data pipeline.

Figure 23:
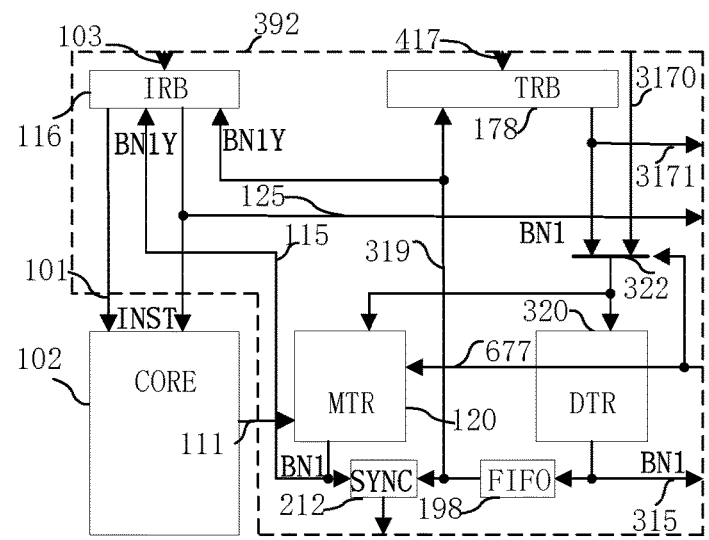
FIG. 23 illustrates an exemplary scheduler according to the disclosed embodiments.
Figure 24:
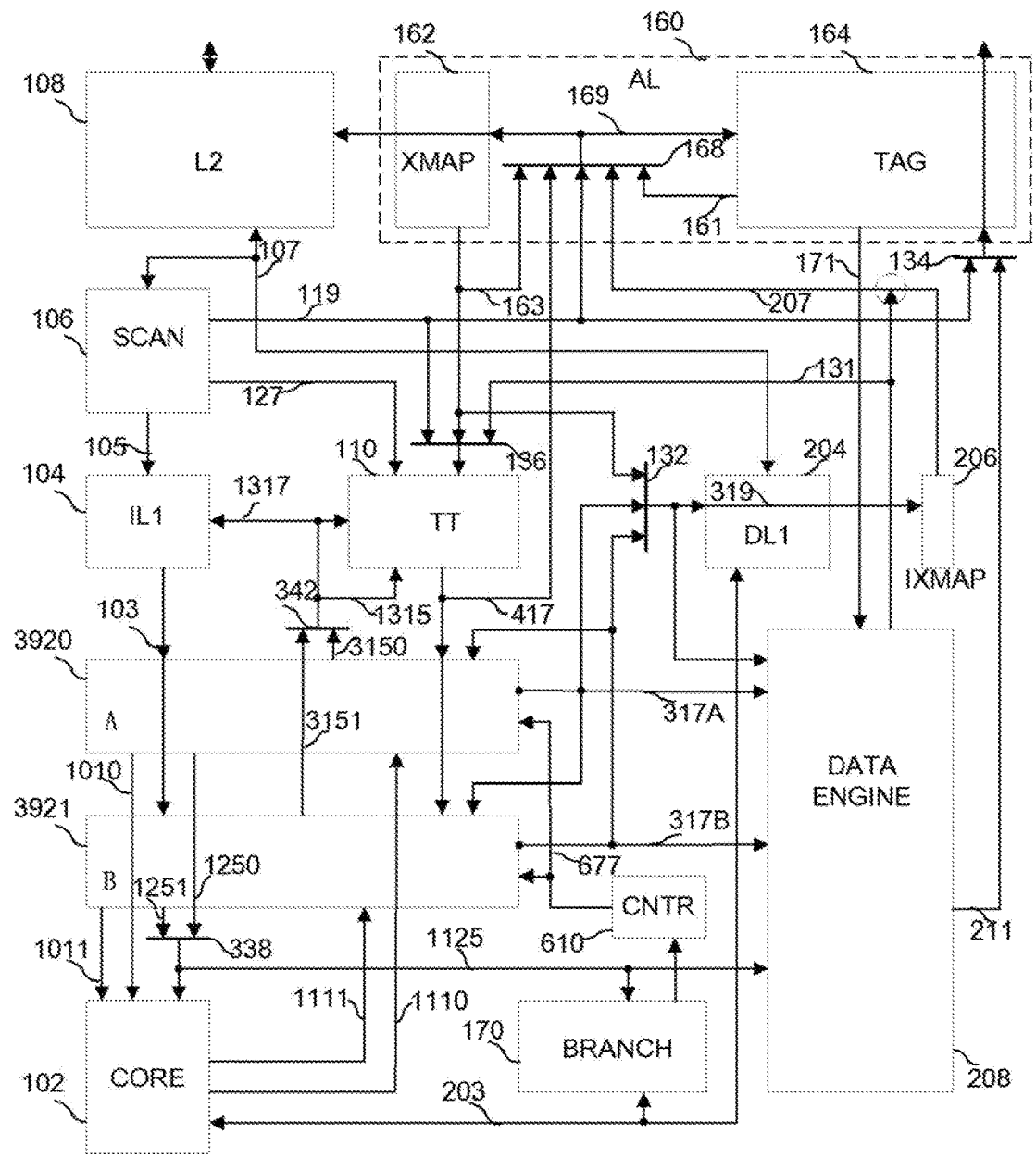
FIG. 24 illustrates a block diagram of an exemplary processor supporting two front-end pipelines according to the disclosed embodiments.
Figure 25:
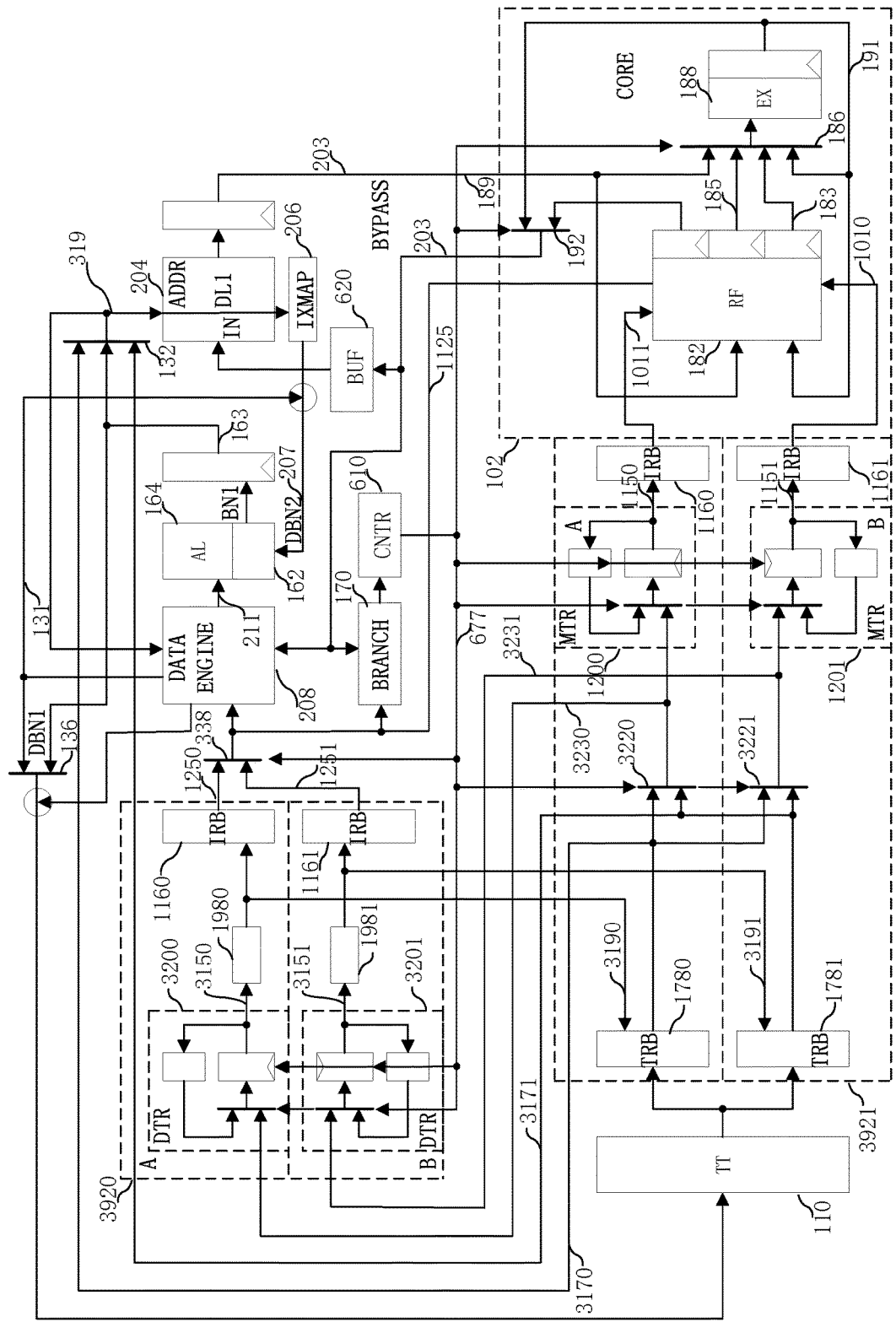
FIG. 25 illustrates a schematic diagram of an exemplary pipeline with the processor supporting two front-end pipelines according to the disclosed embodiments.

FIG. 23 illustrates an exemplary scheduler according to the present disclosure. the processor structures supporting two front-end pipelines are shown in FIGS. 23, 24, and 25, and the structures similar to the track module 190 shown in FIG. 20 are illustrated. Other structures may also be suitable for the scheduler. The two front-end pipelines are referred to as pipeline A and pipeline B, respectively in the following description. The two front-end pipelines use the same functional blocks. So the two front-end pipelines are symmetric. At any moment, the controller assigns one pipeline as the current front-end pipeline and the other pipeline as the target front-end pipeline. For the sake of clarity, the suffix 0 of the function block numbers and the connection line numbers refers to the front-end pipeline A, and the suffix 1 refers to the front-end pipeline B.

Referring to FIG. 23, in order to support the two front-end pipelines, the fall-through instruction and the branch target instruction are issued at the same time, and the subsequent instructions use the scheduler 392. Each front-end pipeline has its own dedicated scheduler. Compared with the example in FIG. 20, a selector 322 is added to select between the output of the track read buffer 178 in the current pipeline and the output of the track read buffer in the other pipeline to be used by the trackers in the current scheduler.

The selector 322 generally selects the output of the track read buffer 178 in the current pipeline. When the address output of the FIFO 198 points to the end track point in the track read buffer 178, the end track point read from the track read buffer 178 is selected by the selector 322 to be sent to the registers in the master tracker (MTR) 120 and the data tracker (DTR) 320 to update the read pointers 115 and 315, which control the primary instruction cache 104 to load the next instruction block in sequence into the instruction read buffer 116, and control the track table 110 to load the next track in sequence to the track read buffer (TRB) 178.

For the sake of brevity, it is assumed that both the instruction read buffer 116 and the track read buffer 178 have a bypass function, that is, when being loaded, the instruction and the track table entry content pointed by the pointer may be provided at the same time to the processor core 102, the data engine 208, the branch module 170, the master tracker (MTR) 120, and the data tracker (DTR) 320, etc. When the output from the track read buffer (TRB) 178 is directly bypassed through the bus 317 to address the primary instruction cache 104 and the track table 110 without going through the trackers, the instruction read buffer 116 and the track read buffer 178 may not need to have the bypass function.

When the track read buffer (TRB) 178 in the current front-end pipeline read a branch point that is not the end track point, the control bus 677 generated by the controller 610 (refer to FIG. 25) may control the selector 322 in the target front-end pipeline to select the current front-end pipeline. That is, the output of the track read buffer (TRB) 178 in the other front-end pipeline is loaded through the bus 317 to the master tracker (MTR) 120 and the data tracker (DTR) 320 in the target front-end pipeline to update the read pointers 115 and 315. The read pointers 115 and 315 respectively point to the instruction block where the branch target instruction is located in the primary instruction buffer 104 and the corresponding track in the track table 110. The instruction block and the corresponding track are loaded into the instruction read buffer 116 and the track read buffer 178 in the branch target scheduler 392.

At the time point determined by the synchronization module 212, the branch target instruction and the subsequent instructions are issued to the data engine 208 or the processor core 102. Through the bus 677, the controller 610 controls the selectors 322 of the two schedulers and the selectors of the master tracker 120 and the data tracker 320, and jointly controls the registers in the master tracker 120 and the data tracker 320 with the pipeline stage status feedback 111 generated by the processor core 102.

In addition, the synchronization module 212 in the scheduler 392 is different from the same in FIG. 20. Some portion of the function is executed by the controller 610. This is because in the case of two front-end pipelines, the three preceding instructions issued in the target front-end pipeline and their issuing times may be determined based on the tracker pointer in the current front-end pipeline. The correlation detection for the type "1" instructions in the target front-end pipeline may need to check the type "0" instructions preceding the branch instruction in the current front-end pipeline as well as the type "0" instructions in the target front-end pipeline. The method and the FIFO 198 format shown in FIG. 19 are used to issue the type "1" instruction, the branch target instruction, and the subsequent instructions. Here, the issuing time point pointer number in the field 705 has two bits, representing four different pointers.

In the pipelines according to the present disclosure, the correlation detection may have three cases. In the first case, the branch target instruction itself is a type "1" instruction. In this case, it is necessary to check the correlation between the two type "0" instructions preceding the branch instruction and branch target instruction. In the second case, the instruction following the branch target instruction is a type "1' instruction. In this case, it is necessary to check the correlation between the branch target instruction, one type "0" instruction preceding the branch instruction, and one instruction following the branch target instruction. In the third case, the second instruction following the branch target instruction is a type "1" instruction. In this case, it is necessary to check the correlation between the branch target instruction and one type "0" instruction following the branch instruction.

FIG. 24 illustrates a block diagram of an exemplary processor supporting two front-end pipelines according to the present disclosure. The block diagram is similar to FIG. 20. The difference is that another scheduler is added. The two schedulers 3920 and 3921 have the same structure as the scheduler 392 in FIG. 23. A front-end pipeline is added to the processor core 102. The front-end pipeline and the original pipeline are controlled by the scheduler 3920 to provide instructions through the bus 1010, and by the scheduler 3921 to provide instructions through the bus 1011.

The controller 610 receives the inputs from the branch module 170, the read pointers 115 and 315 in the two schedulers, and the synchronization module 212, and the states of the processor core 102 and the data engine 208 (not shown for brevity except for the branch module 170). Through the bus 677, the controller 610 controls the operations of the two schedulers 3920 and 3921, the branch module 170, and the data engine 208.

In addition, a selector 342 is added to select between the buses 3150 and 3151 from the two schedulers 392 to control the primary instruction cache 104 to load the instruction block into the instruction read buffer 116 in the corresponding scheduler, and to control the track table 110 to load the track into the track read buffer 178 in the corresponding scheduler. A selector 338 is added to select between the buses 1250 and 1251 from the two schedulers 392 to provide register stack addresses to the processor core 102 and type "1" instructions to the data engine 208. The selector 132 scales up to one-in-three from one-in-two in FIG. 20 to receive the output 3171 from the added scheduler to control the access to the primary data cache 204.

In addition, the output from the track table 110 is sent out through the bus 417 to provide the function of sending BN2 to the active table 160 to convert to BN1 and the function of loading tracks to the track read buffers 1780 and 1781 in the two schedulers. The two schedulers output to the bus 3170 or 3171. In addition to feeding to the data engine 208 as shown in FIG. 20, another function is to provide the branch target address BN1 to the other scheduler to load the registers in the master tracker (MTR) 120 and the data tracker (DTR) 320. So the corresponding read pointer points to the corresponding target.

It is defined that the read pointer 1150 of the master tracker 120 is for the pipeline A, the issuing time point pointer number is "00", and the data tracker 3200 is numbered as "01". It is also defined that the read pointer 1151 of the master tracker 120 is for the pipeline B, the issuing time point pointer number is "10", and the data tracker 3201 is numbered as "11". As shown in FIG. 24, the write buffer is located in the path the processor core 102 writes back to the primary data cache 204. Other modules and buses are the same as in FIG. 20.

FIG. 25 illustrates a schematic diagram of an exemplary pipeline with the processor supporting two front-end pipelines according to the present disclosure. FIG. 25 corresponds to the block diagram of FIG. 24. The pipeline in FIG. 25 is similar to the pipelines shown in FIGS. 11 and 16. FIG. 25 is divided into a lower main pipeline and an upper data pipeline. However, both pipelines include two front-end pipelines A and B.

The two front-end pipelines in the main pipeline start from the track read buffer 178X ("X" may be "0" or "1"), passes through the selector 322X, the master tracker 120X, the instruction read buffer 116X (I stage), and the register stack 182 (D stage) as two independent pipelines until reaching the bypass selector 186. Under the control of the branch determination, the bypass selector 186 selects one between the register stack output 185 dedicated for the front-end pipeline A and the register stack output 183 dedicated for the front-end pipeline B to send to the execution unit 188 (E stage) in the back-end pipeline for execution. The execution result is written back to the register stack (W stage). In the data pipeline, the front-end pipelines A and B have independent data tracker 320X and instruction read buffer 116X (I stage, the other read port of the instruction read buffer 116 in the main pipeline). To support the operations of the two front-end pipelines, the buses corresponding to the two front-end pipelines are duplicated, each with two copies. Other modules have the same functions as in FIG. 11 and FIG. 16.

Through the bus 417, the output from the track table 110 is sent to track read buffers 178X in the two front-end pipelines, that is, being stored in the track read buffer 1780 in the front-end pipeline A 1900 and the track read buffer 1781 in the front-end pipeline B 1901.

Take the pipeline A for illustration. The pointer 3190 read from the FIFO 1980 (i.e., the FIFO 198 in FIG. 23) points to the track read buffer 1780 to read the track table entry content, which is sent through the bus 3170 to the selector 3220 and the selector 132 to control the access to the primary data cache 204. The track table entry content is selected by the selector 3220, and then is sent through the bus 3230 to the master tracker 1200 and the data tracker 3200. The output read pointer 1150 of the master tracker 1200 points to the instruction read buffer 1160, controls to read the instructions sequentially, and sends the instructions through the bus 1011 to the processor core 102 for execution. The execution includes decoding the instructions and reading the register stack contents based on the register addresses of the instructions. Through the dedicated read port 185 of the pipeline A, the register stack contents are sent to the bypass logic 186 for selection.

When a branch instruction is present, the pipeline B performs similar operations to the branch target instruction and the subsequent instructions. Based on the branch determination by the branch module 170 and the front-end pipeline status (which pipeline is the current front-end pipeline), the controller 610 controls the bypass logic 186 to select the instruction opcode from either the pipeline A or the pipeline B and the operand sent from the corresponding register stack read port for execution by the execution unit 188. The execution result is written back to the bypass logic 186 and 192, and the register stack 182.

The two front-end pipelines of the data pipeline in the upper part of FIG. 25 only include the pipeline I stage. Starting from the selector 338 controlled by the bus 677 with the output of the controller 610, the common back-end pipeline includes the stages D, G, T, M, and W. Still take the front-end pipeline A for illustration. The data tracker 3200 accepts the output 3230 from the selector 3220. The output read pointer 3150 which controls the access to the track table 110 is sent to the FIFO 1980. The output pointer 3190 of the FIFO 1980 controls the access to one read port of the track read buffer 1780 and the instruction read buffer 1160.

In any one clock cycle, one of the two instructions 1250 and 1251 output from the two instruction read buffers 1160 and 1161 is selected by the selector 338 for use by the branch module 170 and the data engine 208 in the back-end pipeline. Before a branch instruction is executed, only one of the front-end pipelines assigned as the current front-end pipeline and the back-end pipeline are executing the current instruction stage (the other front-end pipeline is preparing to issue the branch target instruction). At this time, for the current instruction, the controller 610 controls through the bus 667 the selector 338 to select the current front-end pipeline. When the branch instruction is issued in advance, the branch instruction is selected by the selector 338 to enter the branch module 170 through the bus 1125 for branch determination.

Then the controller 610 arbitrates to select one of the pipelines based on the type "1" instruction status in the front-end pipeline A or B of the data pipeline. The rule is as follows. When only one of the two pipelines outputs a type "1" instruction from the read port of the instruction read buffer 116, the pertaining pipeline is selected. When both pipelines have a type "1" instruction to issue, further arbitration rule (e.g., the current front-end pipeline has the priority) is used to determine which one to issue. The instruction I the other pipeline is delayed by one cycle to issue. In this case, a bubble may be generated in the main pipeline eventually. Especially when both front-end pipelines have consecutive type "1" instructions (e.g., data access instructions) to issue, more bubbles may be generated.

When another data engine 208 is duplicated, another read port may be added in the register stack 182 for use by the duplicated data engine 208 so that both EB front-end pipelines control a separate read port. So the selector 338 still selects instructions to be sent to the branch module 170. However, the two data engines 208 and the two read ports of the register stack separately accept the instructions 1250 and 1251 output from the read port of the instruction read buffer 116 in either front-end pipeline A or front-end pipeline B, and process them in parallel.

A selector may be added to the output of the two data engines 208 and the output of the selectors may be sent through the bus 211 to the tag 164 in the active table 160. So two pipeline stages (D stage to read the register stack and G stage for the data engine 208 to calculate the data access address) may be added in the front-end pipelines to reduce the number of bubbles potentially generated in the main pipeline.

When both the active table 160 and the primary data cache 204 have two read ports, the selection may be delayed until the two outputs of the primary data cache 204 are selected. At this time, the branch determination is made at the current pipeline setting. No bubble may be generated in the main pipeline due to the resource conflicts in the data pipeline. In this case, the entire data pipeline includes two independent pipelines with complete stages I, D, G, T, M, and W. No back-end pipeline is needed.

The operation of the main pipeline A is controlled by the master tracker 1200 to sequentially read the instruction read buffer 1160. In each cycle, one type "0" instruction is issued to the processor core 102. The operation of the data pipeline is to read the type "1" instruction address from the read port of the FIFO 1980 as the pointer 3190. At the suitable time determined by the controller 610, the instruction pointed by the pointer 3190 in the instruction read buffer 1160, and the entry content in the corresponding track read buffer 1780 are provided to the data pipeline to issue the type "1" instruction and the auxiliary content (e.g., the branch target address BN1 when branching occurs, or the DBN1, and stride, etc. when data access occurs). The operation of the pipeline B is also the same.

With reference to FIG. 25, the operation of the processor with two branching front-end is illustrated below. Initially, the front-end pipeline A is the current front-end pipeline, and the front-end pipeline B is the target front-end pipeline. The output pointer 1150 of the master tracker 1200 in the pipeline A controls the instruction read buffer 1160 to issue one type "0" instruction through the bus 1010. In each subsequent cycle, the pointer 1150 increments by "1", and issues the type "0" instructions sequentially.

The output pointer 3190 of the FIFO 1980 reads the type "1" instruction and the corresponding table entry content for the preparation of issuing from the instructions in the instruction read buffer 1160 and the corresponding track read buffer 1780. The decoder (now shown) that is connected to the output 3170 of the track read buffer 1780 detects that the instruction is a direct branch instruction and notifies the controller 610. At this time, the selector 338 selects the instruction 1250 provided by the instruction read buffer 1160 in the front-end pipeline A to place on the bus 1125.

Based on the information that the type "1" instruction is a direct branch instruction, the controller 610 controls the selector 3221 in the front-end pipeline B through the bus 677 to select the output 3170 of the track read buffer 1780 in the front-end pipeline A to place on the bus 3231, and controls the master tracker 1201 and the data tracker 3201 in the pipeline B to store the branch target on the bus 3231. The selector 342 (refer to FIG. 24) selects the BN1X of the read pointer 3151 in the data tracker 3201 to control to store the instruction block where the branch target is located in the primary instruction cache 104 into the instruction read buffer 1161, and to store the track where the branch target is located in the track table 110 into the track read buffer 1781.

At this time, the synchronization module 212 in the pipeline B starts to calculate the issuing time point of the branch target. When the branch target is a type "1" instruction, and the distance between the master tracker pointer 1150 in the current front-end pipeline (i.e., the front-end pipeline A) and the data tracker pointer 3151 in the target front-end pipeline (i.e., the pipeline B) is "3", the controller 610 controls the selector 338 to select the type "1" instruction on the bus 1251 to issue to the data engine 208.

At this time, based on the information that the instruction is a type "1" instruction, the synchronization logic may make the pointer 1151 of the master tracker in the pipeline B skip this instruction (alternatively, as described previously, the instruction may be issued and determined by the decoder of the processor core as a type "1" instruction, and then the instruction is executed as a dummy instruction). When the branch target is a type "0" instruction, and the distance between the master tracker pointer 1150 in the current front-end pipeline (i.e., the front-end pipeline A) and the data tracker pointer 3151 in the target front-end pipeline (i.e., the pipeline B) is "1", the type "0" instruction may be issued through the bus 1010 in the processor core 102.

It is assumed that the target instruction and the two instructions following the target instruction are type "0" instructions. Accordingly, the synchronization module in the pipeline B reads the BN1Y value (assuming it is 6) of the pointer 3190 in the pipeline A. The value is subtracted by "1" to obtain the source address (5) of the issuing point. The correlation detection unit in the pipeline A detects that the instruction is a type "0" instruction. That is, the source address, the pointer (1150) code ("00") of the source address, and the issuing instruction type (type "0") are stored into the issuing point field in the FIFO 1981. The address BN1 (i.e., the branch target address originally read from the bus 3170) of the read pointer 3151 is also passed through the FIFO 1981 to the pointer 3191. The branch target information (because the instruction is a type "0" instruction, no corresponding information is available) is read from the track read buffer 1781. The BN1Y of the read pointer 1151 in the master tracker 1201 reads the branch instruction from the instruction read buffer 1161 for preparation of execution by the front-end pipeline B in the processor core.

At this time, the data pipeline of the front-end pipeline B and the main pipeline are ready for issuing the branch target instruction. When the BN1Y of the read pointer 1150 of the master tracker 1200 in the pipeline A reaches "3", the synchronization module in the pipeline A detects that it is time to issue the branch instruction (the BN1Y address is "6"). That is, the controller 610 notifies the branch module 170 that instruction on the bus 1125 is valid, and the instruction decoder in the branch module 170 decodes the branch decision type to enter into the determination process.

After the pipeline A executes the last type "0" instruction preceding the branch instruction (the source address BN1Y="5"), in the next cycle, the master tracker 1200 in the pipeline A skips the branch instruction and starts to sequentially execute the instructions following the branch instruction. At the same time, the target front-end pipeline also starts to issue the branch target instruction and the instructions following the branch instruction to the processor core 102 through the bus 1011 until the processor core 102 feeds back the front-end pipeline of the branch target (B) has been filled.

At the same time, the read pointer of the FIFO 1980 in the pipeline A moves forward to point to the next address BN1 of the FIFO 1980. The address BN1 is assigned to the pointer 3190 to read the entry content of the next type "1" instruction from the track read buffer 1780. The instruction is determined to be another branch instruction. The pointer 3190 also reads that branch instruction from the instruction read buffer 1160 and places the branch instruction on the bus 1250 for selection by the selector 338. In actual implementations, as long as the proper correlation detection is ensured, the controller 610 may start to execute the target instruction in the target front-end pipeline before the instructions following the branch instruction are executed, avoiding the back-end resource conflict of the data pipeline caused by the simultaneous presence of the type "1" instructions in both data pipelines.

It is assumed that the branch module 170 determines that the branching is not successful for the first branch instruction being executed. The pipeline A remains to be the current front-end pipeline and continues the operation. The bypass logic 186 selects the operand provided by the register read port 185 in the pipeline A, the data on the bus 203, and/or the previous cycle execution result on the bus 191 for execution by the execution unit 188. At the same time, the selector 338 selects the second branch instruction on the bus 1250 in the pipeline A and places the branch instruction on the bus 1125. Both trackers in the pipeline B stop the operation and clear the FIFO 1981 in the pipeline B. In the next clock cycle, as described previously, the controller 610 sends the output 3170 (at this time, it is the branch target address of the second branch instruction) of the track read buffer 1780 in the pipeline A, which is pointed by the pointer 3190 of the FIFO 1980, through the selector 3221 to store into the two trackers in the pipeline B.

At this time, it is assumed that the branch target itself is a type "1" instruction. That is, as described previously, the issuing time (at this time, it should be "−3") is calculated. The correlation detection determines the final issuing address in the current front-end pipeline and the tracker number (for example, the issuing time should be the time the current front-end pipeline BN1Y="2". But the instruction is correlated with the branch target instruction and the subsequent instructions are not correlated with the branch target instruction. Then BN1Y="3" is determined. But the BN1Y="3" instruction is a type "1" instruction. Thus, the tracker number is the number "01" of the data tracker 3200), and "3", "01", and branch target type "1" are stored into the issuing time field in the FIFO 1981. Along with the output 3151 of the data tracker 3201 in the pipeline B, the issuing time field is sent to the FIFO 1981. As described previously, the corresponding instruction block that contains the branch target and the corresponding track are loaded respectively to the instruction read buffer 1161 and the track read buffer 1781, and are pointed and read by the output 3191 of the FIFO 1981. The branch target instruction is ready for issuing in the pipeline B.

Based on the presence of the type "1" instruction (i.e., the second branch instruction) in the pipeline A, the controller 610 controls the selector 338 to still select the output of the instruction read buffer 1160 to send to the data engine 208 through the bus 1250. When the value of the pointer 3150 of the data tracker 3200 in the pipeline A is equal to "2" (the branch instruction source address BN1Y is "5"), and the synchronization module in the pipeline A also determines that the branch instruction is ready for issuing, the branch module 170 is notified, and the instruction already placed on the bus 1125 is valid. The instruction decoder in the branch module 170 decodes the branch decision type to enter into the determination process.

Then, the pipeline A continues to cyclically execute the type "0" instructions before and after the branch instruction (the branch instruction itself is issued in advance). When the value of the pointer 3150 is equal to "3", and the synchronization module in the pipeline B determines that the branch target instruction is ready for issuing, the controller 610 controls the selector 338 to select the value on the bus 1251 to place on the bus 1125, and notifies the function modules in the data pipeline that the instruction on the bus 1250 is valid. The function modules start to decode and operate.

The output 3191 of the FIFO 1981 also points to the next type "1" instruction content of the track read buffer 1781 in the pipeline B. As described previously, the pipeline B continues to execute until the front-end pipeline B is full. At this time, as described previously, the pipeline A continues to issue the instructions following the branch instruction. When a type "1" data access instruction is present in the subsequent instructions, the instruction may be issued under the arbitration of the controller 610.

When the branch module 170 determines the branching is successful, the controller 610 controls the bypass logic 186 to select the read port 185 of the register stack in the pipeline B, or the data access result on the bus 203 in the pipeline B, or the previous cycle value on the bus 191. The selection is for execution by the back-end pipeline. The trackers 1201 and 3201 in the pipeline B continue the normal operation while the trackers 1200 and 3200 in the pipeline A stop the operation. And the FIFO in the pipeline A is cleared.

The controller 610 may also assign the front-end pipeline B as the current front-end pipeline, and the front-end pipeline A as the target front-end pipeline. As such, the controller 610 controls the selector 338 through the bus 677 to select the bus 1251 by default. When the next type "1" instruction of the track read buffer 1781 pointed by the output pointer 3191 of the FIFO 1981 in the pipeline B is a branch instruction, the controller 610 may also control the selector 3220 in the front-end pipeline A to select the output 3171 of the track read buffer 1781 in the front-end pipeline B to place on the bus 3230, and to store to the master tracker 1200 and the data tracker 3200.

As described previously, the output pointers 1150 and 3150 of the two trackers read the instruction block that contains the branch target from the primary instruction cache 104 to store into the instruction read buffer 1160 in the pipeline A, and read the corresponding track from the track table 110 to store into the track read buffer 1780 in the pipeline A. As described previously, the branch instruction and the subsequent instructions are ready for issuing. As such, when processing the branch instruction, the processor with two front-end pipelines may not make mistakes in the branch prediction or suffer from the branch penalties. In addition, the branch instruction itself does not account for any processor cycle.

The scheduler based on the track module including three trackers is illustrated below with reference to FIG. 21. In one embodiment, the structure of the processor system is similar to FIG. 24. Compared with the track module in FIG. 21, a selector 322 is added in the scheduler to select between the BN1 output from the track read buffer 178 and the BN1 sent from outside the scheduler through the bus 3170 to update the read pointers of the master tracker 120, the data tracker 320, and the look ahead tracker 520. The specifics of the structure may be obtained by modifying the track module in FIG. 20 with reference to the scheduler in FIG. 23.

In addition, in one embodiment, in order to avoid any confusion with FIGS. 23, 24, and 25, the two schedulers are called the scheduler 392(A) and the scheduler 392(B), respectively, corresponding to the front-end pipeline A and the front-end pipeline B. In addition, the components or buses associated with the scheduler 392(A) may be appended with an "(A)". For example, the track read buffer 178(A), the bus 125(A), etc. are used to indicate that the component or the bus belongs to the scheduler 392(A) or the front-end pipeline A. The components or buses associated with the scheduler 392(B) may be appended with an "(B)". For example, the track read buffer 178(B), the bus 125(B), etc. are used to indicate that the component or the bus belongs to the scheduler 392(B) or the front-end pipeline B.

Figures 26, 27:
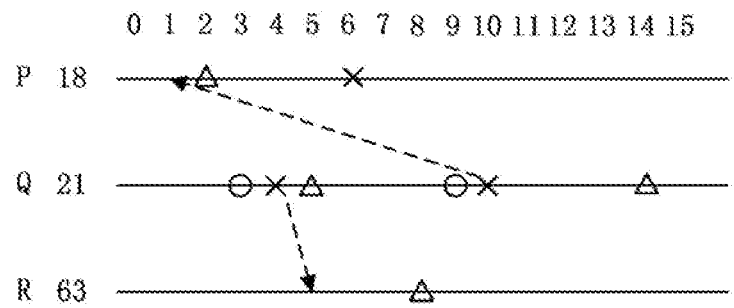
FIG. 26 illustrates an exemplary execution program for the cache system containing two front-end pipelines according to the disclosed embodiments.
FIG. 27 illustrates a schematic diagram of another exemplary pipeline containing two front-end pipelines according to the disclosed embodiments.

This is further described below with reference to FIG. 26. FIG. 26 illustrates an exemplary execution program for the cache system containing two front-end pipelines according to the present disclosure. FIG. 26 shows three tracks, including a track P (BN1X is "18"), a track Q (BN1X is "21"), and a track R (BN1X is "63"). Each track corresponds to an instruction block. Each track includes 16 track points, ranging from "0" through "15". Each track point corresponds to one instruction. For example, the track point Q0 corresponds to the instruction Q0, and the track point Q1 corresponds to the instruction Q1, etc.

As shown in FIG. 26, a cross represents a branch point, such as the branch point P6 (BN1 is "1806"), the branch point Q4 (BN1 is "2104"), and the branch point Q10 (BN1 is "2110"). A triangle represents a data point, such as the data point P2 (BN1 is "1802"), the data point Q5 (BN1 is "2105"), the data point Q14 (BN1 is "2114"), and the data point R8 (BN1 is "6308"). A circle represents a track point corresponding to the instruction that last updates the register value of the branch point, such as the track point Q3 (BN1 is "2103"), and the track point Q9 (BN1 is "2109"). The track point Q3 and the branch point Q4 are register correlated. The track point Q9 and the branch point Q10 are register correlated. In addition, in one embodiment, for the convenience of illustration, it is assumed that the data points P2, Q5, Q14, and R8 do not have any register correlation with the their preceding instruction. Other cases may also be referred to the technical solution of the present invention and treated in a similar way.

In one embodiment, the occurrence of the branch transfer causes both the read pointer 115 of the master tracker 120 and the read pointer 315 of the data tracker 320 corresponding to the current front-end pipeline point to the first track point Q0 of the track Q, and execute the corresponding instruction sequentially along the track Q. The branch transfer of the branch point Q4 does not occur. The branch transfer of the branch point Q10 occurs. So the pointers transfer to the branch target track point P1 and continue to execute the corresponding instructions sequentially.

For the convenience of illustration, in one embodiment, the description that the read pointer 515(A) of the scheduler 392(A) and the read pointer 515(B) of the scheduler (B) start to move in advance from Q0 and the BN2 of the branch point is replaced with the corresponding BN1 is omitted. It is assumed that when the first track point Q0 of the track Q is entered due to the branch transfer, the front-end pipeline A is the current front-end pipeline. FIG. 27 illustrates a schematic diagram of another exemplary pipeline containing two front-end pipelines according to the present disclosure. In one embodiment, the pipeline state in each cycle of the operation is shown in FIG. 27.

In the first cycle, the values of the read pointers 115(A) and 315(A) of the scheduler 392(A) are all equal to "2100", pointing to the track point Q0 (the track point is a type "0"). The instruction read buffer 116(A) is addressed by the read pointer 115(A) to output the type "0" instruction Q0 to the processor core 102 for execution in the front-end pipeline A of the main pipeline. Because the read pointer 315(A) points to the type "0" track point at this time, the value of the register 552(A) in the synchronization module 212(A) is set to "1".

In the second cycle, as described previously, the read pointer 115(A) is incremented by one to obtain "2101". The instruction read buffer 116(A) is addressed by the read pointer 115(A) to read the instruction Q1 for execution in the front-end pipeline A of the main pipeline. As described previously, the read pointer 315(A) moves in advance to point to the type "1" track point Q4. Because the difference at this time between the read pointer 115(A) and the read pointer 315(A) is "−3", the instruction read buffer 116(A) is addressed by the read pointer 315(A) to output the branch instruction Q4 for execution in the front-end pipeline A of the branch pipeline.

At the same time, the track read buffer 178(A) is addressed by the read pointer 315(A) to output the BN1X of the branch target BN1. The primary instruction cache 104 is addressed by the BN1X through the bus 317(A) to output the branch target instruction block, which is sent through the bus 103 to the scheduler 392(A) to be loaded into the instruction read buffer 116(A). At the same time, the track table 110 is addressed by the BN1X through the bus 317(A) to output the branch target track, which is sent through the bus 317(A) to the scheduler 392(B) to be loaded into the track read buffer 178(B). The branch target BN1 ("6305") is sent through the bus 317(A) to the scheduler 392(B) to update the read pointers 115(B), 315(B), and 515(B). Because at this time the read pointer 315(A) points to the type "1" track point, the value of the register 552(A) in the synchronization module 212(A) is incremented by one to obtain "2" as described previously.

In the third cycle, as described previously, the read pointer 115(A) is incremented by one to obtain "2102". The instruction read buffer 116(A) is addressed by the read pointer 115(A) to output the instruction Q2 for execution in the front-end pipeline A of the main pipeline. Because the type "1" instruction Q4 has already been issued, as described previously, the read pointer 315(A) moves to the next type "1" track point Q5. Because at this time the difference between the read pointer 115(A) and the read pointer 315(A) is "−3", the instruction read buffer 116(A) is addressed by the read pointer 315(A) to output the data access instruction Q5 for execution in the front-end pipeline A of the branch pipeline.

Because at this time the read pointer 315(A) points to the type "1" track point, as described previously, the value of the register 522(A) in the synchronization module 212(A) is incremented by one to obtain "3". In addition, because the branch instruction Q4 and the instruction Q3 are register correlated, a bubble is inserted into the branch pipeline A to delay the issuing of the D stage of the instruction Q4. At the same time, in the scheduler 392(B), as described previously, the read pointer 315(B) moves to the next type "1" track point R8.

In the fourth cycle, as described previously, the read pointer 115(A) is incremented by one to obtain "2103". The instruction read buffer 116(A) is addressed by the read pointer 115(A) to output the instruction Q3 for execution in the front-end pipeline A of the main pipeline. At this time, the read pointer 115(A) is located in the "−1" position preceding the branch instruction Q4. The value "3" of the register 552(A) is selected as the increment to the read pointer 115(A) to obtain the addition result "2106".

In addition, because the type "1" instruction Q5 has already been issued, as described previously, the read pointer 315(A) moves to next type "1" track point Q10. In the process of the movement, the value of the register 552(A) is set to "1" (when the read pointer 315(A) points to Q6), and then is incremented by one to obtain "2" (when the read pointer 315(A) points to Q10). In addition, because the branch instruction Q4 and the instruction Q3 are register correlated, a bubble is inserted into the branch pipeline A to delay the issuing of the stage D of the instruction Q4.

In the fifth cycle, the read pointer 115(A) is updated to the addition result "2106". The instruction read buffer 116(A) is addressed by the read pointer 115(A) to output the instruction Q6 for execution in the front-end pipeline A of the main pipeline. So the branch instruction Q4 and the data access instruction Q5 are skipped. Because at this time the read pointer 315(A) points to the type "0" track point, the value of the register 552(A) in the synchronization module 212 is set to "1".

In this cycle, the instruction Q3 enters into the D stage. When the branch transfer determination method in FIG. 16C or FIG. 16D is used, the D stage of the branch instruction Q4 is able to issue. No bubble is inserted into the branch pipeline A. In scheduler 392(B), the instruction read buffer 116(B) is addressed by the read pointer 115(A) to output the type "0" instruction R5 to the processor core 102 for execution in the front-end pipeline B of the main pipeline. Because at this time the difference between the read pointer 115(B) and the read pointer 315(B) is "−3", the instruction read buffer 116(B) is addressed by the read pointer 315(B) to output the data access instruction R8 for execution in the front-end pipeline B of the data pipeline. Starting from this cycle, the two front-end pipelines operate simultaneously. The front-end pipeline A is the current front-end pipeline, and the front-end pipeline B is the target front-end pipeline.

In the sixth cycle, as described previously, the read pointer 115(A) is incremented by one to obtain "2107". The instruction read buffer 116(A) is addressed by the read pointer 115(A) to output the instruction Q7 for execution in the front-end pipeline A of the main pipeline. Because at this time the difference between the read pointer 115(A) and the read pointer 315(A) is "−3", the instruction read buffer 1160A is addressed by the read pointer 315(A) to output the branch instruction Q10 for execution in the front-end pipeline A of the branch pipeline. As described previously, the read pointer 115(B) is incremented by one to obtain "6306". The instruction read buffer 116(B) is addressed by the read pointer 115(B) to output the instruction R6 for execution in the front-end pipeline B of the main pipeline.

Because the branch transfer decision result (i.e., the branch transfer does not occur) for the branch instruction Q4 is generated in this cycle, starting from the next cycle, the execution in the current front-end pipeline (i.e., the front-end pipeline A) continues. The execution in the target front-end pipeline (i.e., the front-end pipeline B) is aborted.

In addition, because the new branch instruction Q10 is issued, the track read buffer 178(A) is addressed by the read pointer 315(A) to output the BN1X of the branch target BN1. The primary instruction cache 104 and the track table 110 are addressed by the BN1X through the bus 317(A) to respectively output the branch target instruction block, which is sent through the bus 103 to the scheduler 392(B) to be loaded to the instruction read buffer 116(B), and the branch target track, which is sent through the bus 317(A) to the scheduler 392(B) to be loaded to the track read buffer 178(B). The branch target BN1 ("1801" is also sent through the bus 317(A) to the track module 190(B) to update the read pointers 115(B), 315(B), and the 515(B). Because at this time the read pointer 315(A) points to the type "1" track point, as described previously, the value of the register 552(A) in the synchronization module 212(A) is incremented by one to obtain "2".

In the seventh cycle, as described previously, the read pointer 115(A) is incremented by one to obtain "2108". The instruction read buffer 116(A) is addressed by the read pointer 115(A) to output the instruction Q8 for execution in the front-end pipeline A of the main pipeline. Because the type "1" instruction Q10 has already been issued, as described previously, the read pointer 315(A) moves to the next type "1" track point Q14. Because the branch instruction Q10 and the instruction Q9 are register correlated, a bubble is inserted into the branch pipeline A to delay the issuing of the D stage of the instruction Q10. In the scheduler 392(B), as described previously, the read pointer 315(B) moves to the next type "1" track point P2.

According to the technical solution of the present invention, the distance between the track points in different tracks may be determined. For example, the BN1Y of the read pointer 115(A) of the master tracker 120(A) is subtracted by the BN1Y of the read pointer 315(B) of the data tracker 320(B). The subtraction result is added by the BN1Y portion corresponding to the branch offset of the branch instruction output from the instruction read buffer 116(A). As described previously, the addition result is compared with the constant "−3" to determine whether the read pointer 115(A) is located in the position "−3" preceding the read pointer 115(B). Of course, other suitable determination methods may be used.

Thus, in this cycle, the distance between the track point Q8 on the branch source track and the track point P2 on the branch target track is "−3". The instruction read buffer 116(B) is addressed by the read pointer 315(B) to output the data access instruction P2 for execution in the front-end pipeline B of the branch pipeline. Because at this time the read pointer 315(B) points to the type "1" track point, the value of the register 552(B) in the synchronization module 212(B) is incremented by one to obtain "2".

In the eighth cycle, as described previously, the read pointer 115(A) is incremented by one to obtain "2109". The instruction read buffer 116(A) is addressed by the read pointer 115(A) to output the instruction Q9 for execution in the front-end pipeline A of the main pipeline. At this time, the read pointer 115(A) is located in the position "−1" preceding the branch instruction Q10. The value "2" of the register 552(A) is selected as the increment to the read pointer 115(A) to obtain the addition result "2111". In addition, because the branch instruction Q10 and the instruction Q9 are register correlated, a bubble is inserted again into the branch pipeline A to delay the issuing of the D stage of the instruction Q10. In the scheduler 392(B), as described previously, the read pointer 315(B) moves to the next type "1" track point P6.

In the ninth cycle, the read pointer 115(A) is updated to the addition result "2111". The instruction read buffer 116(A) is addressed by the read pointer 115(A) to output the instruction Q11 for execution in the front-end pipeline A of the main pipeline so that the branch instruction Q10 is skipped directly. As described previously, in this cycle, no bubble is inserted in the branch pipeline A.

In the scheduler 392(B), the instruction read buffer 116(B) is addressed by the read pointer to output the type "0" instruction P1 to the processor core 102 for execution in the front-end pipeline B of the main pipeline. At this time, the read pointer 115(B) is located in the position "−1" preceding the data access instruction P2. The value "2" of the register 552(B) is selected as the increment to the read pointer 115(B) to obtain the addition result "1803". Starting from this cycle, the two front-end pipelines again operate simultaneously. The front-end pipeline A is the current front-end pipeline and the front-end pipeline B is the target front-end pipeline.

In the tenth cycle, as described previously, the read pointer 115(A) is incremented by one to obtain "2112". The instruction read buffer 116(A) is addressed by the read pointer 115(A) to output the instruction Q12 for execution in the front-end pipeline A of the main pipeline. The read pointer 115(B) is updated to the addition result "1803". The instruction read buffer 116(B) is addressed by the read pointer 115(B) to output the instruction P3 for execution in the front-end pipeline B of the main pipeline. Because the branch transfer decision result (i.e., the branch transfer occurs) for the branch instruction Q10 is generated in this cycle, starting from the next cycle, the original target front-end pipeline (i.e., the front-end pipeline B) is executed as the new current front-end pipeline, and the current front-end pipeline (i.e., the front-end pipeline A) is aborted.

Starting from the eleventh cycle, the front-end pipeline B is the current front-end pipeline, and the front-end pipeline A is the target front-end pipeline as required. The subsequent operations may be referred to the previous embodiments.

It should be noted that the distance between the read pointers 112 and 315 is compared with a constant in the synchronization module to determine the issuing time point for the branch instructions and the data access instructions. However, other suitable methods may be used. Because when the type "1" instruction is issued in advance, a plurality of preceding instructions may not have entered the main pipeline and the data pipeline, the register correlation with these instructions may be statically predicted.

For example, as shown in FIG. 20, when the read pointer 315 of the data tracker 320 points to a type "1" track point, the register correlation between the track point and the a plurality of preceding instructions is determined. Based on the determination result, the BN1Y value of the read pointer 115 of the master tracker 120 may be determined for the issuing of the type "1" track point.

Specifically, in the example of the early issuing by at most three cycle, it is assumed that the BN1Y of the type "1" track point itself is "x". When this track point has a register correlation with the first track point preceding the track point, the BN1Y of the issuing time point is "x". When this track point does not have a register correlation with the first track point preceding the track point, but the has a register correlation with the second track point preceding the track point, the BN1Y of the issuing time point is "x−1". When this track point does not have a register correlation with the first and second track point preceding the track point, but has a register correlation with the third track point preceding the track point, the BN1Y of the issuing time point is "x–2". When this track point does not have a register correlation with the three track points preceding the track point, the BN1Y of the issuing time point is "x–3".

In this way, it is only necessary to add a memory cell to each entry in the FIFO 198 to store the BN1Y of the issuing time point to form a relationship pair between the source BN1 and the issuing time point BN1Y. At the same time, the FIFO 198 outputs the source BN1 to point to the track table 110, the FIFO 198 also outputs the corresponding issuing time point BBN1Y to the synchronization module 212. When the BN1Y of the read pointer 115 of the master tracker 120 is equal to the issuing time point BN1Y, the type "1" instruction may be issued to the branch pipeline or the data pipeline.

Obviously, when the read pointer 115 points to the type "1" track point, similar determination methods as before may be used to determine the register correlation between the track point and a plurality of succeeding track points so that the number of bubbles to be inserted into the branch pipeline or the data pipeline may be determined. The specifics of the operation may be referred to the previous embodiments.

According to the technical solution of the present invention, the information stored in the memory or the buffer may be used to schedule the issue of the instruction. The information may be a program flow. The program flow may be an instruction sequence. Further, one or more pieces of information stored in the track table, the track read buffer, and the instruction read buffer may be used to schedule the instructions to achieve multiple issuing. That is, the program flow stored in one or more of the memory, the buffer, the track table, the track read buffer, and the instruction read buffer along with the distances between the instructions may be used to issue certain instructions in advance.

Further, the instruction used in various embodiments are divided into two types, including the instructions (type "1" instructions) that require more cycles (i.e., long execution time), and the instructions (type "0" instructions) that require less cycles (i.e., short execution time). Before the processor core fetches a instruction, the cache system reads the instruction type (type "0" or type "1"), and issues the type "1" instruction in advance so that the execution time with more cycles for the type "1" instruction may be concealed, and the type "1" instruction may complete at the same time as the type "0" instruction as much as possible.

Obviously, according to the technical solution of the present invention, the instructions may be divided into more types depending on the number of required execution cycles. Different types of instructions may be given different numbers of early issuing cycles. The specifics of the operation may be referred to the previous embodiments.

For example, the instructions are divided into two types. Generally, when being executed, the branch instructions and the data access instructions may cause the generation of delay cycles (bubbles), and may therefore be classified as the type "1" instructions. Further, instructions that may cause cache misses may also be classified as the type "1" instructions.

According to the technical solution of the present invention, after the track table technique is used, the instruction cache misses are approaching zero. So the cache miss instructions may be further limited to the data cache miss instructions. Of course, the instruction cache miss instructions are not excluded. In addition, the multiplication instructions, division instructions, etc. that require multiple E stages may also be classified as the type "1" instructions. Thus, other instructions are classified as the type "0" instructions.

According to the technical solution of the present invention, the instruction classification may be performed when the scanner 106 inspects the instructions loaded into the primary instruction buffer. Of course, the track points may be classified in the process of the read pointer (e.g., the read pointer 315 in FIG. 20 or read pointer 515 in FIG. 21) movement.

Therefore, both the branch pipeline and the data pipeline according to present disclosure are early pipeline. Thus, in the processor system of the present invention, the type '1" instructions are executed in the early pipelines, and the type "0" instructions are executed in the main pipeline. As described previously, the type "1" instructions may be issued as early as possible (three cycles in previous embodiments). The number of cycles required for executing the type "1" instructions depends on the register correlation between the current instruction and the preceding instructions. Once such register correlation is present, the corresponding number of bubbles may be inserted into the early pipeline where the type "1" instruction is executed.

However, the bubbles in the early pipeline may not cause the generation of bubbles in the main pipeline where the instructions following the type "1" instruction are executed. Whether the main pipeline may be inserted with bubbles is determined by the distance between the type "1" instruction and the first succeeding type "0" instruction that uses the result of the type "1" instruction. As described previously, the bypass module existed in the pipeline control structure may be used to determine whether any bubbles need to be inserted into the main pipeline.

In addition, certain instructions may be classified as either type "1" instructions or type "0" instructions. For example, because the cache miss may occur when a data store instruction accesses the data cache, the instruction may be classified as a type "1" instruction. However, as long as a data write buffer is added to store the data to be written to the data cache, the cache miss may not cause any delay in the execution of the data store instruction. In this case, the data store instruction may be classified as a type "0" instruction. Here, such instruction may be classified as a type "s" instruction.

Thus, the numbers of type "1" and type"0" instructions in the program may be used to dynamically determine whether a type "s" instruction is treated as a type "1" or a type "0" instruction. Specifically, when a program has more type "1" instructions, it is more likely that the main pipeline may be idle. Then type "s" instructions may be treated as type "0" instructions, and may be executed in the main pipeline (or vice versa). So the numbers of instructions executed in the man pipeline and the early pipelines may be balanced.

Specifically, two counters maybe used to count the numbers of issued type "1" and type "0" instructions, respectively. The type "s" instructions may be classified as the instruction type that has smaller count. Another method is called load balancing. By observing the value (register 552 output) of the counter in FIG. 19A, a type "s" instruction is issued as a type "1" instruction when the value is less than or equal to "3" (number of cycles by which a type "1" instruction is issued in advance). A type "s" instruction is issued as a type "0" instruction when the value is greater than "3". Thus, the processor system is able to execute a same number of instructions using a minimum number of cycles to improve the overall performance.

Other suitable modifications may be made to in accordance with the technical solutions and concepts of the present invention. All such alternatives, modifications, and improvements are intended to be within the scope of the present invention as defined by the appended claims.

INDUSTRIAL APPLICABILITY

The apparatus and method of the present invention may be used in various cache-related applications, and the efficiency of such cache systems may be improved.

What is claimed is:

1. A cache method, comprising:
scheduling an instruction issuing based on a program flow information stored in a cache system, wherein the program flow information includes an instruction sequence information and an instruction distance information; and
determining a time point for the instruction issuing based on the instruction sequence information and the instruction distance information,
wherein a portion or all of the program flow information are included in instructions stored in an instruction memory; or the program flow information extracted from instructions are stored in a program flow information memory;
wherein the instruction memory is an instruction cache or an instruction read buffer; and the program flow information memory is a track table or a track read buffer;
wherein a processor system includes a main pipeline and a plurality of early pipelines; and instructions are issued in advance to early pipelines based on the instruction sequence information stored in the instruction memory or the program flow information memory and the instruction distance;
wherein instructions that require more execution cycles are issued in advance based on an instruction type read in advance from the instruction memory or the program flow information memory;
wherein instructions are divided into at least two types including type "1" instructions that require more execution cycles and type "0" instructions that require less execution cycles; the type "1" instructions are executed in the early pipelines; the type "0" instructions are executed in the main pipeline; the type "1" instructions are issued in advance to the early pipelines based on a type information of the program flow information; or, instructions are divided into three types including type "s" instructions that require more execution cycles but have no register correlation with succeeding instructions, type "1" instructions that require more execution cycles and have potential register correlation with succeeding instructions, and type "0" instructions that require less execution cycles; the type "1" instructions are executed in the early pipelines; the type "0" instructions are executed in the main pipeline; the type "s" instructions are treated as the type "1" instruction or the type "0" instructions depending on a difference between numbers of the type "1" instructions and the type "0" instructions; and the type "1" instructions and the type "s" instructions treated as the type "1" instructions are issued in advance to the early pipelines;
wherein instructions loaded from a lower level memory to a primary instruction cache are scanned to extract a portion or all of the program flow information;
wherein the extracted information includes a type information indicating whether an instruction is a type "1" instruction or a type "0" instruction, or an instruction is a type "1" instruction, a type "0" instruction, or a type "s" instruction, and an instruction type indicating whether an instruction is a data access instruction, a branch instruction, or other type of instruction;
wherein, when an instruction is a branch instruction, the extracted information further includes a branch target instruction address information of the branch instruction, wherein the address information is an instruction address or a cache memory address; and when an instruction is a data access instruction, the extracted information further includes an address information of the data accessed by the data access instruction, wherein the address information is a data address or a cache memory address (BN);
wherein:
the extracted information is stored in the track table;
the track table includes a plurality of track points and each track point corresponds to an instruction;
the track table includes at least track points corresponding to all branch instructions and data points corresponding to all data access instructions that are loaded into the primary instruction cache;
each branch point further includes a branch transfer decision result of the branch instruction;
each data point further includes:
 a data stride or a stride pointer of the data access instruction, wherein the data stride is a difference between two data addresses corresponding to two adjacent executions of the data access instruction, and the stride pointer is an address value of a stride table for the data stride corresponding to the data access instruction; and
 a state of the data access instruction to indicate whether the data stride or the stride pointer of the data point is valid, and whether the data address information of the data point corresponds to a current data or a next data.

2. The cache method of claim 1, wherein:
a data address of a previous data access by the data access instruction and a data stride are added to obtain a predicted data address of a next data access, which is then converted to a predicted cache address; or
a cache address of a previous data access by the data access instruction and a data stride are added to obtain a predicted cache address of a next data access; and
the corresponding data is ensured to be loaded into the primary data cache based on the predicted cache address.

3. The cache method of claim 2, wherein:
the corresponding data is read in advance based on the predicted cache address;
when the data access instruction is executed in the data pipeline, the correctness of the predicted cache address is determined;
when the predicted cache address is correct, the processor system continues to operate; and
when the predicted cache address is not correct, the corresponding data is obtained again based on an actual cache address, and the processor system continues to operate.

4. The cache method of claim 3, wherein the method to determine whether a predicted cache address is correct includes:
when the data access instruction is executed in the data pipeline, calculating the actual data address and converting to the actual cache address, and then comparing the actual cache address with the predicted cache address; or calculating the actual data address, and then comparing the actual data address with the predicted data address converted from the predicted cache address; or comparing a base address register value at this time with the result of the predicted data address subtracted by an address offset; or comparing a branch decision word at this time with a branch decision word when the predicted data address is calculated;

when the comparison result is equal, the predicted cache address is correct; and when the comparison result is not equal, the predicted cache address is not correct.

5. The cache method of claim 1, wherein:

the stride table stores the data strides corresponding to the data access instruction in different loop levels;

the branch decision word including branch transfer decision results for a plurality of consecutive backward transfer branch instructions following the data access instruction is used to read the data stride of the loop level corresponding to the branch decision word from the data strides corresponding to the data access instruction; and the address information of the last data access of the data access instruction and the data stride are used to generate the address information of the next data access.

6. The cache method of claim 1, wherein:

the stride table stores the data strides corresponding to different backward transfer branch instructions of the data access instruction;

when the branch transfer of the backward transfer branch instruction occurs, all data strides corresponding to the branch instruction are read from the stride table; and the address information of the last data access of the data access instruction corresponding to the data stride and the data stride are used to generate the address information of the next data access of the data access instruction.

7. The cache method of claim 1, further including:

using a read pointer of the master tracker to address instructions, and to provide type "0" instructions to the main pipeline;

using a read pointer of the data tracker to address instructions and track points, and to provide type "1" instructions to the data pipeline;

the read pointer of the data tracker and the read pointer of the master tracker point to the same instruction, or the read pointer of the data tracker is ahead of the read pointer of the master tracker; and the read pointer of the master tracker or the read pointer of the data tracker is incremented by one to point to next instruction or next track point.

8. The cache method of claim 7, further including:

the read pointer of the data tracker points to the type "1" instruction succeeding the read pointer of the master tracker in advance, and when the read pointer of the master tracker reaches certain position, the type "1" instruction is issued to an early pipeline, and the register correlation between the type "1" instruction and all the preceding instructions until the read pointer of the master tracker is checked to determine the number of bubbles to be inserted by the type "1" instruction into the early pipeline; and the method to determine whether the read pointer of the master tracker has reached the certain position includes:

when the distance difference between the read pointer of the master tracker and the read pointer of the data tracker is less than the maximum advance cycles, determining the read pointer of the master tracker has reached the certain position; or calculating the cache address corresponding to the maximum advance position ahead of the read pointer of the data tracker in advance, and when the read pointer of the master tracker reaches the calculated cache address, determining the read pointer of the master tracker has reached the certain position.

9. The cache method of claim 8, wherein:

depending on the register correlation detection result, the instructions are scheduled statically to issue the type "0" instructions and the type "1" instructions simultaneously to the main pipeline and the early pipeline, respectively.

10. The cache method of claim 8, wherein:

when the read pointer of the data tracker points to a type "1" instruction, the number of consecutive type "1" instructions currently passed by the read pointer of the data tracker is counted to obtain a count value;

when the distance difference between the read pointer of the master tracker and the first instruction of the consecutive type "1" instructions is less than "−1", the read pointer of the master tracker is incremented by one plus the count value to make the read pointer of the master tracker skip the instruction currently pointed by the read pointer of the data tracker;

when the read pointer of the master tracker points to a type "0" instruction, the type "0" instruction is issued to the main pipeline; and when the read pointer of the master tracker points to a type "1" instruction, the type "1" instruction is not issued.

11. The cache method of claim 8, wherein:

when the read pointer of the data tracker points to a type "1" instruction, the number of consecutive type "1" instructions currently passed by the read pointer of the data tracker is counted until the read pointer of the data tracker points to a first type "0' instruction to obtain a count value; and when the distance difference between the read pointer of the master tracker and the first instruction of the consecutive type "1" instructions is less than "−1", and the counting has not completed, the read pointer of the master tracker stops incrementing by one and stops moving until the counting is completed, and then the read pointer of the master tracker is incremented by one plus the count value to make the read pointer of the master tracker skip the consecutive type "1" instructions to point to the first succeeding type "0" instruction.

12. The cache method of claim 8, wherein:

when the distance between the type "1" instruction and the type "0" instruction is less than a critical distance, a bubble generated in the early pipeline where the type "1" is executed in advance causes a bubble to be generated in the main pipeline where the type "0" instruction is executed later.

13. The cache method of claim 8, wherein:

when the type "1" instruction is a branch instruction, and a critical instruction is present, the operation of the critical instruction and the generation of the branch determination result are performed jointly to generate the branch determination result in advance.

14. The cache method of claim 13, wherein:
both the critical instruction and the branch instruction are decoded, and the operand required in the critical instruction execution and the other operands required in the branch instruction execution are used together to generate the branch determination result.

15. The cache method of claim 8, wherein:
when the read pointer of the data tracker points to a type "1" instruction or track point, the read pointer value of the data tracker is temporarily stored to allow the read pointer of the data tracker to continue to move and point to the succeeding type "1" instruction or track point;
the distance between the read pointer of the master tracker and the temporarily stored read pointer of the data tracker is determined based on the first-in-first-out time sequence; and
when the distance reaches the maximum advance cycles, the instruction pointed by the read pointer of the data tracker issued to the early pipeline.

16. The cache method of claim 8, wherein:
when the read pointer of the data tracker points to a type "1" instruction or track point, the time point for issuing the type "1" instruction to the early pipeline is calculated based on the maximum advance cycles;
the read pointer value of the data tracker and the calculated time point are temporarily stored to allow the read pointer of the data tracker to continue to move and point to the succeeding type "1" instruction or track point;
based on the first-in-first-out time sequence, it is determined whether the read pointer of the master tracker has reached the temporarily stored time point; and
when the temporarily stored time point is reached, the instruction pointed by the read pointer of the data tracker corresponding to the temporarily stored time point is issued to the early pipeline.

17. The cache method of claim 8, further including:
using a read pointer of a look ahead tracker to point to the succeeding type "1" instruction or track point in advance ahead of the read pointer of the data tracker.

18. The cache method of claim 8, wherein:
each instruction in the primary instruction cache corresponds a track point in the track table such that the primary instruction cache and the track table are addressed by a primary instruction cache address (BN1) including a first address (BN1X) and a second address (BN1Y) to output the corresponding instruction and track point, respectively;
the primary data cache is addressed by a primary data cache address (DBN1) including a first address (DBN1X) and a second address (DBN1Y) to output the corresponding data; and
each memory block in a secondary cache corresponds to a row in an active table such that the secondary cache and the active table are addressed by a secondary cache address (BN2) including a first address (BN2X) and a second address (BN2Y) to output the corresponding memory block and tow in the active table, respectively.

19. The cache method of claim 17, wherein:
each secondary memory block includes a plurality of primary instruction blocks or primary data bocks;
the upper portion of the second address (BN2Y) of the secondary memory block is a sub-block number;
each sub-block number corresponds a primary instruction block or primary data block;
the lower portion of the second address (BN2Y) is the same as the second address (BN1Y or DBN1Y) of the primary instruction block or primary data block; and
the first address (BN2X) of the secondary memory block and the sub-block number together form a super address (BN2S) such that the secondary cache address (BN2) includes a supper address (BN2S) and a second address (BN1Y or DBN1Y) of the corresponding primary cache.

20. The cache method of claim 19, wherein:
each row of the active table also records a primary cache first address (BN1X) for all or a portion of one primary memory block in a plurality of primary memory blocks corresponding to the secondary memory block;
the super address (BN2S) of the secondary cache address (BN2) is used to locate the primary cache first address (BN1X or DBN1X) corresponding to the secondary cache address (BN2) in the active table; and
the primary cache first address (BN1X or DBN1X) and the primary cache second address (BN1Y or DBN1Y) of the secondary cache address (BN2) together form a primary cache address (BN1 or DBN1).

21. The cache method of claim 20, wherein:
each row of the active table also records a secondary cache first address (BN2X) for the two secondary memory blocks before and after the secondary memory block; and
the secondary cache address (BN2) for a secondary memory block is used to locate the secondary cache addresses (BN2) of the two secondary memory blocks before and after the secondary memory block in the active table.

22. The cache method of claim 18, wherein:
each row of the active table also records a super address (BN2S);
the first address (BN1X) of the primary instruction cache address is used to locate a corresponding super address (BN2S) in the track table; and
the super address (BN2S) and the second address (BN2Y) of the primary instruction cache address (BN1) together form a secondary cache address (BN2).

23. The cache method of claim 19, wherein:
the method also records the super address (BN2S) corresponding to the each row of the primary data cache;
the first address (DBN1X) of the primary data cache address (DBN1) is used to locate the corresponding super address (BN2S); and
the super address (BN2S) and the second address (DBN2Y) of the primary data cache address (DBN1) together form a secondary cache address (BN2).

24. The cache method of claim 8, wherein:
both the main pipeline and the early pipeline include two front-end pipelines and one back-end pipeline;
the two front-end pipelines are a current front-end pipeline and a target front-end pipeline interchangeably;
when a branch instruction is executed in the current front-end pipeline, the primary cache address (BN1) of the branch target instruction is sent to the target front-end pipeline such that at the same time, the current front-end pipeline continues to execute the fall through instruction of the branch instruction and the subsequent instructions, the target front-end pipeline executes the target instruction of the branch instruction and the subsequent instructions;

when the branch transfer decision result of the branch instruction indicates the branch transfer does not occur, the current front-end pipeline is sent to the backend pipeline to continue the execution; and when the branch transfer decision result of the branch instruction indicates the branch transfer occurs, the target front-end pipeline is sent to the backend pipeline to continue the execution, and the target front-end pipeline is the new current front-end pipeline to continue the execution.

* * * * *